United States Patent
Lemay et al.

(10) Patent No.: US 10,712,934 B2
(45) Date of Patent: Jul. 14, 2020

(54) DEVICES AND METHODS FOR ACCESSING PREVALENT DEVICE FUNCTIONS

(71) Applicant: Apple Inc., Cupertino, CA (US)

(72) Inventors: Stephen O. Lemay, San Francisco, CA (US); Christopher P. Foss, San Francisco, CA (US); Richard R. Dellinger, San Jose, CA (US); Jonathan R. Dascola, San Francisco, CA (US); Caelan G. Stack, San Francisco, CA (US); Imran A. Chaudhri, San Francisco, CA (US); Marcel van Os, Santa Cruz, CA (US); Arian Behzadi, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 201 days.

(21) Appl. No.: 15/620,726

(22) Filed: Jun. 12, 2017

(65) Prior Publication Data

US 2017/0357439 A1    Dec. 14, 2017

Related U.S. Application Data

(60) Provisional application No. 62/349,100, filed on Jun. 12, 2016.

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 1/3265* (2013.01); *G06F 3/0483* (2013.01);
(Continued)

(58) Field of Classification Search
CPC .......................... G06F 3/04883; G06F 1/3265
See application file for complete search history.

(56) References Cited

U.S. PATENT DOCUMENTS

| 7,725,501 B1 | 5/2010 | Stillman et al. |
| 2005/0216468 A1 | 9/2005 | Fujiwara et al. |

(Continued)

FOREIGN PATENT DOCUMENTS

| CN | 102841732 A | 12/2012 |
| CN | 103873634 A | 6/2014 |

(Continued)

OTHER PUBLICATIONS

Chandu, S., Dec. 24, 2015, All in one Gestures Best gesture application in Android. Retrieved from https://www.youtube.com/watch?v=3oMUyupflTI (Year: 2015).*

(Continued)

*Primary Examiner* — Amy Ng
*Assistant Examiner* — David Tan
(74) *Attorney, Agent, or Firm* — Morgan, Lewis & Bockius LLP

(57) ABSTRACT

While displaying a first user interface that corresponds to a display-on state of an electronic device, the device detects a swipe gesture on a touch-sensitive surface. In response to detecting the swipe gesture: when the swipe gesture is in a first direction, the device replaces display of the first user interface with display of a camera application user interface; when the swipe gesture is in a second direction, the device replaces display of the first user interface with display of a mini application object user interface that is configured to include a plurality of mini application objects; when the swipe gesture is in a third direction, the device displays a first page of a multipage control panel user interface; and when the swipe gesture is in a fourth direction, the device (Continued)

displays a notifications user interface that is configured to display a plurality of notifications.

42 Claims, 93 Drawing Sheets

(51) Int. Cl.
| | |
|---|---|
| *H04L 12/28* | (2006.01) |
| *G06F 3/0483* | (2013.01) |
| *H04M 1/67* | (2006.01) |
| *G06F 21/74* | (2013.01) |
| *G06F 1/3234* | (2019.01) |
| *H04M 1/725* | (2006.01) |

(52) U.S. Cl.
CPC ............ *G06F 3/0484* (2013.01); *H04L 12/28* (2013.01); *H04M 1/67* (2013.01); *H04M 1/72522* (2013.01); *G05B 2219/2642* (2013.01); *G06F 21/74* (2013.01); *G06F 2203/04803* (2013.01); *Y02D 10/153* (2018.01)

(56) References Cited

U.S. PATENT DOCUMENTS

| | | | |
|---|---|---|---|
| 2012/0109940 A1 | 5/2012 | Ishii et al. | |
| 2012/0173976 A1 | 7/2012 | Herz et al. | |
| 2012/0284673 A1* | 11/2012 | Lamb ................. | G06F 3/04883 715/863 |
| 2013/0002576 A1 | 1/2013 | Kim et al. | |
| 2013/0113738 A1 | 5/2013 | Lee et al. | |
| 2013/0212529 A1 | 8/2013 | Amarnath | |
| 2013/0222323 A1 | 8/2013 | McKenzie | |
| 2014/0237385 A1* | 8/2014 | Shia ....................... | G06Q 10/10 715/752 |
| 2014/0283128 A1 | 9/2014 | Shepherd et al. | |
| 2015/0160909 A1* | 6/2015 | Ding .................... | G06F 3/1423 345/1.1 |
| 2015/0326909 A1 | 11/2015 | Eun et al. | |

FOREIGN PATENT DOCUMENTS

| | | |
|---|---|---|
| EP | 2 182 453 A1 | 9/2009 |
| JP | 2004164555 A | 6/2004 |
| JP | 2004242200 A | 8/2004 |
| JP | 2013175242 A | 9/2013 |
| WO | WO 2007/089766 A2 | 8/2007 |
| WO | WO 2012/061554 A1 | 5/2012 |
| WO | WO 2013/021292 A1 | 2/2013 |
| WO | WO 2014/066451 A1 | 5/2014 |
| WO | WO 2014/106739 A1 | 7/2014 |
| WO | WO 2014/143356 A1 | 9/2014 |
| WO | WO 2014/149473 A1 | 9/2014 |
| WO | WO 2014/158223 A1 | 10/2014 |
| WO | WO 2015/057320 A1 | 4/2015 |

OTHER PUBLICATIONS

Ranjit, [Geekyranjit], Oct. 24, 2014, Handy Gesture App for Android Phones—All in one Gestures. Retrieved from https://www.youtube.com/watch?v=wWv2RN4ntCs (Year: 2014).*

Haider, S., [Shaan Haider], Mar. 22, 2015, How to Use the Gesture Control on Infinix Hot Note X551 to Quickly Launch Any Application. Retrieved from https://www.youtube.com/watch?v=as-8g68ll5I (Year: 2015).*

Office Action, dated Apr. 4, 2019, received in Danish Patent Application No. 201670621, which corresponds with U.S. Appl. No. 15/620,726, 5 pages.

Office Action, dated Sep. 15, 2017, received in Danish Patent Application No. 201670616, which corresponds with U.S. Appl. No. 15/620,726, 4 pages.

Office Action, dated Sep. 6, 2017, received in Danish Patent Application No. 201670620, which corresponds with U.S. Appl. No. 15/620,726, 4 pages.

Office Action, dated Oct. 25, 2019, received in Japanese Patent Application No. 2018-557370, which corresponds with U.S. Appl. No. 15/620,726, 6 pages.

Innovation Patent, dated Jun. 12, 2016, received in Australian Patent Application No. 2017100519, which corresonds with U.S. Appl. No. 15/620,726, 1 page.

Office Action, dated Nov. 2, 2016, received in Danish Patent Application No. 201670616, which corresponds with U.S. Appl. No. 15/620,726, 11 pages.

Office Action, dated August Nov. 3, 2016, received in Danish Patent Application No. 201670620, which corresponds with U.S. Appl. No. 15/620,726, 10 pages.

Office Action, dated Aug. 14, 2017, received in Danish Patent Application No. 201670621, 5 pages.

Office Action, dated Nov. 4, 2019, received in Australian Patent Application No. 2017286113, which corresponds with U.S. Appl. No. 15/620,726, 3 pages.

Office Action, dated Jan. 10, 2020, received in Danish Patent Application No. 201670616, which corresponds with U.S. Appl. No. 15/620,726, 3 pages.

Office Action, dated Jan. 3, 2020, received in European Patent Application No. 17729608.4, which corresponds with U.S. Appl. No. 15/620,726, 8 pages.

Office Action, dated Jun. 11, 2019, received in Australian Appiication No. 2017286113, which corresponds with U.S. Appl. No. 15/620,726, 30 pages.

Office Action, dated Sep. 26, 2019, received in Danish Patent Application No. 201670621, which corresponds with U.S. Appl. No. 15/620,726, 2 pages.

Office Action, dated Sep. 30, 2019, received in Korean Patent Application No. 2018-7033220, which corresponds with U.S. Appl. No. 15/620,726, 3 pages.

Office Action, dated May 18, 2018, received in Danish Patent Application No. 201670616, which corresponds with U.S. Appl. No. 15/620,726, 10 pages.

Office Action, dated Mar. 7, 2019, received in Danish Patent Application No. 201670616, which corresponds with U.S. Appl. No. 15/620,726, 4 pages.

Office Action, dated Feb. 20, 2018, received in Danish Patent Application No. 201670621, 4 pages.

International Search Report and Written Opinion, dated Nov. 8, 2017, received in International Patent Application No. PCT/US2017/034316, which corresponds with U.S. Appl. No. 15/620,726, 21 pages.

International Preliminary Report on Patentability, dated Dec. 18, 2018, received in International Patent Application No. PCT/US2017/034316, which corresponds with U.S. Appl. No. 15/620,726, 13 pages.

Certificate of Grant, dated Mar. 5, 2020, received in Australian Patent Application No. 2017286113, which corresponds with U.S. Appl. No. 15/620,726, 1 page.

Office Action, dated Mar. 23, 2020, received in Chinese patent Application No. 201710383083.0, which corresponds with U.S. Appl. No. 15/620,726, 4 pages.

Patent, dated Feb. 18, 2020, received in Japanese Patent Application No. 2018-557370, which corresponds with U.S. Appl. No. 15/620,726, 4 pages.

* cited by examiner

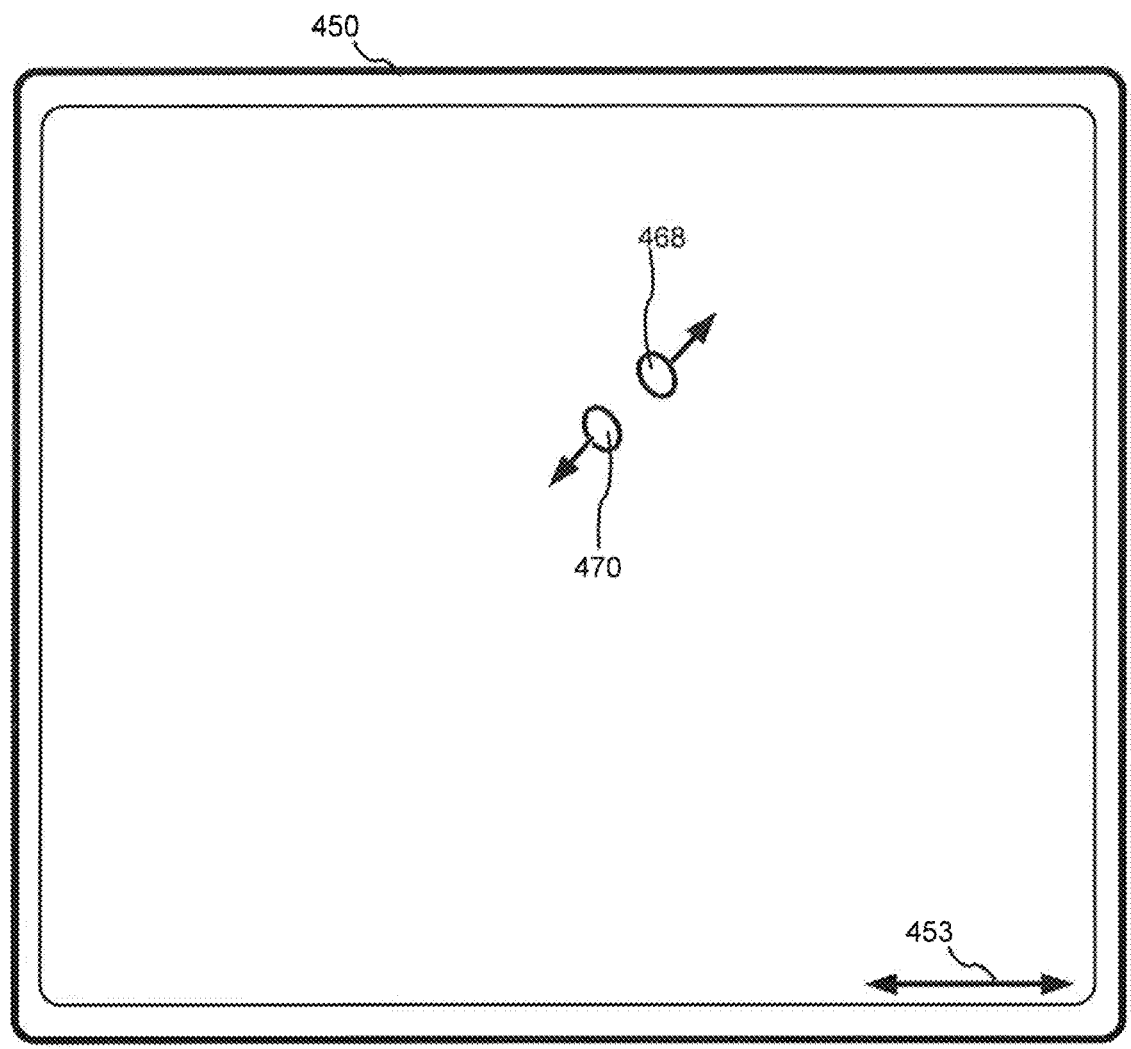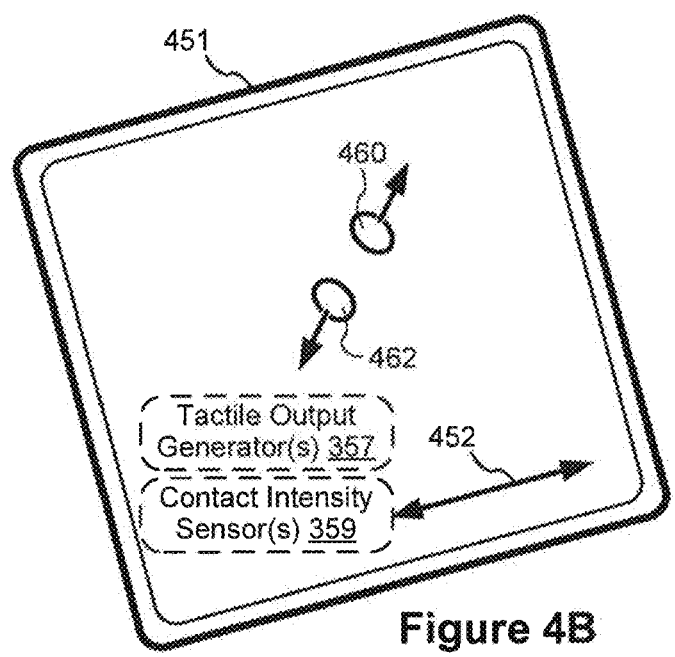
Figure 4B

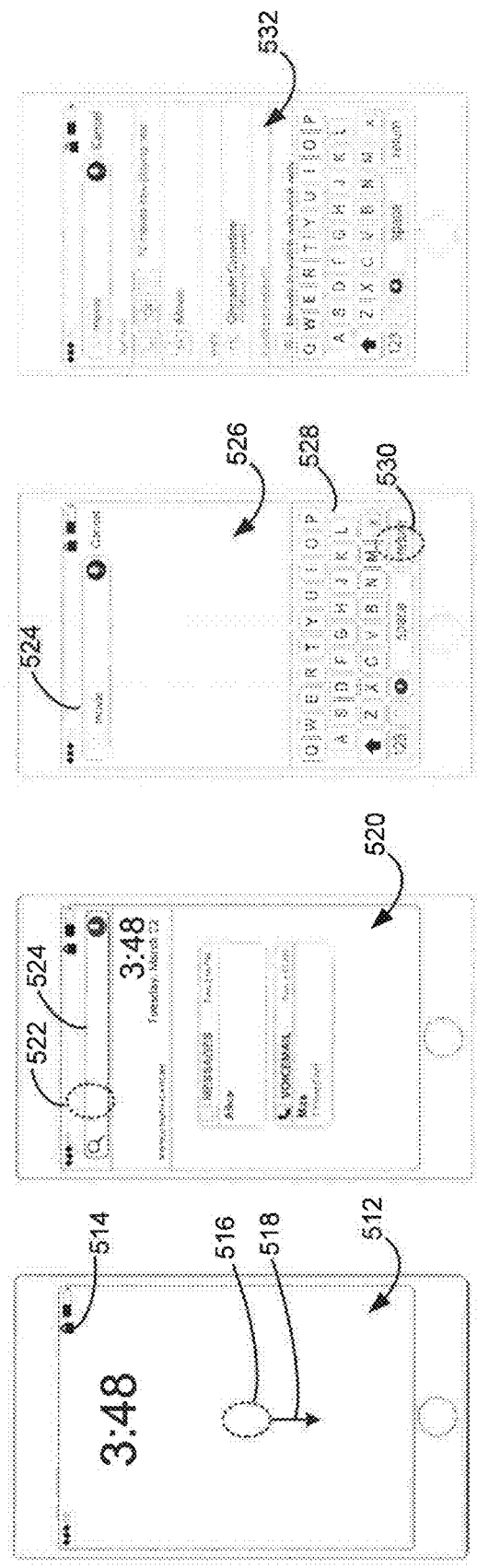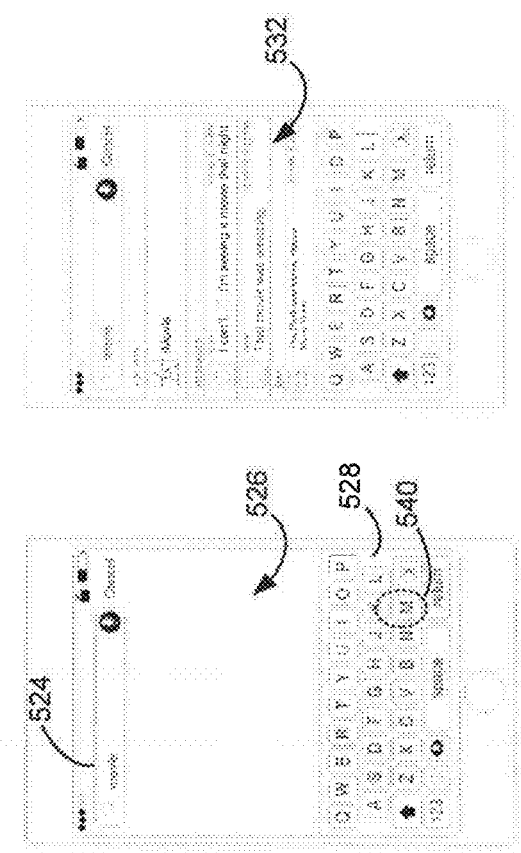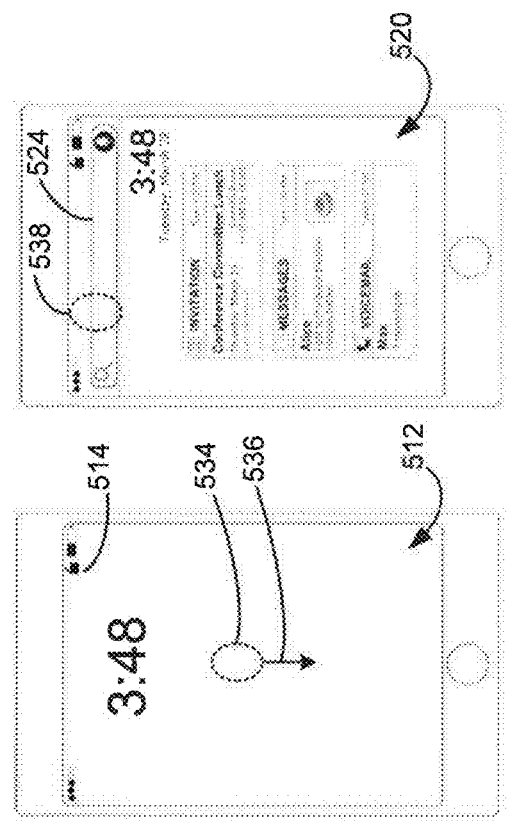

600

602
While the device is in a display-off state, detect a first input

604
In response to detecting the first input: activate the display of the device and display, on the display, a first user interface that corresponds to a display-on state of the device

606
While displaying the first user interface that corresponds to the display-on state of the device, detect a swipe gesture on the touch sensitive surface

608
In response to detecting the swipe gesture on the touch sensitive surface: in accordance with a determination that the device is in a locked mode of the display-on state and the swipe gesture is in a first direction, replace display of the first user interface with display of a second user interface, the second user interface displaying first content; and in accordance with a determination that the device is in an unlocked mode of the display-on state and the swipe gesture is in the first direction, replace display of the first user interface with display of the second user interface, the second user interface displaying the first content and first additional content that is not displayed when the device is in the locked mode of the display-on state

610
The first content includes one or more notifications and the first additional content includes restricted notification information

612
The first content includes one or more mini application objects and the first additional content includes restricted mini application object information

614
In response to detecting the swipe gesture on the touch sensitive surface: in accordance with a determination that the device is in the locked mode of the display-on state and the swipe gesture is in a second direction, distinct from the first direction, replace display of the first user interface with display of a third user interface, the third user interface displaying second content; and, in accordance with a determination that the device is in the unlocked mode of the display-on state and the swipe gesture is in the second direction, replace display of the first user interface with display of the third user interface, the third user interface displaying the second content and second additional content that is not displayed when the device is in the locked mode of the display-on state

616
The second content includes one or more mini application objects and the second additional content includes restricted mini application object information

618
The second content includes one or more notifications and the second additional content includes restricted notification information

620
The second user interface includes a first search input region and the third user interface includes a second search input region

622
Detect input in a respective search input region of the first search input region and the second search input region

624
In response to detecting the input in the respective search region: in accordance with a determination that the device is in a locked mode of the display-on state, display a first set of search results; and in accordance with a determination that the device is in an unlocked mode of the display-on state, display a second set of search results, distinct from the first set of search results

---
626
The determination of whether the device is in the unlocked mode or the locked mode of the display-on state is made in response to detecting the first input

---

628
The determination of whether the device is in the locked mode of the display-on state or the unlocked mode of the display-on state is made in response to detecting the swipe gesture on the touch sensitive surface

---

630
The electronic device includes one or more sensors and detecting the first input includes: detecting, with the one or more sensors, a change in a context of the device; and in response to detecting the change in the context of the device, determining whether the change in the context of the device meets display-activation criteria

---

632
Detecting the first input includes detecting activation of a display-activation affordance

---

634
Detecting the first input includes detecting a contact with a display-activation affordance that activates the display-activation affordance and that does not actuate the display-activation affordance

---

636
Detecting the first input includes detecting a contact with a display-activation affordance that activates the display-activation affordance to activate the display of the device and that does not activate the display-activation affordance to perform at least one additional function associated with the display-activation affordance

638
While the first user interface is displayed, detect a second input; and, in response to detecting the second input, replace display of the first user interface with display of a user interface that includes a plurality of application icons that correspond to different applications of a plurality of applications

640
In response to detecting the second input: determine whether the device is in a locked mode of the display-on state or an unlocked mode of the display-on state; and in accordance with a determination that the device is in the locked mode of the display-on state, display an authentication user interface

642
Detecting the first input includes detecting activation of a display-activation affordance

612
The first content includes one or more mini application objects and the first additional content includes restricted mini application object information

644
A respective mini application object is configured to perform a subset, less than all, of the functions of a corresponding application of the respective mini application object

646
A respective mini application object displays an identifier for a corresponding application of the respective mini application object

648
A respective mini application object displays a portion of content from a corresponding application of the respective mini application object

650
A predefined input on a respective mini application object launches a corresponding application the respective mini application object

612
The first content includes one or more mini application objects and the first additional content includes restricted mini application object information

652
A respective mini application object operates as a standalone application residing in memory of the device, distinct from an associated application also residing in the memory of the device

654
A respective mini application object operates as an extension or component of an associated application on the device

656
A respective mini application object has a dedicated memory portion for temporary storage of information

658
The memory portion is accessible by a corresponding full-featured application of the respective mini application object

702
While the device is in a display-off state, detect a first input to activate the display of the device

704
In response to detecting the first input: activate the display of the device, and display, on the display, a first user interface that corresponds to a display-on state of the device

706
While displaying the first user interface that corresponds to the display-on state of the device, detect a swipe gesture on the touch sensitive surface

708
In response to detecting the swipe gesture: in accordance with a determination that the swipe gesture is in a first direction, replace display of the first user interface with display of a camera application user interface; in accordance with a determination that the swipe gesture is in a second direction, distinct from the first direction, replace display of the first user interface with display of a mini application object user interface that is configured to include a plurality of mini application objects, wherein a respective mini application object of the plurality of mini application objects has a corresponding application that is stored in the device; in accordance with a determination that the swipe gesture is in a third direction, distinct from the first direction and the second direction, display a first page of a multipage control panel user interface; and in accordance with a determination that the swipe gesture is in a fourth direction, distinct from the first direction, the second direction, and the third direction, displaying a notifications user interface that is configured to display a plurality of notifications

724
While the notifications user interface is displayed, detect a dismissal gesture at a location on the touch-sensitive surface corresponding to a respective notification included in the notifications user interface

726
In response to detecting the dismissal gesture, cease to display the respective notification in the notifications user interface

728
While the notification user interface is displayed, detect a launch gesture at a location on the touch-sensitive surface corresponding to a first notification included in the notifications user interface

730
In response to detecting the launch gesture, launch an application that corresponds to the first notification

732
While the mini application object user interface is displayed, detect a launch gesture at a location on the touch-sensitive surface corresponding to a first mini application object included in the mini application object user interface

734
In response to detecting the launch gesture, launching an application that corresponds to the first mini application object

736
While the mini application object user interface is displayed, detect an information expansion gesture at a location on the touch-sensitive surface corresponding to a second mini application object included in the mini application object user interface, wherein the second mini application object includes mini application object information

↓

738
In response to detecting the information expansion gesture: expand the second mini application object; and display the mini application object information and additional mini application object information in the expanded second mini application object

---

740
A respective mini application object is configured to perform a subset, less than all, of the functions of a corresponding application of the respective mini application object

---

742
A respective mini application object displays an identifier for a corresponding application of the respective mini application object

---

744
A respective mini application object displays a portion of content from a corresponding application of the respective mini application object

---

746
A predefined input on a respective mini application object launches a corresponding application the respective mini application object

---

748
A respective mini application object operates as a standalone application residing in memory of the device, distinct from an associated application also residing in the memory of the device

750
Wherein a respective mini application object operates as an extension or component of an associated application on the device

---

752
A respective mini application object has a dedicated memory portion for temporary storage of information 754
The memory portion is accessible by a corresponding full-featured application of the respective mini application object

802
Display a first user interface that includes a plurality of application icons that correspond to different applications of a plurality of applications installed on the device

804
Detect a first input at a location on the touch-sensitive surface that corresponds to a first application icon of the plurality of application icons, the first application icon corresponding to a first application of the plurality of applications

806
In response to detecting the first input, display a first mini application object or a preview of the first mini application object in an overlay region, wherein: the first mini application object corresponds to a first application of the plurality of applications; and the overlay region includes an affordance for adding the first mini application object to a second user interface that displays a plurality of mini application objects

808
Detect a second input at a location on the touch-sensitive surface that corresponds to the affordance for adding the first mini application object to the second user interface

810
In response to detecting the second input, add the first mini application object to the second user interface that displays the plurality of mini application objects

812
While displaying the first user interface, detect a third input on the touch-sensitive surface, the third input meeting first criteria for navigating from the first user interface to the second user interface

↓

814
In response to detecting the third input, replace display of the first user interface with the second user interface, wherein replacing display of the first user interface with the second user interface includes: ceasing to display the first user interface; and displaying the second user interface, including concurrently displaying, in the second user interface, the first mini application object and at least a second mini application object that corresponds to a second application of the plurality of applications that is different from the first application

---

816
The first mini application object includes at least one selectable information item

↓

818
While the second user interface is displayed, detect a fourth input at a location on the touch-sensitive surface that corresponds to the at least one selectable information item

↓

820
In response to detecting the fourth input, display additional information associated with the selectable information item

---

822
The first mini application object is added at a topmost position in a vertical stack of mini application objects in the second user interface

---

824
The first mini application object includes identifying information that identifies the first application

826
The first mini application object is configured to provide a subset of functionality that is provided by the first application

---

828
The first mini application object includes a subset of content from the first application

---

830
In response to detecting the first input, display a menu of selectable options that correspond to the first application

---

832
A predefined input on the first mini application object launches the first application

---

834
The first mini application object operates as a standalone application residing in memory of the device, distinct from the first application

---

836
The first mini application object operates as an extension or component of the first application

---

838
The first mini application object has a dedicated memory portion for temporary storage of information

840
The memory portion is accessible by the first application

902
While displaying an initial user interface on the display, detect a first gesture on the touch sensitive surface

904
In response to detecting the first gesture, display a first page of a multipage control panel on the display, wherein the first page of the multipage control panel includes a plurality of device control affordances

906
While displaying the first page of the multipage control panel, detect a second gesture on the touch sensitive surface

908
In response to detecting the second gesture, display a second page of the multipage control panel, wherein: the second page of the multipage control panel includes a plurality of content playback control affordances; and the second page of the multi-page control panel replaces the first page of the multipage control panel on the display

910
While displaying the second page of the multipage control panel, detect a third gesture on the touch sensitive surface

912
In response to detecting the third gesture, in accordance with a determination that the third gesture is of a first gesture type, cease to display the second page of the multipage control panel on the display

914
In accordance with a determination that the third gesture is of a second gesture type that is distinct from the first gesture type, display a third page of the multipage control panel, wherein the third page of the multipage control panel includes a plurality of remote device control affordances

916
The plurality of remote device control affordances included in the third page of the multipage control panel correspond to different devices in a respective defined area of a plurality of defined areas that are selectable by a user

918
Displaying the third page of the multipage control panel includes re-displaying one or more remote device controls that were included in the third page of the multipage control panel when the third page of the multipage control was last displayed

920
The third page of the multipage control panel includes a defined area list affordance that, when activated, is configured to cause display of a plurality of defined area identifiers that are selectable by a user

922
The third page of the multipage control panel includes a defined area list affordance that, when activated, is configured to cause display of a plurality of defined area identifiers that are selectable by a user

924
The first page of the multipage control panel overlays a portion of the initial user interface

---

926
The initial user interface is an application user interface and the multipage control panel and the application user interface are concurrently displayed

---

928
After ceasing to display the second page of the multipage control panel, detect a fourth gesture on the touch sensitive surface

↓

930
In response to detecting the fourth gesture, redisplay the second page of the multipage control panel

---

932
The plurality of device control affordances includes at least one toggle control

---

934
The second page of the multipage control panel includes indicia of a routing destination of currently playing media

936
While displaying the second page of the multipage control panel, detect an input at a location on the touch-sensitive surface that corresponds to the indicia of the routing destination of the currently playing media, wherein the routing destination of the currently playing media includes a first device corresponding to a first zone

↓

938
In response to detecting the input at the location on the touch-sensitive surface that corresponds to the indicia of the routing destination of the currently playing media, route media output to a second device corresponding to a second zone

940
The second page of the multipage control panel includes a media routing destination list affordance

↓

942
Detect an input at a location on the touch-sensitive surface that corresponds to the media routing destination list affordance

↓

944
In response to detecting the input at the location that corresponds to the media routing destination list affordance, display a list of media routing destination options

946
Populating the list of media routing destination options with an identifier of the electronic device and at least one additional device, wherein populating the list of media routing destination options with the at least one additional device includes: in accordance with a determination that the electronic device is currently routing media output to one or more remote devices, populating the list of media routing destination options with the one or more remote devices to which the electronic device is currently routing media output; and in accordance with a determination that the electronic device has previously paired with one or more pairing-enabled devices, populating the list of media routing destination options with the one or more pairing-enabled devices

948
In accordance with a determination that one or more signal-transmitting devices are detected in proximity to the electronic device, populate the list of media routing destination options with the one or more signal-transmitting devices

950
The electronic device includes one or more sensors to detect intensities of contacts with the touch-sensitive surface

---

952
Detect a first input including detecting a first contact at a location on the touch-sensitive surface that corresponds to a first control affordance of the plurality of device control affordances

---

954
In response to detecting the first input: in accordance with a determination that the first input meets second criteria, the second criteria requiring that a characteristic intensity of the first contact meet a first intensity threshold in order for the second criteria to be met, display one or more modification options for the control that correspond to the first control affordance; and in accordance with a determination that the first input meets third criteria, wherein the third criteria do not require that the characteristic intensity of the first contact meet the first intensity threshold, toggle a function of a control that corresponds to the first control affordance

956
While displaying the one or more modification options for the control that correspond to the first control affordance, detect a second input that activates a first modification option of the one or more modification options

958
In response to detecting the second input, modify the control that corresponds to the first control affordance in accordance with the activated first modification option

---

960
A respective page of the multipage control panel includes indicia of a total number of pages that the multipage control panel has, and wherein an indicator that corresponds to a currently displayed page of the multipage control panel is highlighted in the respective page

Figure 9E

DEVICES AND METHODS FOR ACCESSING PREVALENT DEVICE FUNCTIONS

RELATED APPLICATIONS

This application claims priority to U.S. Provisional Application Ser. No. 62/349,100, filed Jun. 12, 2016, entitled "Devices and Methods for Accessing Prevalent Device Functions," which is incorporated by reference herein in its entirety.

This application relates to U.S. patent application Ser. No. 14/725,912 titled "Accessory Management System Using Environment Model," filed May 29, 2015, the content of which is hereby incorporated by reference in its entirety. This application also relates to U.S. Provisional Patent Application 62/349,057, titled, "User Interface for Managing Controllable External Devices," filed Jun. 12, 2016, the content of which is hereby incorporated by reference in its entirety.

TECHNICAL FIELD

This relates generally to electronic devices with touch-sensitive surfaces, including but not limited to electronic devices with touch-sensitive surfaces that include multiple user interfaces for accessing prevalent device functions.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include accessing controls for controlling device functions and functions of remote devices. But methods for performing these manipulations are cumbersome and inefficient. As the realm of uses of remote devices grows, accessing particular controls and functions grows more time consuming. For example, entering a sequence of inputs to access a control via a drill down menu is time consuming for a user, particularly if the location of the desired control is not known beforehand by the user. Navigating between applications to access device functions is also time consuming.

SUMMARY

Accordingly, there is a need for electronic devices with faster, more efficient methods and interfaces for accessing prevalent device functions. Such methods and interfaces optionally complement or replace conventional methods for accessing prevalent device functions. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a touch-sensitive surface. The method includes, while the device is in a display-off state, detecting a first input; and in response to detecting the first input: activating the display of the device, and displaying, on the display, a first user interface that corresponds to a display-on state of the device; while displaying the first user interface that corresponds to the display-on state of the device, detecting a swipe gesture on the touch-sensitive surface; and, in response to detecting the swipe gesture on the touch-sensitive surface: in accordance with a determination that the device is in a locked mode of the display-on state and the swipe gesture is in a first direction, replacing display of the first user interface with display of a second user interface, the second user interface displaying first content; in accordance with a determination that the device is in an unlocked mode of the display-on state and the swipe gesture is in the first direction, replacing display of the first user interface with display of the second user interface, the second user interface displaying the first content and first additional content that is not displayed when the device is in the locked mode of the display-on state.

In accordance with some embodiments, a method is performed at an electronic device with a display and a touch-sensitive surface. The method includes, while the device is in a display-off state, detecting a first input to activate the display of the device; in response to detecting the first input: activating the display of the device, and displaying, on the display, a first user interface that corresponds to a display-on state of the device; while displaying the first user interface that corresponds to the display-on state of the device, detecting a swipe gesture on the touch-sensitive surface; and, in response to detecting the swipe gesture: in accordance with a determination that the swipe gesture is in a first direction, replacing display of the first user interface with display of a camera application user interface; in accordance with a determination that the swipe gesture is in a second direction, distinct from the first direction, replacing display of the first user interface with display of a mini application object user interface that is configured to include a plurality of mini application objects, wherein a respective mini application object of the plurality of mini application objects has a corresponding application that is stored in the device; in accordance with a determination that the swipe gesture is in a third direction, distinct from the first direction and the second direction, displaying a first page of a multipage control panel user interface; and in accordance with a determination that the swipe gesture is in a fourth direction, distinct from the first direction, the second direction, and the third direction, displaying a notifications user interface that is configured to display a plurality of notifications.

In accordance with some embodiments, a method is performed at an electronic device with a display and a touch-sensitive surface. The method includes displaying a first user interface that includes a plurality of application icons that correspond to different applications of a plurality of applications installed on the device; detecting a first input at a location on the touch-sensitive surface that corresponds to a first application icon of the plurality of application icons, the first application icon corresponding to a first application of the plurality of applications; in response to detecting the first input, displaying a first mini application object or a preview of the first mini application object in an overlay region, wherein: the first mini application object corresponds to a first application of the plurality of applications; and the overlay region includes an affordance for adding the first mini application object to a second user interface that displays a plurality of mini application objects; detecting a second input at a location on the touch-sensitive surface that corresponds to the affordance for adding the first mini application object to the second user interface; and, in response to detecting the second input, adding the first mini application object to the second user interface that displays the plurality of mini application objects.

In accordance with some embodiments, a method is performed at an electronic device with a display and a touch-sensitive surface. The method includes, while displaying an initial user interface on the display, detecting a first gesture on the touch-sensitive surface; in response to detecting the first gesture, displaying a first page of a multipage control panel on the display, wherein the first page of the multipage control panel includes a plurality of device control affordances; while displaying the first page of the multipage control panel, detecting a second gesture on the touch-sensitive surface; and in response to detecting the second gesture, displaying a second page of the multipage control panel, wherein: the second page of the multipage control panel includes a plurality of content playback control affordances; and the second page of the multi-page control panel replaces the first page of the multipage control panel on the display.

In accordance with some embodiments, an electronic device includes a display unit configured to display user interfaces, a touch-sensitive surface unit configured to detect contacts, and a processing unit coupled with the display unit and the touch-sensitive surface unit. The processing unit is configured to: while the device is in a display-off state, detect a first input. In response to detecting the first input, the processing unit is configured to: activate the display unit of the device, and enable display of, on the display unit, a first user interface that corresponds to a display-on state of the device. While displaying the first user interface that corresponds to the display-on state of the device, the processing unit is configured to detect a swipe gesture on the touch-sensitive surface unit. In response to detecting the swipe gesture on the touch-sensitive surface unit, the processing unit is configured to: in accordance with a determination that the device is in a locked mode of the display-on state and the swipe gesture is in a first direction, replace display of the first user interface with display of a second user interface, the second user interface displaying first content; and in accordance with a determination that the device is in an unlocked mode of the display-on state and the swipe gesture is in the first direction, replace display of the first user interface with display of the second user interface, the second user interface displaying the first content and first additional content that is not displayed when the device is in the locked mode of the display-on state.

In accordance with some embodiments, an electronic device includes a display unit configured to display user interfaces, a touch-sensitive surface unit configured to detect contacts, and a processing unit coupled with the display unit and the touch-sensitive surface unit. The processing unit is configured to: while the device is in a display-off state, detect a first input to activate the display unit of the device. In response to detecting the first input, the processing unit is configured to: activate the display of the device, and enable display of, on the display unit, a first user interface that corresponds to a display-on state of the device. While displaying the first user interface that corresponds to the display-on state of the device, the processing unit is configured to detect a swipe gesture on the touch-sensitive surface unit. In response to detecting the swipe gesture, the processing unit is configured to: in accordance with a determination that the swipe gesture is in a first direction, replace display of the first user interface with display of a camera application user interface; in accordance with a determination that the swipe gesture is in a second direction, distinct from the first direction, replace display of the first user interface with display of a mini application object user interface that is configured to include a plurality of mini application objects, where a respective mini application object of the plurality of mini application objects has a corresponding application that is stored in the device; in accordance with a determination that the swipe gesture is in a third direction, distinct from the first direction and the second direction, enable display of a first page of a multipage control panel user interface; and in accordance with a determination that the swipe gesture is in a fourth direction, distinct from the first direction, the second direction, and the third direction, enable display of a notifications user interface that is configured to display a plurality of notifications.

In accordance with some embodiments, an electronic device includes a display unit configured to display a first user interface that includes a plurality of application icons that correspond to different applications of a plurality of applications installed on the device, a touch-sensitive surface unit configured to detect contacts, and a processing unit coupled with the display unit and the touch-sensitive surface unit. The processing unit is configured to: detect a first input at a location on the touch-sensitive surface unit that corresponds to a first application icon of the plurality of application icons, the first application icon corresponding to a first application of the plurality of applications. In response to detecting the first input, the processing unit is configured to enable display of a first mini application object or a preview of the first mini application object in an overlay region, where the first mini application object corresponds to a first application of the plurality of applications; and the overlay region includes an affordance for adding the first mini application object to a second user interface that displays a plurality of mini application objects. The processing unit is further configured to detect a second input at a location on the touch-sensitive surface unit that corresponds to the affordance for adding the first mini application object to the second user interface. In response to detecting the second input, the processing unit is configured to add the first mini application object to the second user interface that displays the plurality of mini application objects.

In accordance with some embodiments, an electronic device includes a display unit configured to display user interfaces, a touch-sensitive surface unit configured to contacts, and a processing unit coupled with the display unit and the touch-sensitive surface unit, the processing unit. The processing unit is configured to: while displaying an initial user interface on the display unit, detect a first gesture on the touch-sensitive surface unit. In response to detecting the first gesture, the processing unit is configured to enable display of a first page of a multipage control panel on the display unit, where the first page of the multipage control panel includes a plurality of device control affordances. While displaying the first page of the multipage control panel, the processing unit is configured to detect a second gesture on the touch-sensitive surface unit. In response to detecting the second gesture, the processing unit is configured to enable display of a second page of the multipage control panel, where the second page of the multipage control panel includes a plurality of content playback control affordances, and the second page of the multi-page control panel replaces the first page of the multipage control panel on the display unit.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for accessing prevalent device functions, thereby increasing the effectiveness, efficiency, and user satisfaction with such devices. Such methods and interfaces may complement or replace conventional methods for accessing prevalent device functions.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 5A-1 to 5A-4, 5B-5E, 5F-1 to 5F-8, 5G-5Q, 5R-1 to 5R-2, 5S-1 to 5S-2, 5T-1 to 5T-4, and 5U-5BJ illustrate example user interfaces for accessing prevalent device functions, in accordance with some embodiments.

FIGS. 6A-6E are flow diagrams illustrating a method of accessing controls from a display-on user interface, in accordance with some embodiments.

FIGS. 7A-7E are flow diagrams illustrating a method of accessing controls from a display-on user interface, in accordance with some embodiments.

FIGS. 8A-8C are flow diagrams illustrating a method of adding a mini application object to a mini applications user interface, in accordance with some embodiments.

FIG. 9A-9E are flow diagrams illustrating a method of navigating controls using a multipage control panel, in accordance with some embodiments.

DESCRIPTION OF EMBODIMENTS

Figure 1A:
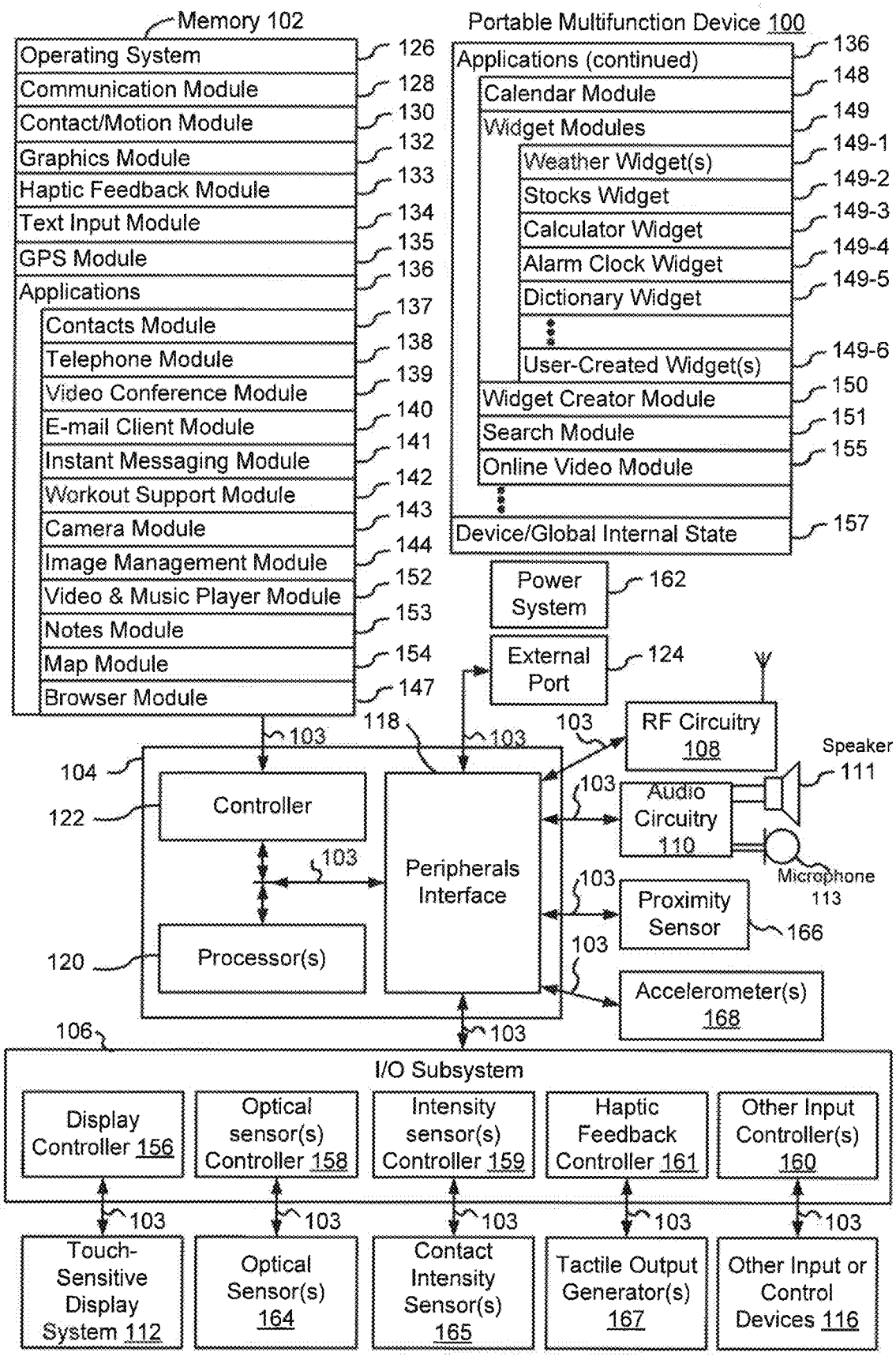
FIG. 1A is a block diagram illustrating a portable multifunction device with a touch-sensitive display in accordance with some embodiments.

Many electronic devices provide various interfaces for accessing application features and modifying device settings. Such interfaces may require a user to activate a device, provide authentication information, and/or drill down through multiple menus to access a desired application feature or device setting. Methods described herein provide interfaces for accessing prevalent device functions, such as application features and device settings. Such interfaces reduce the number of inputs needed to access such features, which reduces power usage and improves battery life of the device by enabling the user to use the device more quickly and efficiently.

Below, FIGS. 1A-1B, 2, and 3 provide a description of example devices. FIGS. 4A-4B and 5A-5BJ illustrate example user interfaces for providing haptic feedback. FIGS. 6A-6E illustrate a flow diagram of a method of accessing controls from a display-on user interface, in accordance with some embodiments. FIGS. 7A-7E illustrate a flow diagram of a method of accessing controls from a display-on user interface, in accordance with some embodiments. FIGS. 8A-8C illustrate a flow diagram of a method of adding a mini application object to a mini applications user interface, in accordance with some embodiments.

FIGS. 9A-9E illustrate a flow diagram of a method of navigating controls using a multipage control panel, in accordance with some embodiments. The user interfaces in FIGS. 5A-5BJ are used to illustrate the processes in FIGS. 6A-6E, 7A-7E, 8A-8C, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., graphical user interface object that is configured to respond to inputs directed toward the graphical user interface object). Examples of user-interactive graphical user interface objects include, without limitation, a button, slider, icon, selectable menu item, switch, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
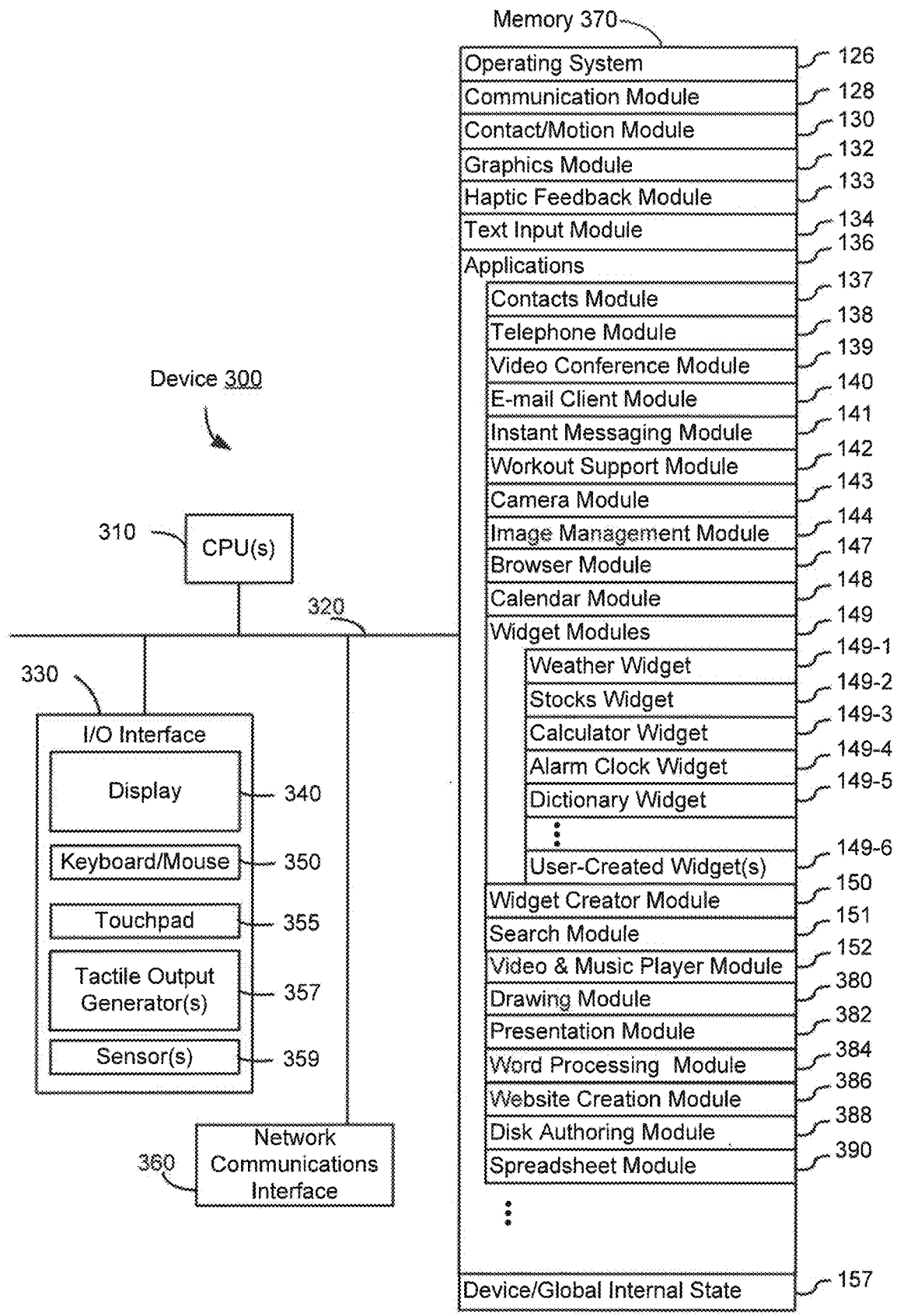
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy input criteria that are configured to be met even when the characteristic intensity of a contact does not satisfy a given intensity threshold. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is configured to detect a finger or stylus contact hovering over a touch sensitive surface, the nominal contact-detection intensity threshold optionally does not correspond to physical contact between the finger or stylus and the touch sensitive surface.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
    contacts module 137 (sometimes called an address book or contact list);
    telephone module 138;
    video conferencing module 139;
    e-mail client module 140;
    instant messaging (IM) module 141;
    workout support module 142;
    camera module 143 for still and/or video images;
    image management module 144;
    browser module 147;
    calendar module 148;
    widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
    widget creator module 150 for making user-created widgets 149-6;
    search module 151;
    video and music player module 152, which is, optionally, made up of a video player module and a music player module;
    notes module 153;
    map module 154; and/or
    online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
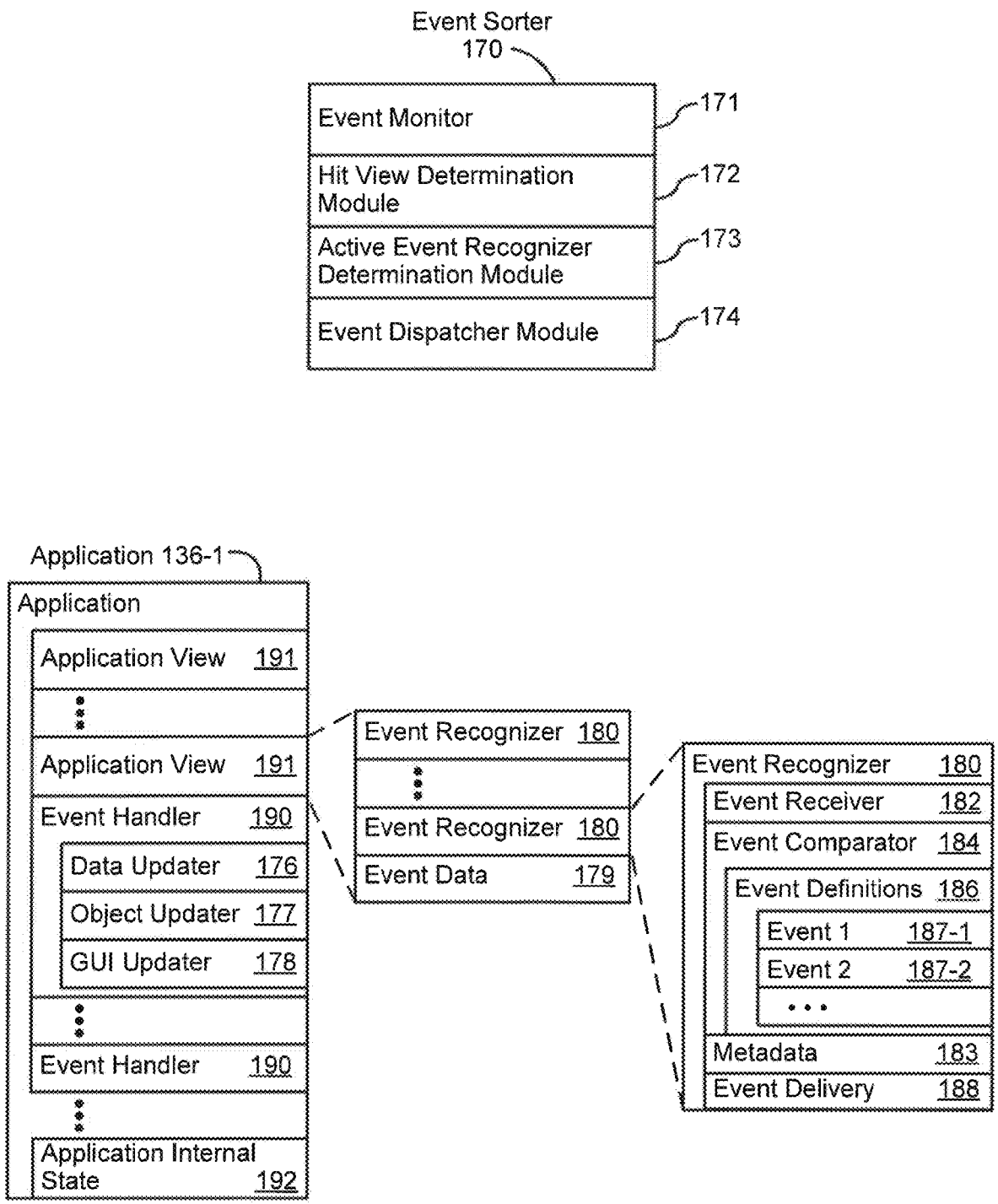
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
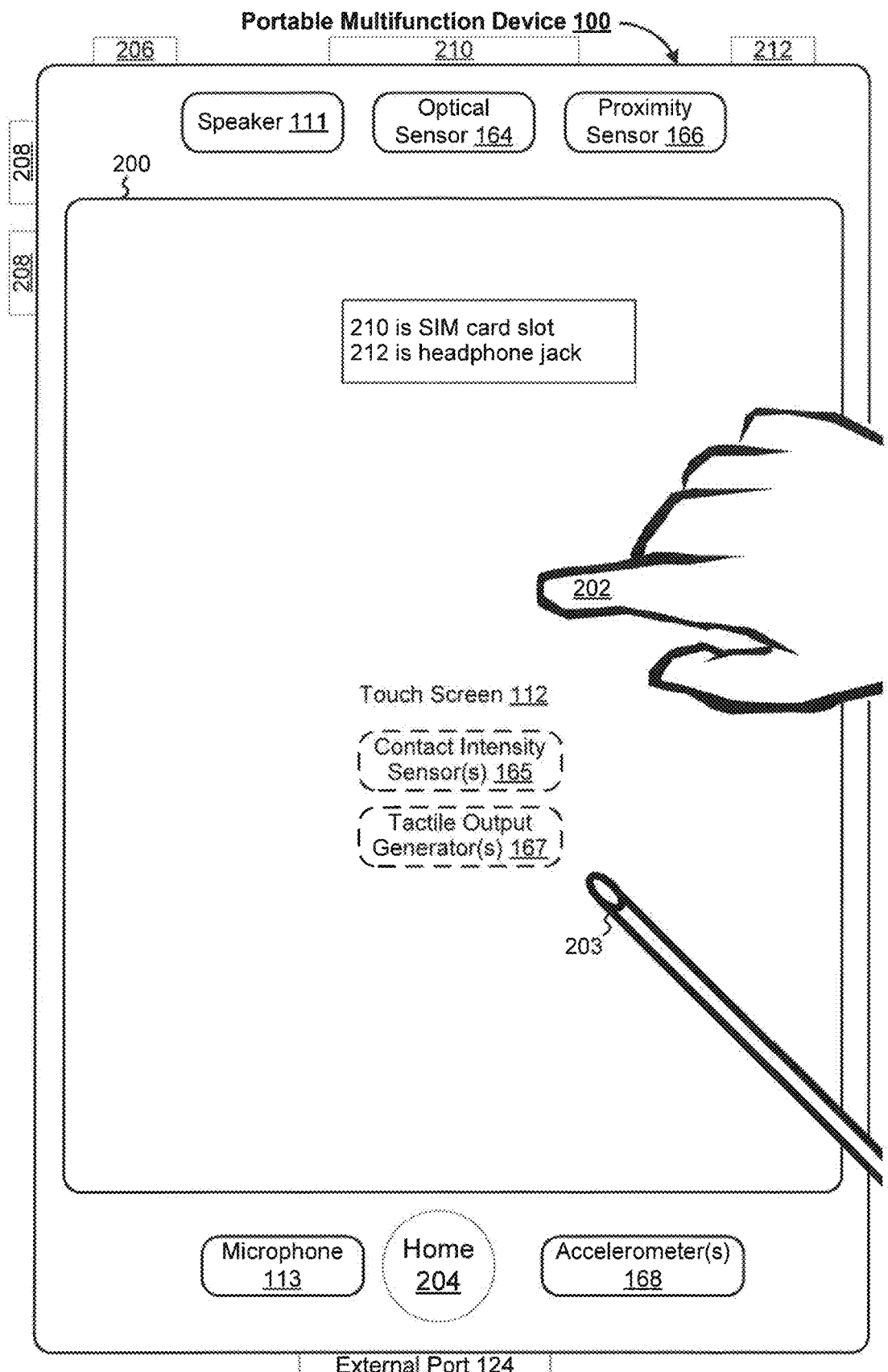
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
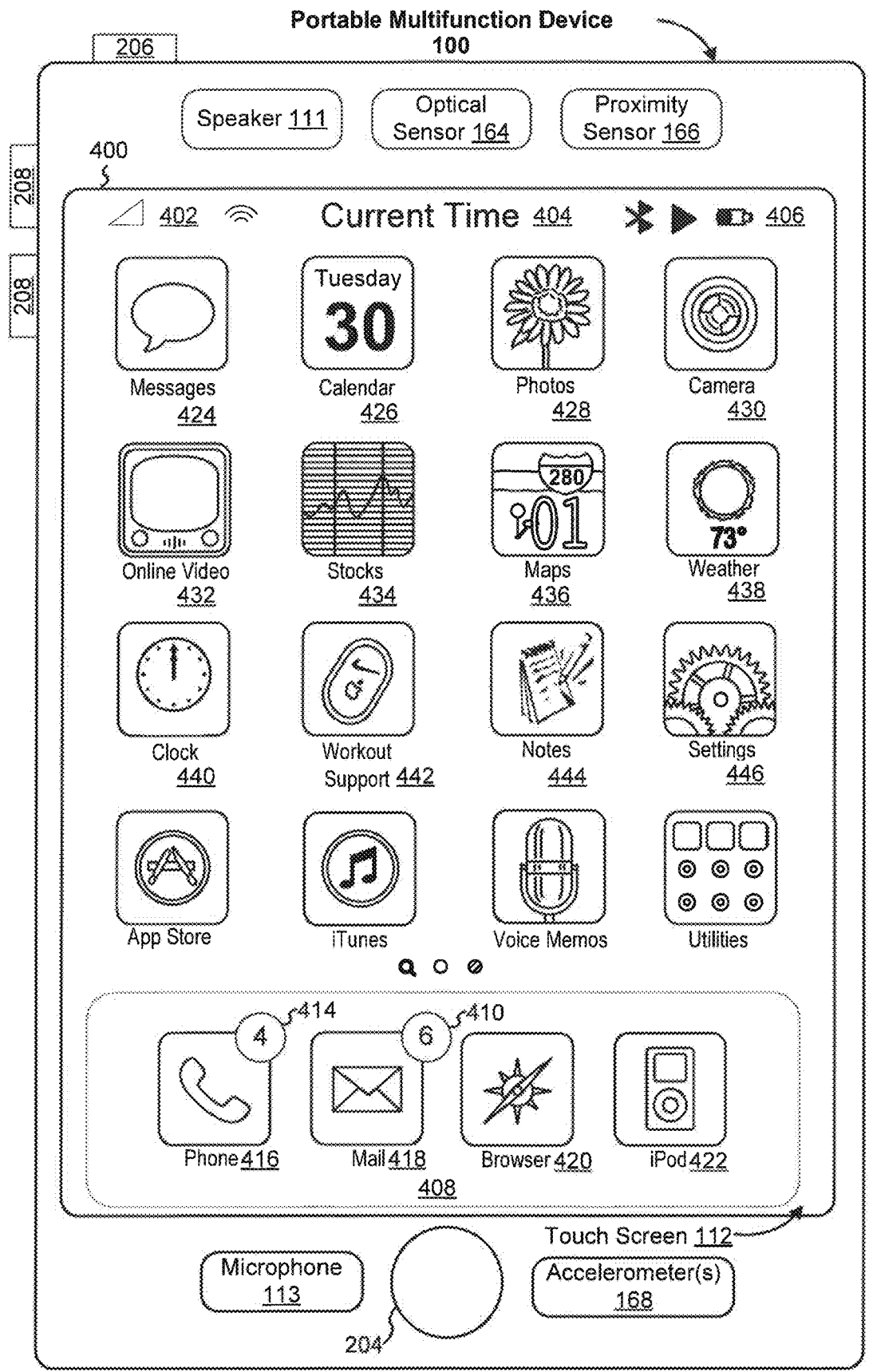
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 357 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen display acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact.

Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold.

Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
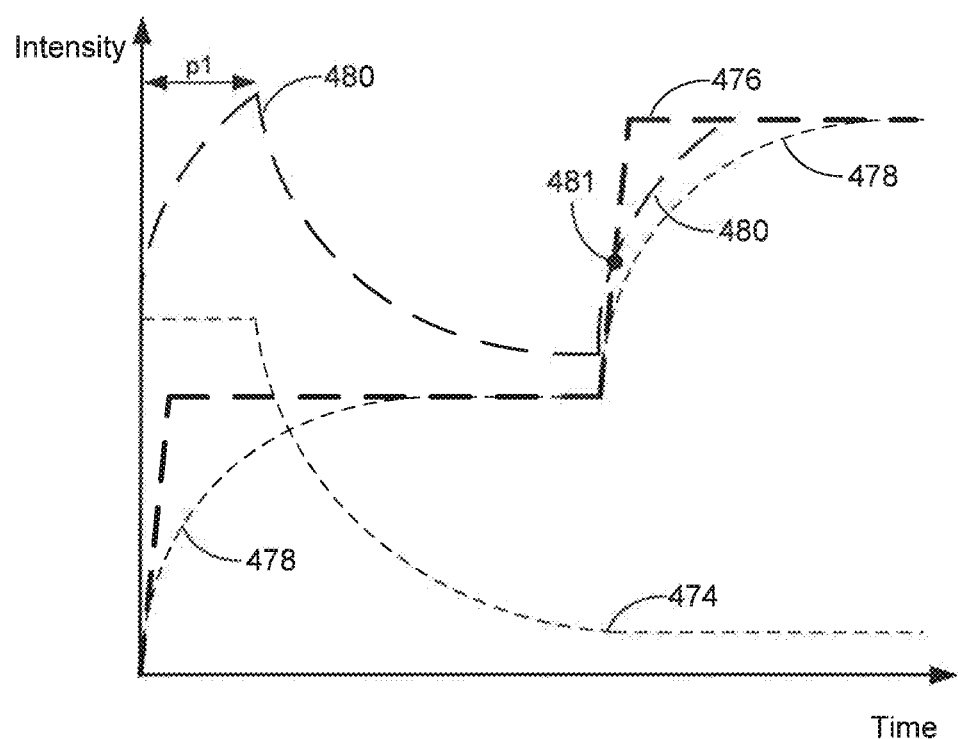
FIGS. 4C-4E illustrate example dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
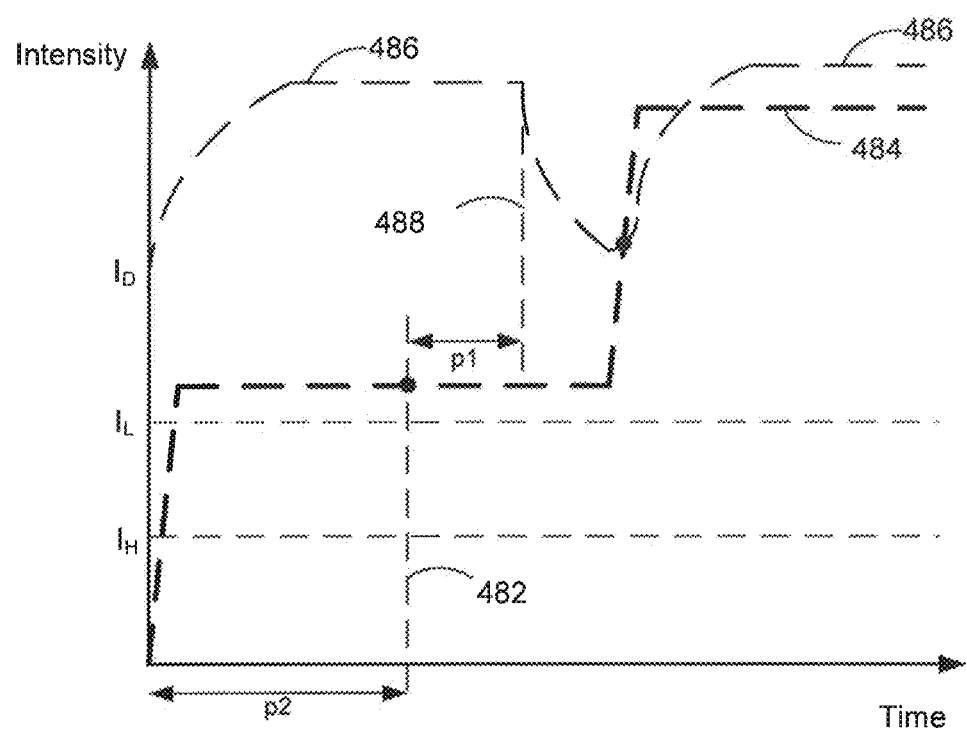

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
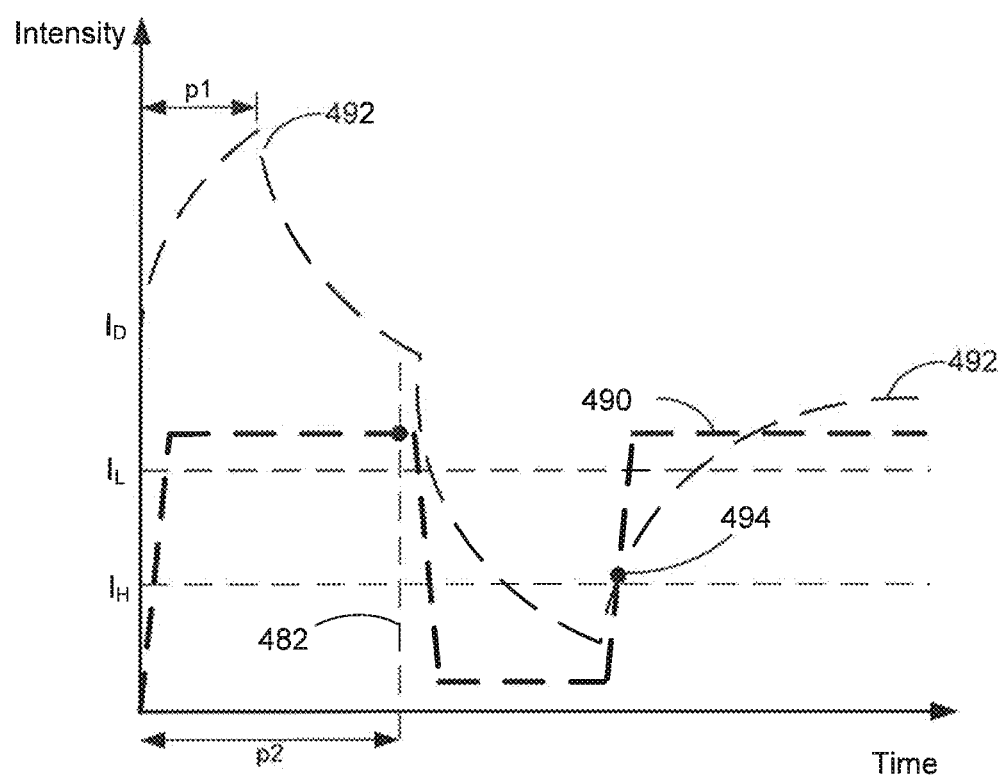

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter,"

where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figures 4, 5A:
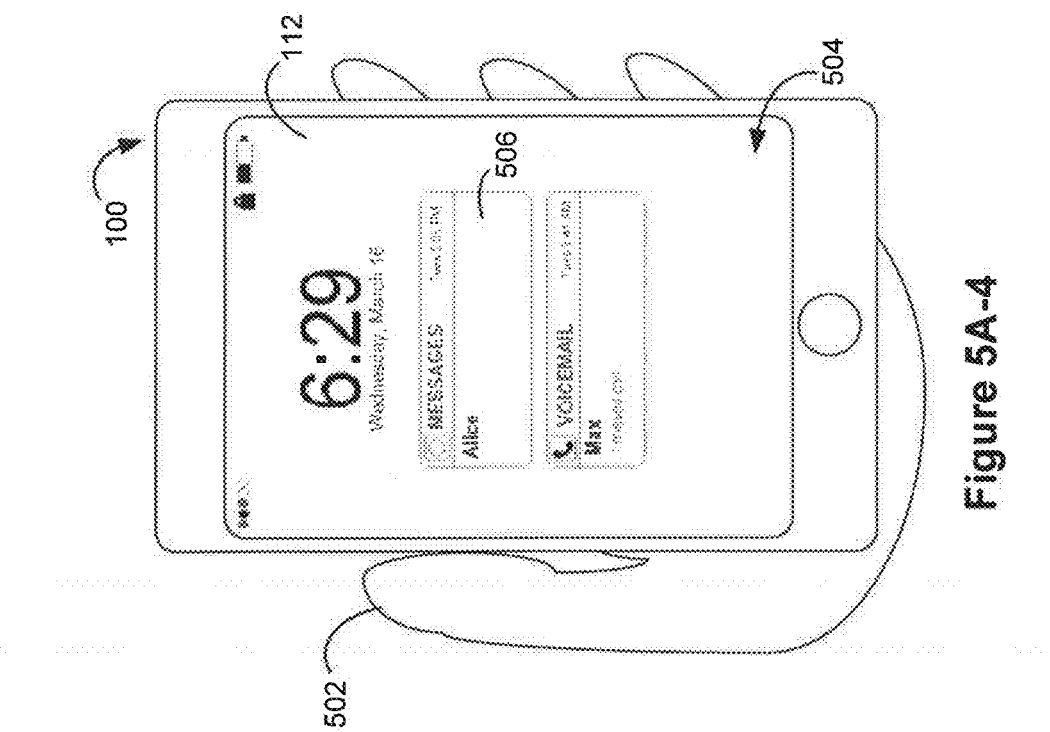
Figures 1, 5A:
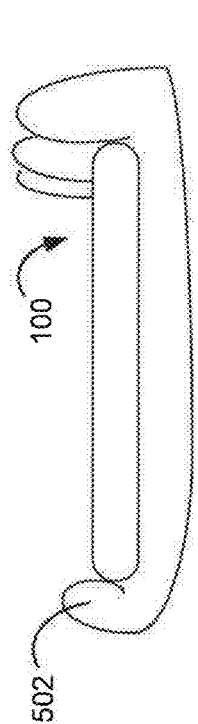
Figures 2, 5A:
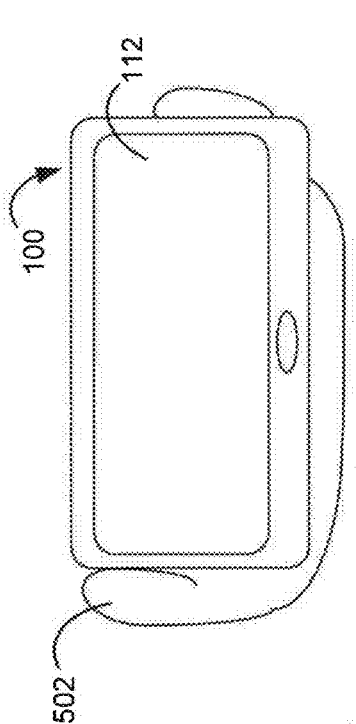
Figures 3, 5A:
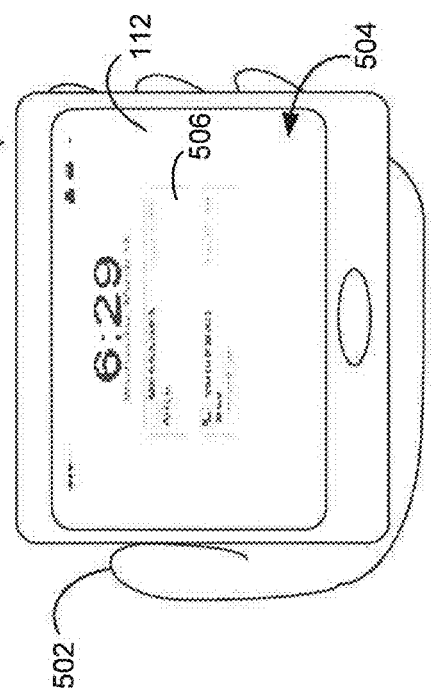
Figure 5B:
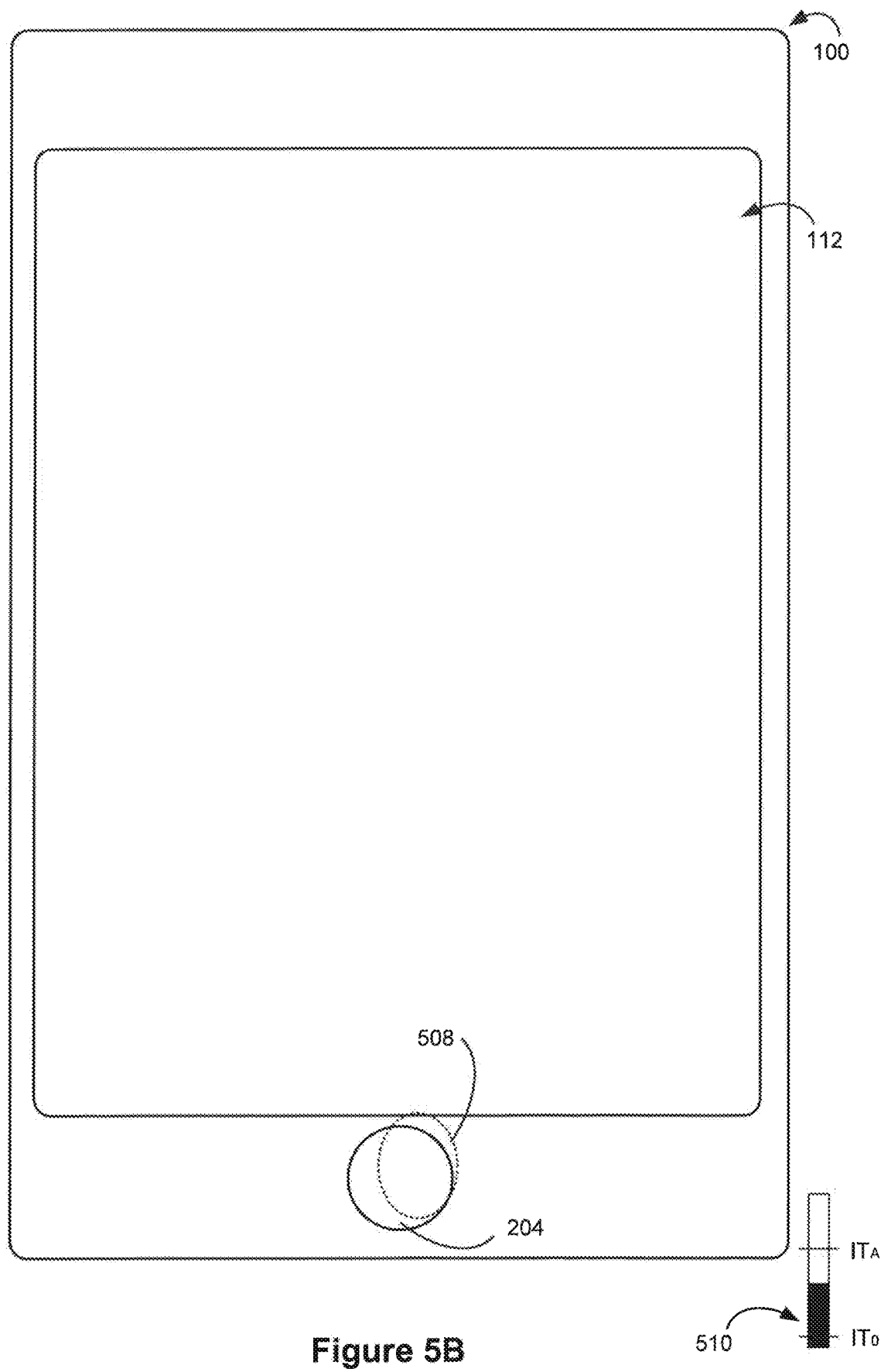

FIGS. 5A-5BJ illustrate exemplary user interfaces for accessing prevalent device functions in accordance with some embodiments. The user interfaces in these figures are used to illustrate the processes described below, including the processes in FIGS. 6A-6E, 7A-7E, 8A-8C, and 9A-9E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-1 to 5A-4 illustrate activation of a display (e.g., touch-sensitive display 112) in response to changing an orientation of device 100. In some embodiments, the device uses one or more sensors (e.g., accelerometer, gyro, audio sensor, heat sensor, and/or light sensor) to determine whether an orientation of the device has changed. For example, the device determines whether the device has been rotated by more than a threshold angle (e.g., rotated along an axis of the device, such as tilted from a position in which the device is substantially horizontal to a position in which the device is substantially vertical). In FIG. 5A-1, the device is held flat in a user's hand 502, such that the device display is substantially horizontal. In FIG. 5A-2, the device is tilted such that the display is more vertical than in FIG. 5A-1. Because a tilt angle of the device has not increased above a threshold tilt angle in FIG. 5A-2, the display is not activated. In FIG. 5A-3, the device is tilted such that the display is more vertical than in FIG. 5A-2. Because a tilt angle of the device has increased above a threshold tilt angle in FIG. 5A-3, the display is activated (e.g., display content 504 is displayed by the display). Display content 504 includes, e.g., a time, a date, a signal indicator, a battery charge level indicator, a lock indicator, and/or one or more notifications (such as notification 506). In FIG. 5A-4, the display is substantially vertical. In some embodiments, when the display is activated (e.g., as shown at 5A-3), part or all of the display content 504 is shown with a smaller size (e.g., a narrower width) than a default size of display content 504. As the device continues tilting after the display is activated, the display content 504 gradually increases in size to a default size as shown in FIG. 5A-4.

Figure 5C:
Figure 5D:
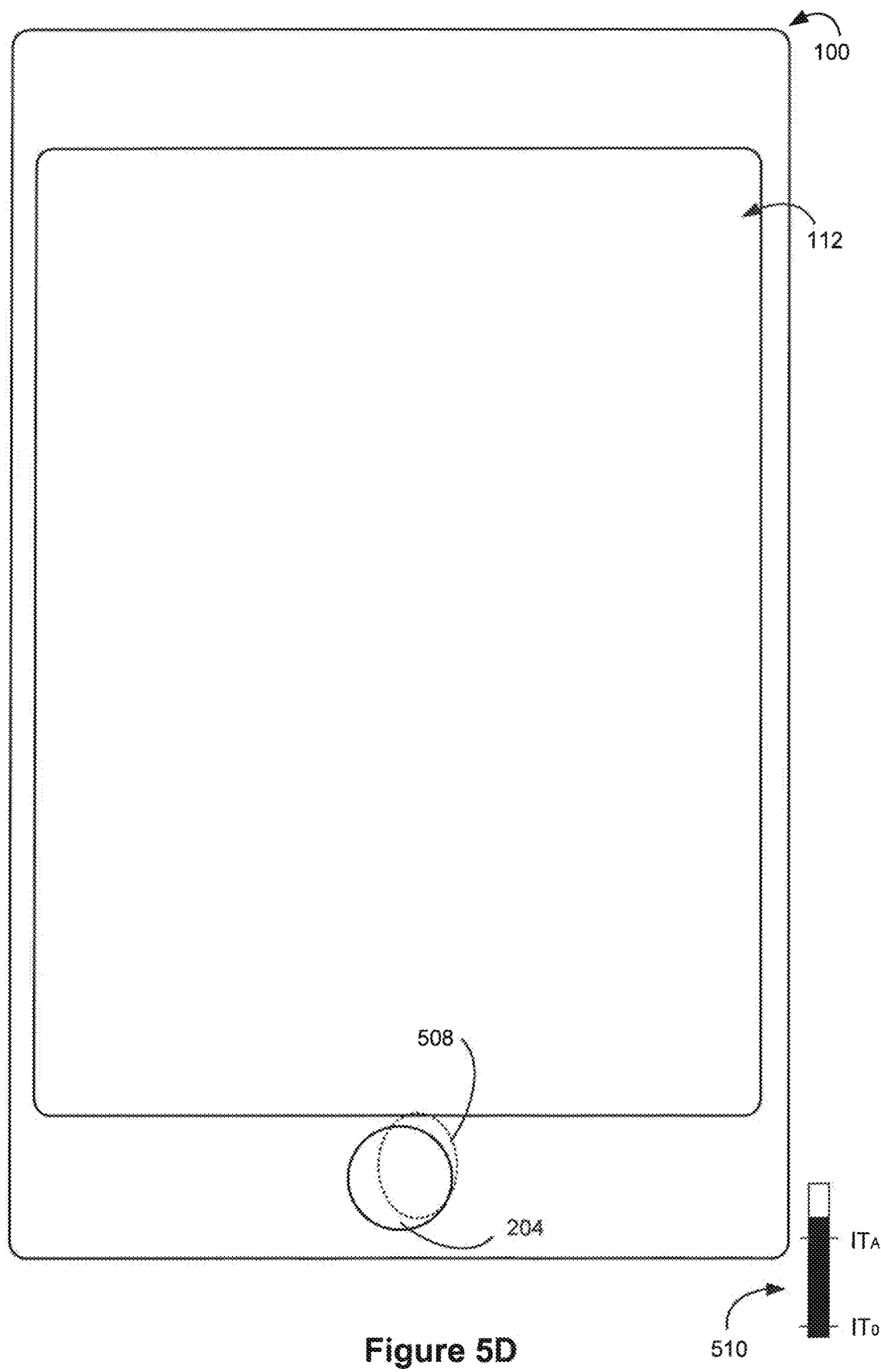
Figure 5E:
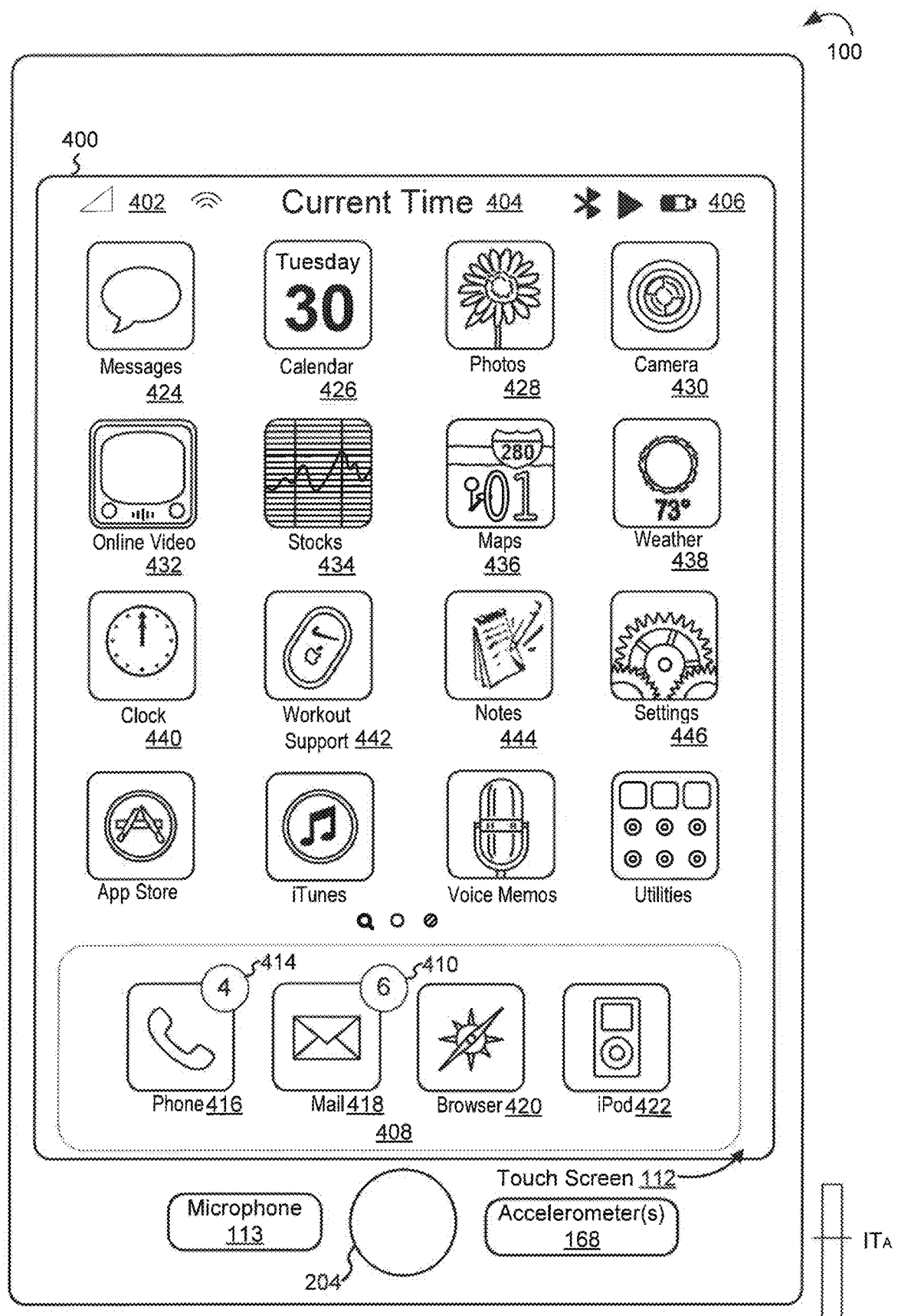

FIGS. 5C-5E illustrate user interfaces that are displayed in response to input provided by a contact 508 at a physical button 204 (e.g., "home" or menu button). In FIG. 5B, physical button 204 detects a contact 508 that activates but does not actuate the physical button (e.g., when the contact 508 is resting on the surface of the physical button without depressing the physical button). For example, the physical button is activated (but not actuated) in accordance with a detection of a contact 508 at physical button 204 that does not meet criteria to actuate physical button 204 (e.g., the characteristic intensity of the contact 508 exceeds a contact detection intensity threshold $IT_0$ but does not exceed an actuation threshold $IT_A$, as indicated by actuation meter 510). In some embodiments, activation of the physical button 204 wakes the device and/or the touchscreen display 112. For example, in response to activation of the physical button 204, the device activates the display and displays a wake screen user interface 512 as shown in FIG. 5C. For example, the device is in a wakened (display-on) state but not fully activated in response to input that activates but does not actuate the physical button.

In some embodiments, in response to a contact that meets criteria for actuation of the physical button (e.g., when intensity of contact 508 with physical button 204 exceeds actuation threshold $IT_A$, as indicated by actuation meter 510 of FIG. 5D), device 100 displays a user interface (e.g., an application springboard user interface 400) that includes a plurality of application icons (e.g., application icons 416-446), as shown in FIG. 5E. For example, the device is fully activated in response to an input that actuates the physical button.

In some embodiments, the physical button 204 includes a biometric sensor, such as a fingerprint sensor for a user verification scan (e.g., a TouchID scan). In some embodiments, in accordance with a successful verification of a user via recognition of a fingerprint that corresponds to contact 508 by a biometric sensor of the physical button, activation and/or actuation of the physical button unlocks the device. For example, in response to an activation of the physical button 204 during which a successful verification of a user occurred, an unlocked state of lock icon 514 is displayed in wake screen interface 512 of FIG. 5C.

In some embodiments, device 100 includes a virtual button (e.g., instead of a physical button) that functions as home or menu button 204. Where button 204 is described herein, it will be recognized that a mechanical button, virtual button, or other type of button may be used. For example, the virtual button is activated in accordance with a determination that a characteristic intensity of a contact with the virtual button does not exceed an actuation threshold, and the virtual button is actuated in accordance with a determination that a characteristic intensity of the contact with the virtual button exceeds an actuation threshold. In some embodiments, the virtual button includes a biometric sensor for user verification.

FIGS. 5F-1 to 5F-4 illustrate a sequence of user interfaces that are displayed in response to inputs detected while device 100 is in a locked mode (e.g., as indicated by a locked state of lock icon 514). In FIG. 5F-1, wake screen interface 512 is displayed. In some embodiments, a locked mode of wake screen interface 512 is displayed, e.g., in response to input at a push button 206 for powering the device on/off and locking the device, in response to input at physical button 204 that does not unlock the device (e.g., by a user whose fingerprints are not recognized by a fingerprint scanner of physical button 204), and/or in response to input at a virtual button that activates the device display but does not unlock the device.

FIG. 5F-1 illustrates a downward swipe gesture in which contact 516 moves along a path indicated by arrow 518. In response to the downward swipe gesture, a locked mode of notifications user interface 520 is displayed, as indicated in FIG. 5F-2. In some embodiments, as the downward swipe occurs, an animation is displayed in which the notifications user interface 520 appears to gradually descend from the top of the display.

In response to an input by a contact 522 detected at a location corresponding to search input region 524 of FIG. 5F-2, a user interface 526 with a keyboard 528 is displayed, as shown in FIG. 5F-3.

In FIG. 5F-3, a search term ("movie") has been entered in search input region 524 (e.g., using keyboard 528). In response to an input to initiate a search (e.g., input by a contact 530 detected at an affordance corresponding to the "return" key of keyboard 528), a locked mode of search results user interface 532 is displayed, as indicated in FIG. 5F-4.

A user may wish to restrict information that is displayed on the device when it is locked so that other people are not able to see private and/or sensitive information. In some embodiments, the device is configurable such that particular types of notifications, notification content, and/or search results that are displayed when the device is unlocked are not visible when the device is locked. FIGS. 5F-5 to 5F-8 illustrate additional content that is displayed in an unlocked mode of notifications user interface 520 and search results user interface 532.

FIGS. 5F-5 to 5F-8 illustrate a sequence of user interfaces that are displayed in response to inputs detected while device 100 is in an unlocked mode (e.g., as indicated by an unlocked state of lock icon 514). In some embodiments, an unlocked mode of wake screen interface 512 is displayed, e.g., in response to input at physical button 204 that unlocks the device (e.g., by a user whose fingerprints are recognized by a fingerprint scanner of physical button 204).

FIG. 5F-5 illustrates a downward swipe gesture in which contact 534 moves along a path indicated by arrow 536. In response to the downward swipe gesture, an unlocked mode of notifications user interface 520 is displayed, as indicated in FIG. 5F-6.

In response to an input by a contact 538 detected at a location corresponding to search input region 524 of FIG. 5F-6, a user interface 526 with a keyboard 528 is displayed, as shown in FIG. 5F-7.

In FIG. 5F-7, a search term ("movie") has been entered in search input region 524 (e.g., using keyboard 528). In response to an input to initiate a search (e.g., input by a contact 540 detected at an affordance the "return" key of keyboard 528), an unlocked mode of search results user interface 532 is displayed, as indicated in FIG. 5F-8.

Figure 5G:
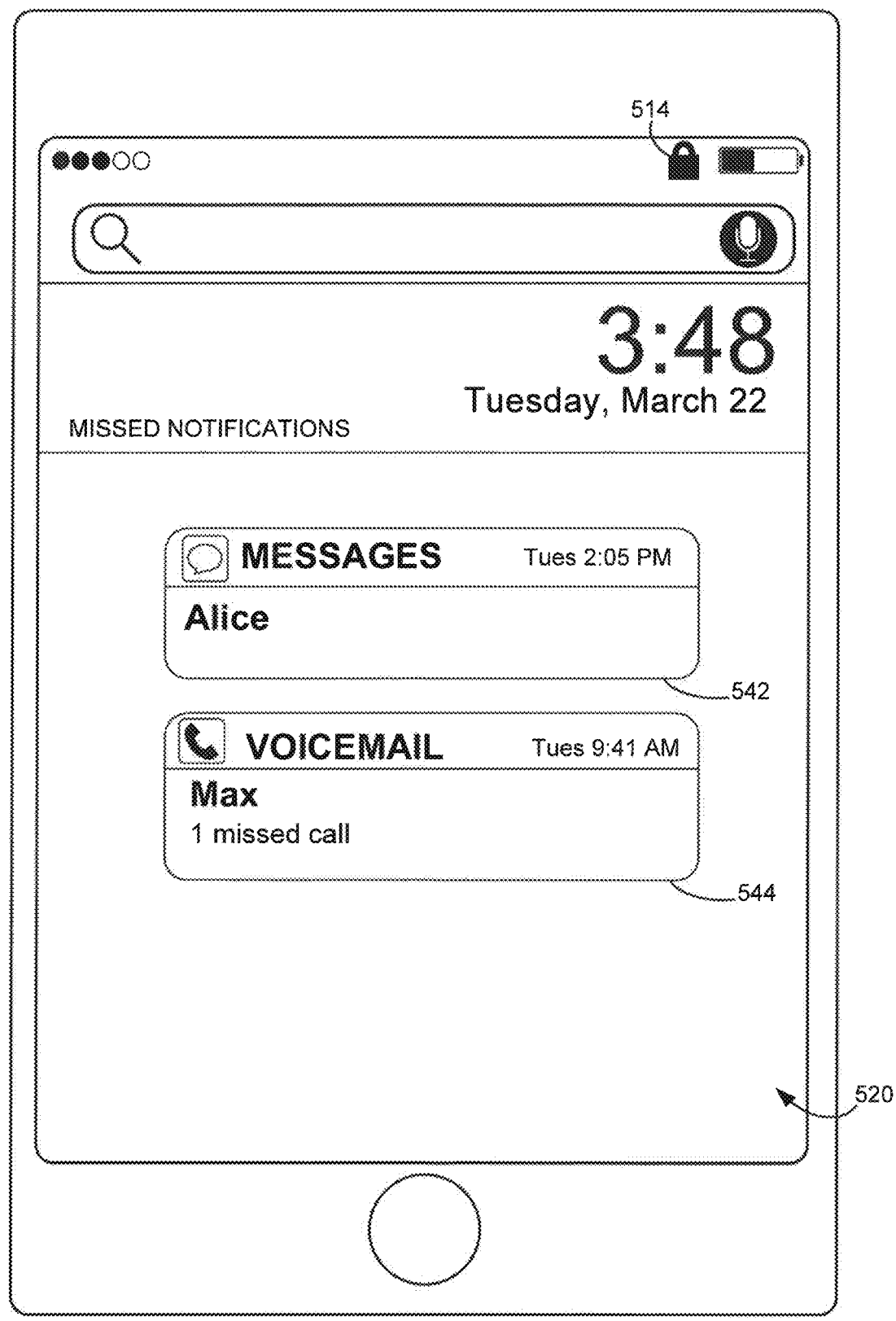

FIG. 5G illustrates the locked mode of notifications user interface 520 (e.g. as indicated by the locked state of lock icon 514). A locked mode of message notification 542 and a locked mode of voicemail notification 544 are displayed in the locked mode of notifications user interface 520.

Figure 5H:
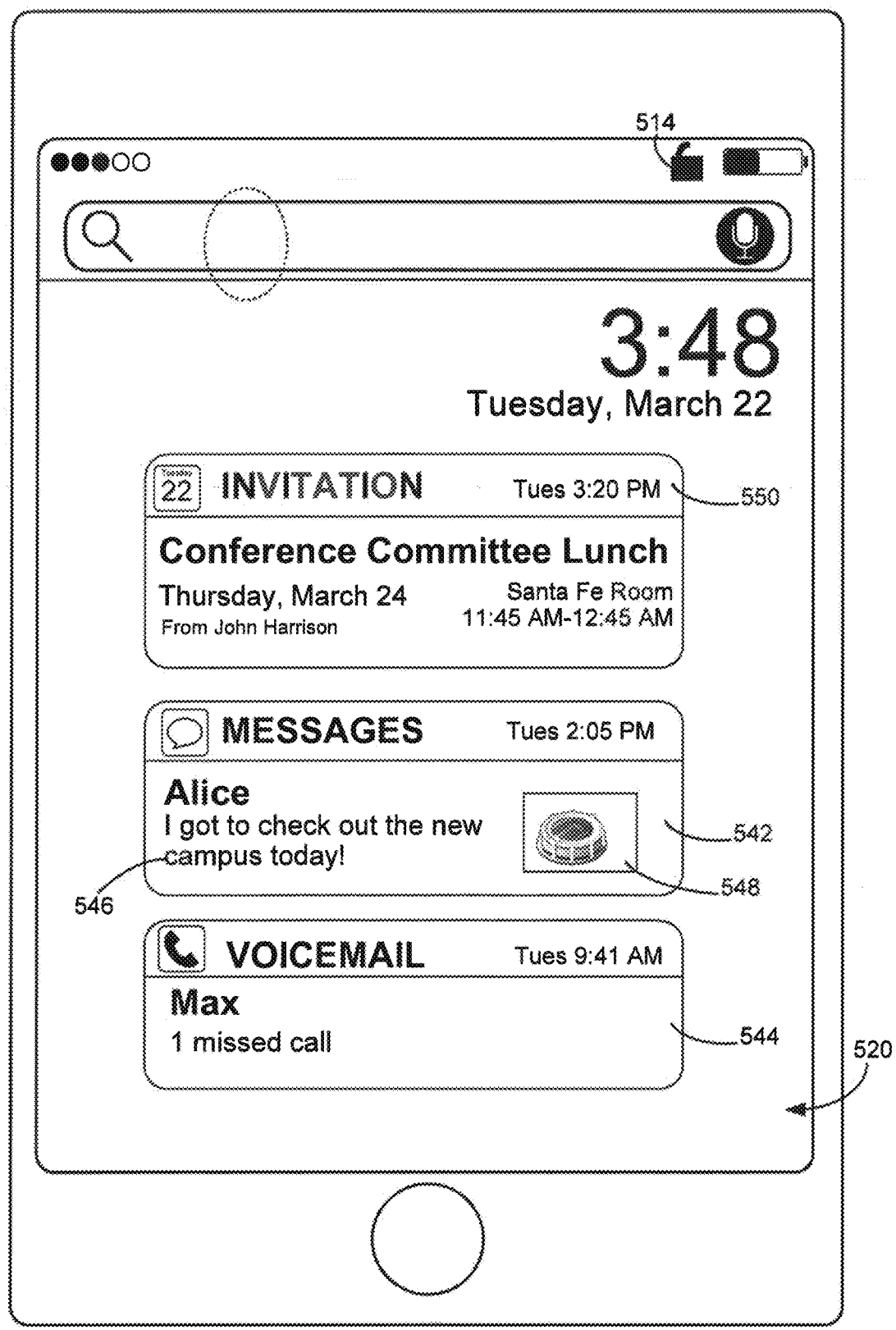

FIG. 5H illustrates the unlocked mode of notifications user interface 520 (e.g. as indicated by the unlocked state of lock icon 514). An unlocked mode of message notification 542 and unlocked mode of voicemail notification 544 are displayed in the unlocked mode of notifications user interface 520. Compared with the locked mode of message notification 542, the unlocked mode of message notification 542 includes additional information, such as message content (e.g., text 546 and/or image 548 from one or more messages). The unlocked mode of notifications user interface 520 displays invitation notification 550 that is not displayed in the locked mode of notifications user interface 520.

Figure 5I:
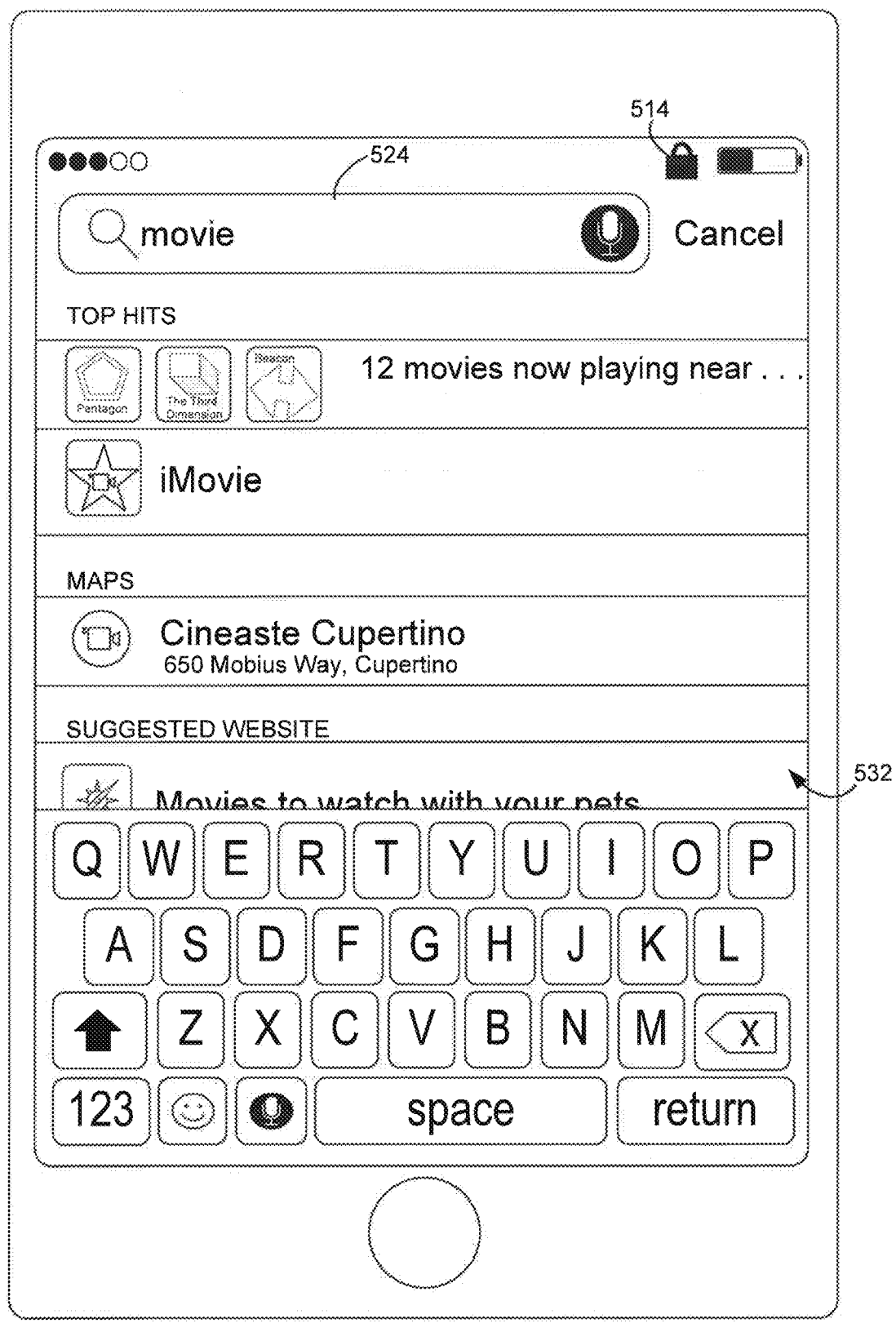

FIG. 5I illustrates the locked mode of search results user interface 532 (e.g. as indicated by the locked state of lock icon 514). The search results displayed in the locked mode of search results user interface 532 for the search term "movies" entered in search input region 524 include, e.g., location-based results (e.g., suggested movies playing near the location of the device, a location suggestion for a movie theater near the location of the device), application results (iMovie), and suggested website results.

Figure 5J:
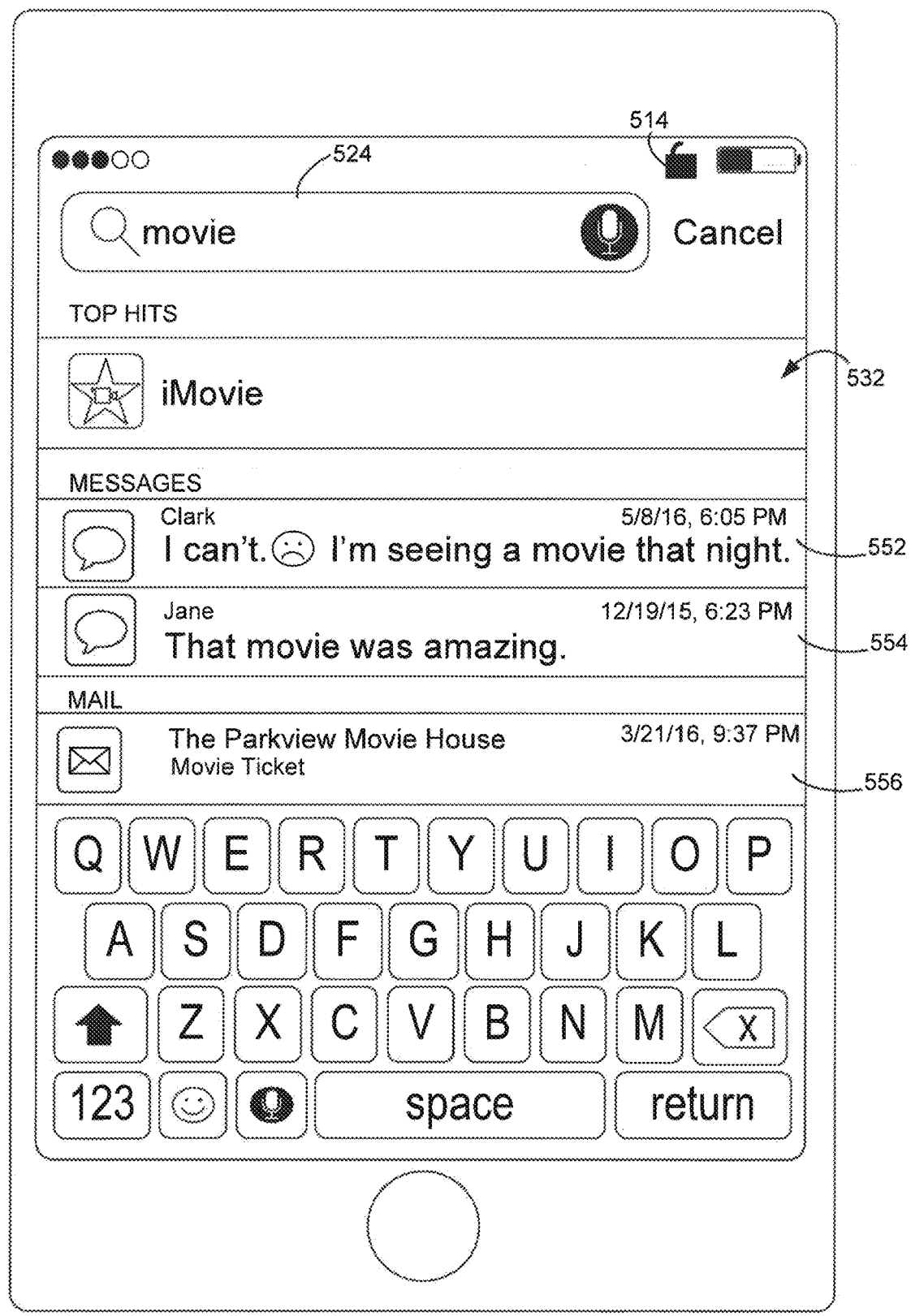

FIG. 5J illustrates the unlocked mode of search results user interface 532 (e.g. as indicated by the unlocked state of lock icon 514). The unlocked mode of notifications user interface 532 displays messages 552 and 554 and e-mail 556 that are not displayed in the locked mode of search results user interface 532.

Figure 5K:
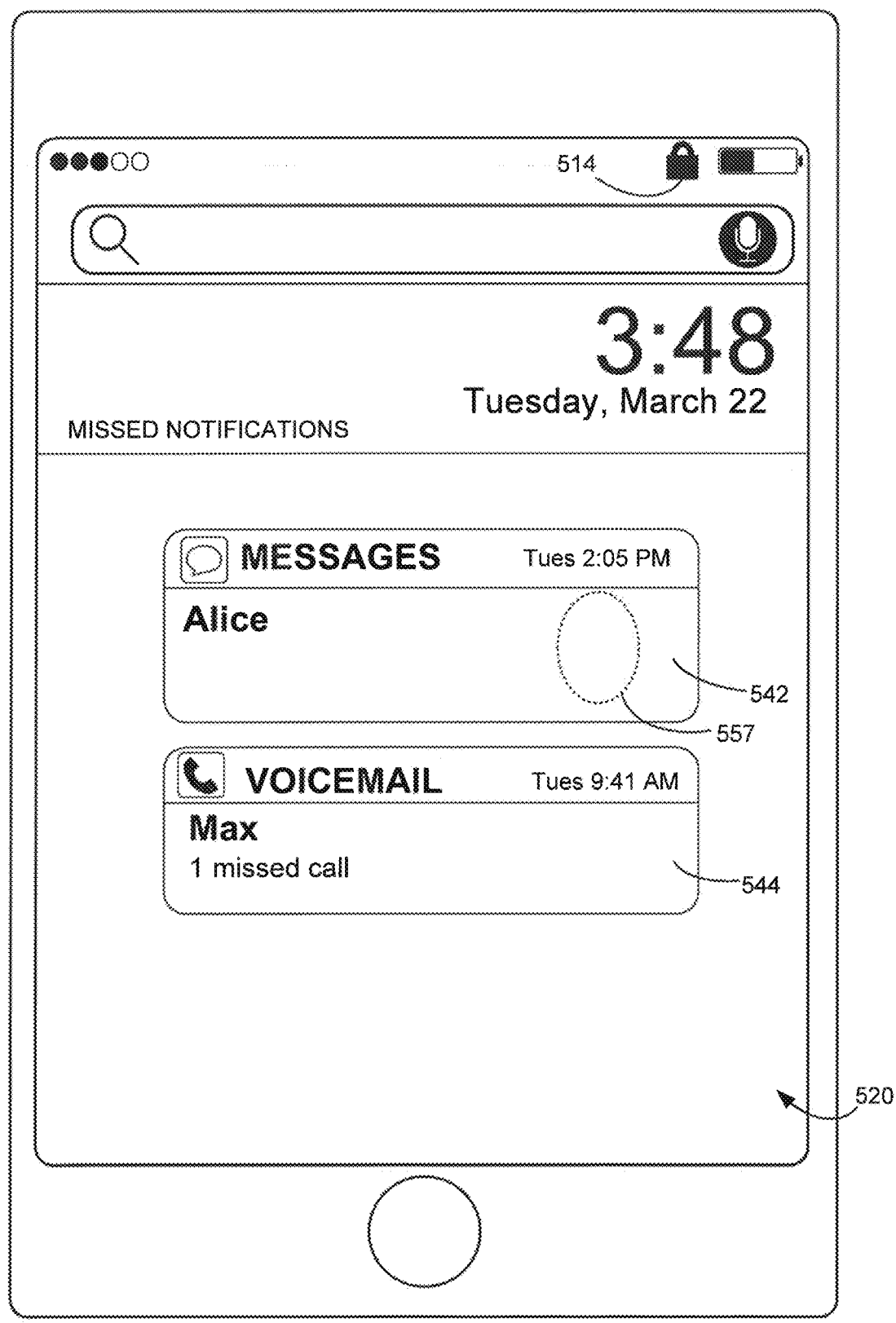
Figure 5L:
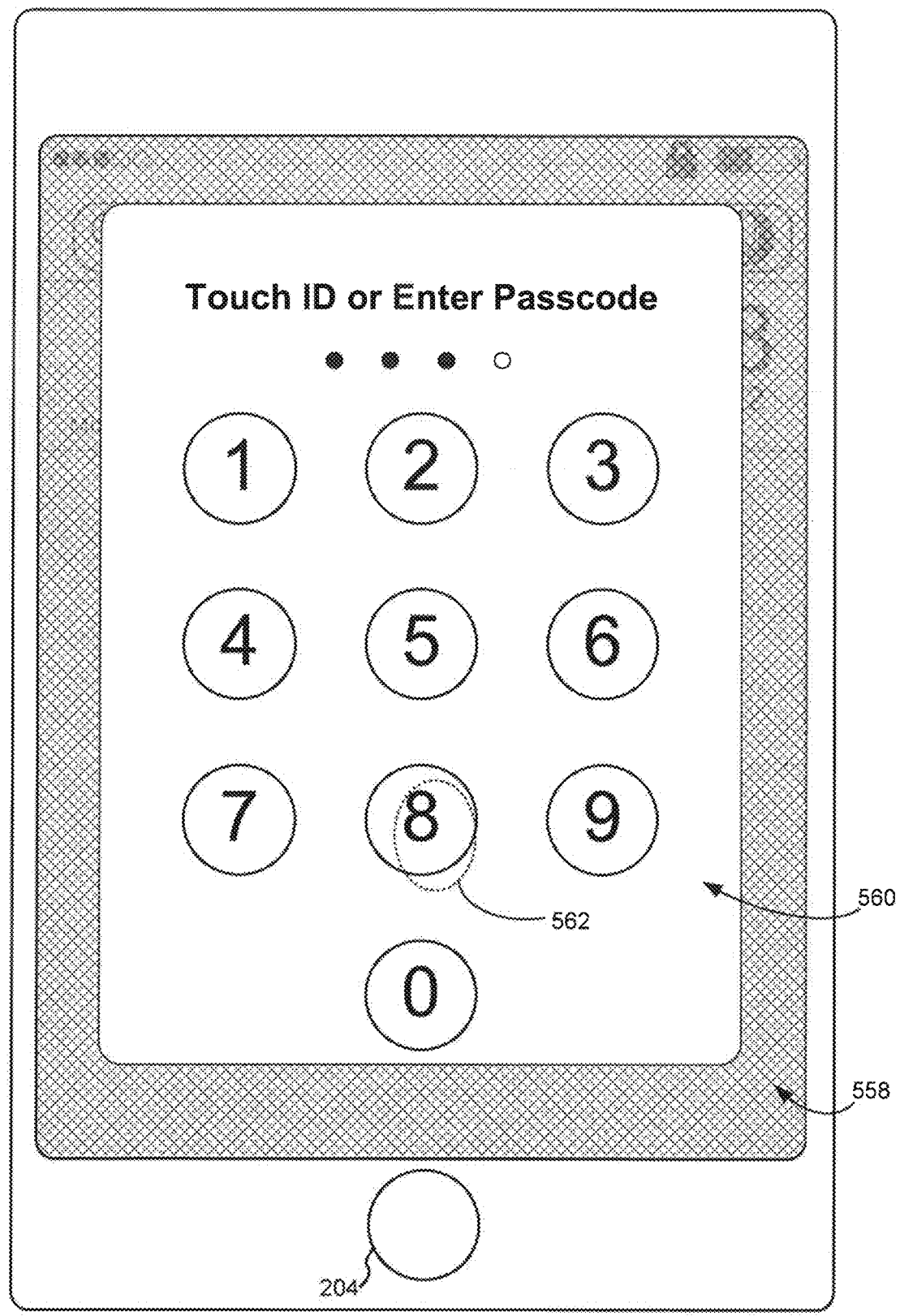
Figure 5M:
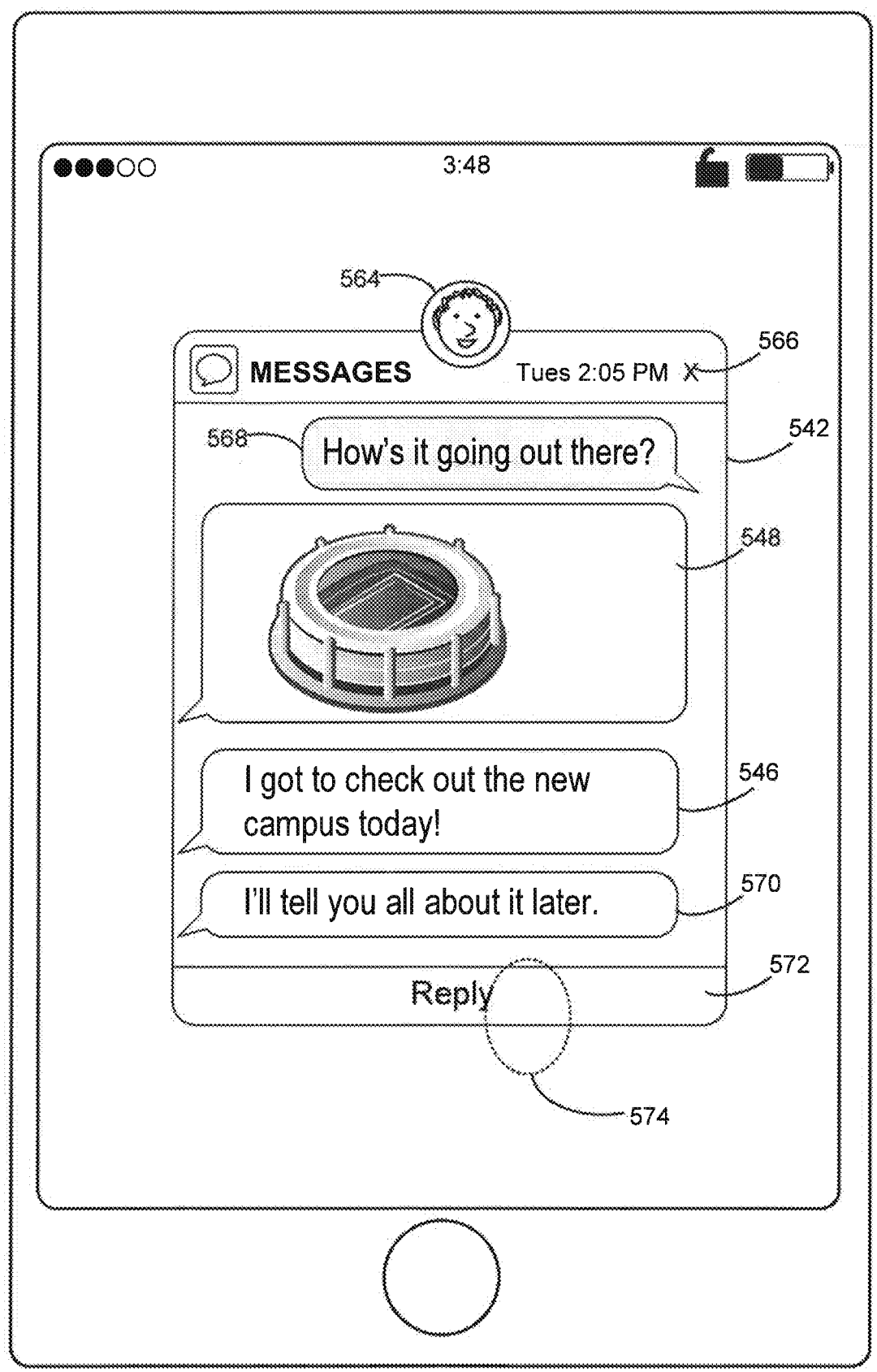

FIGS. 5K-5N illustrate a sequence in which, in response to input received at a locked mode of message notification 542, a user is prompted to provide a password to view an expanded view of message notification 542. In FIG. 5K, an input is provided by contact 557 for expanding message notification 542. Because the device is in a locked mode (as indicated by the locked state of lock icon 514), user verification is required before the expanded view of message notification 542 is shown. FIG. 5L illustrates a user verification prompt user interface 558 that includes a passcode entry interface 560. In accordance with a determination that the user verification information (e.g., provided via input by a contact 562 at passcode entry interface 560 and/or a fingerprint sensor of physical button 204) is valid, an expanded view of notification 542 is displayed, as shown at FIG. 5M.

In some embodiments, the expanded view of notification 542 includes, e.g., message sender avatar 564 (and/or a name of the message sender), an affordance 566 for dismissing the notification (e.g., an "X" affordance), message content (e.g., a message including image 548 and a message including text 546), and/or contextual conversation information (e.g., message 568 that precedes message 548 in a conversation transcript). In some embodiments, as new messages are received in a conversation, the expanded view of message notification 542 is updated to display the new messages (e.g., new message 570 is displayed in message notification 542). In some embodiments, the expanded view of message notification 542 includes an affordance 572 for displaying a reply view of message notification 542 (e.g., in response to an input received by contact 574, such as a tap input at a location that corresponds to affordance 572 for displaying a reply view).

Figure 5N:
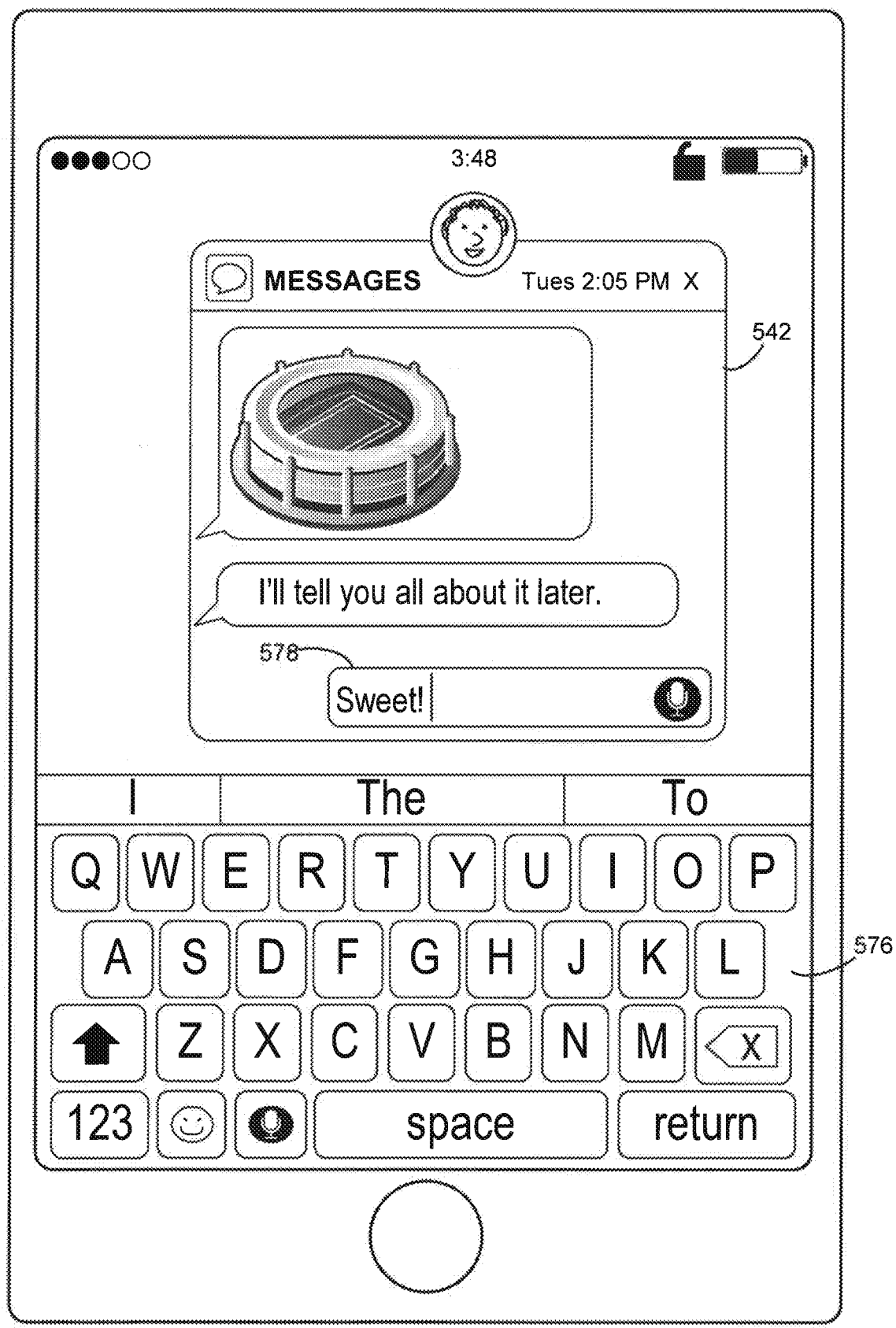

FIG. 5N illustrates a reply view of message notification 542 that enables a user to reply to a message within a notification (e.g., without navigating from a notification user interface to a messaging application user interface). When the reply view of message notification 542 is displayed, keyboard 576 is displayed. Input received at keyboard 576 is displayed in message input area 578 of message notification 542.

Figure 5O:
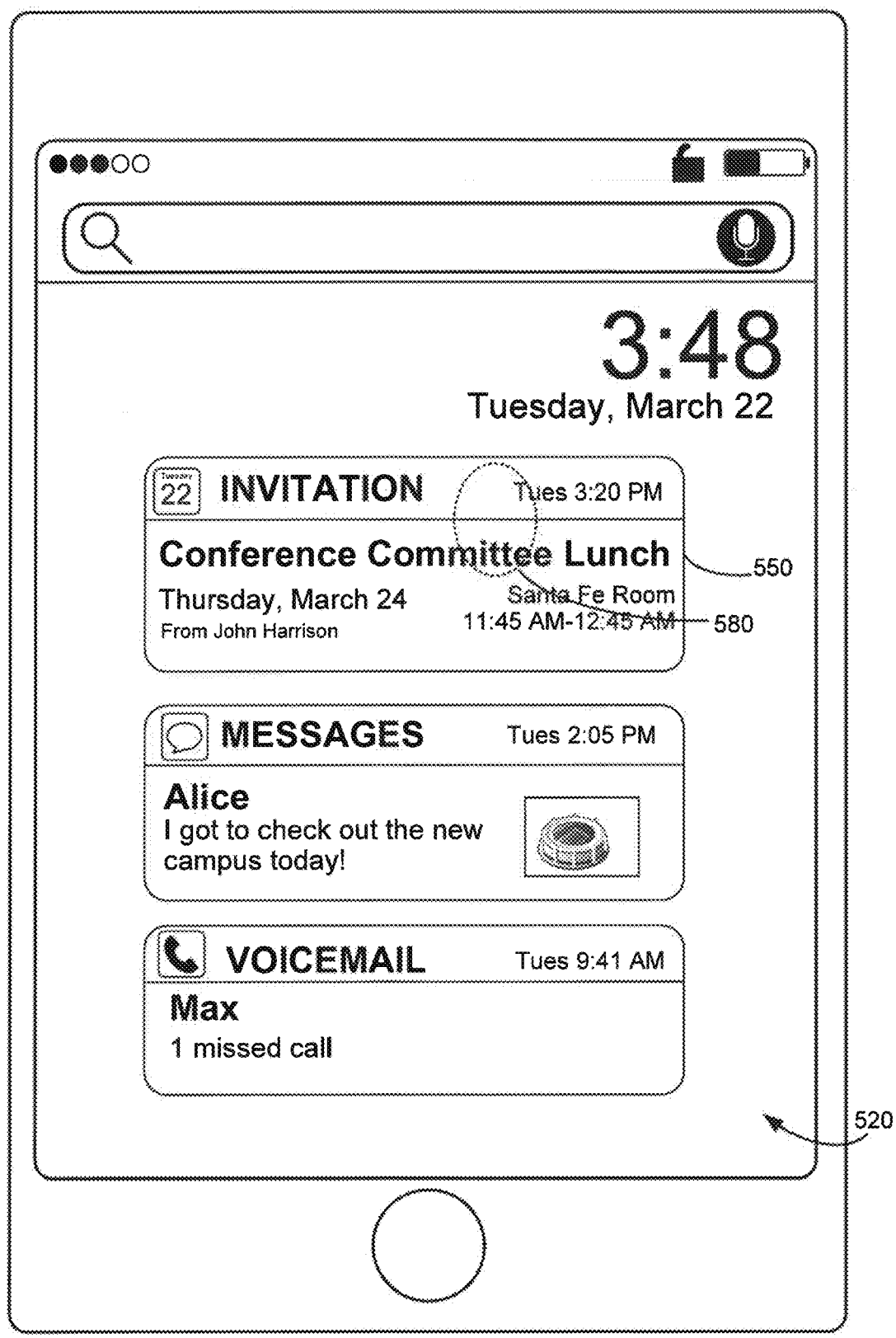
Figure 5P:
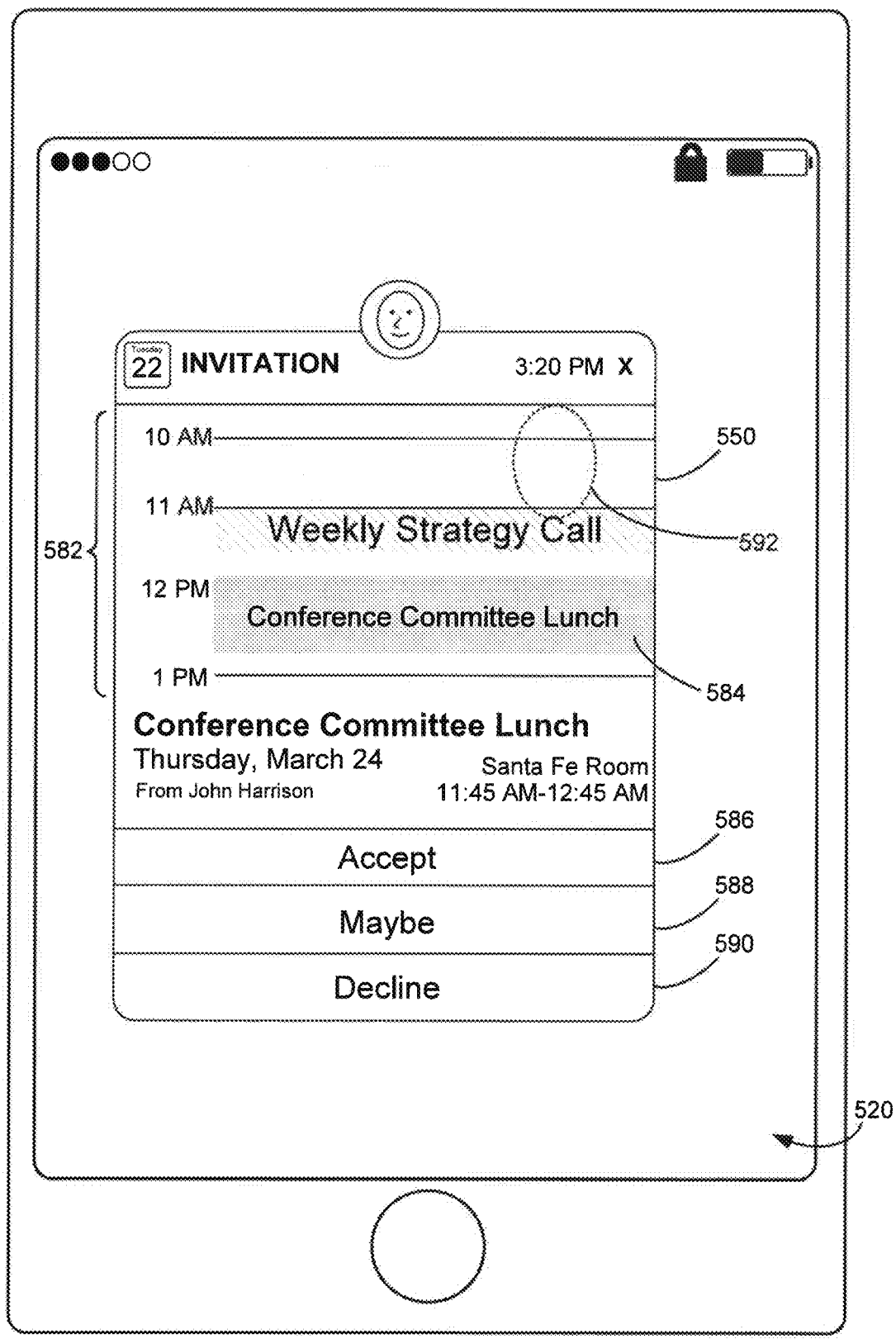
Figure 5Q:
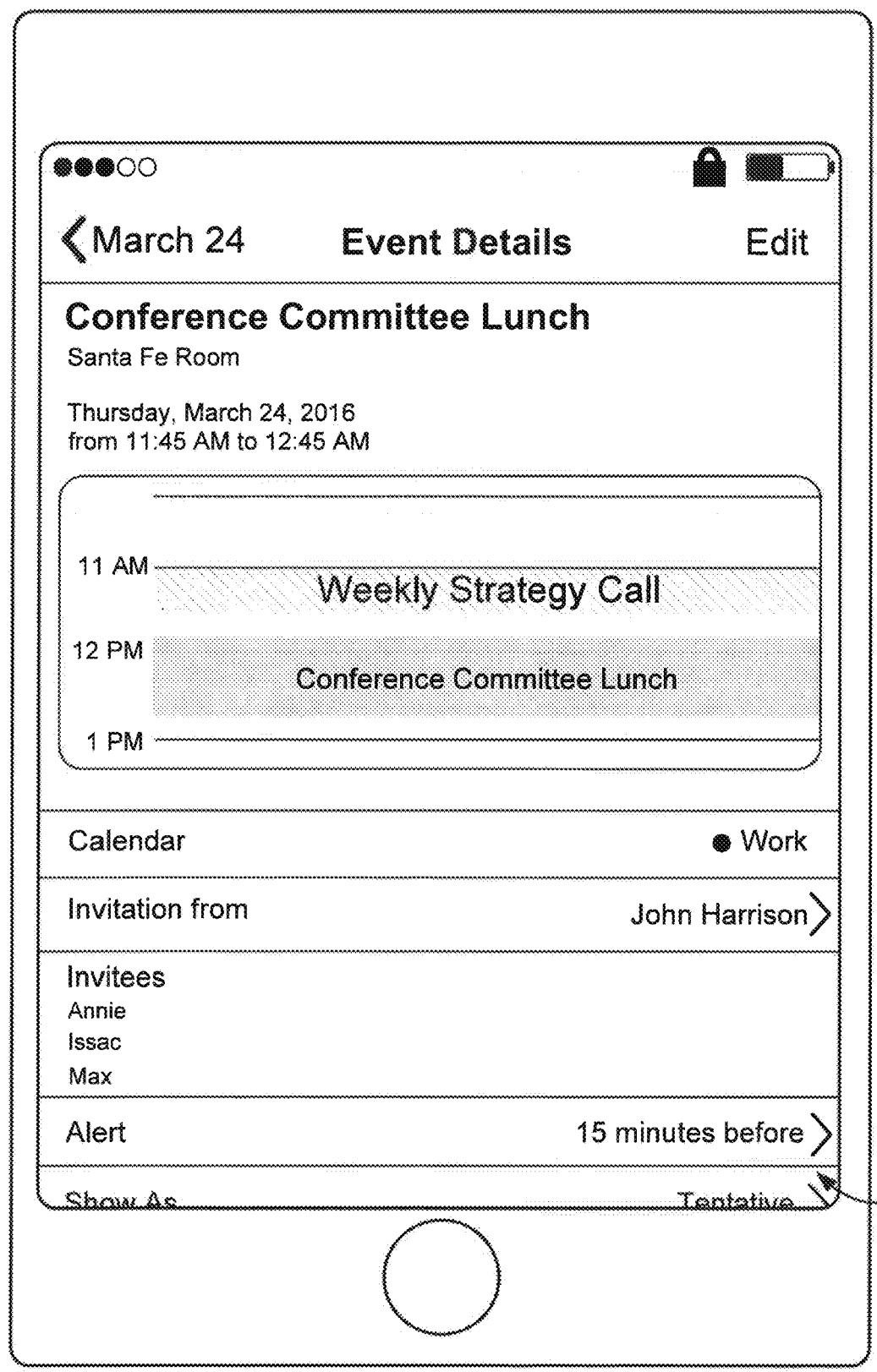

FIGS. 5O-5Q illustrate navigation from calendar invitation message notification 550 to an expanded view of calendar invitation message notification 550 and from the expanded view of calendar invitation message notification 550 to calendar application user interface 594. In FIG. 5O, an input by contact 580 is received at a location that corresponds to invitation message notification 550 in the unlocked view of notifications user interface 520. In response to detecting the input, the device displays an expanded view of calendar invitation message notification 550, as shown in FIG. 5P. The expanded view of calendar invitation message notification 550 includes contextual calendar information 582 for the event 584 that corresponds to the invitation and an action item menu including action items 586 ("Accept"), 588 ("Maybe"), and 590 ("Decline"). An input by a contact 592 is received at a location that corresponds to calendar invitation message notification 550. In response to detecting the input, the device displays a calendar application user interface 594 (e.g., an event details page for the event 584 that corresponds to the invitation, as shown in FIG. 5Q).

Figures 1, 5R:
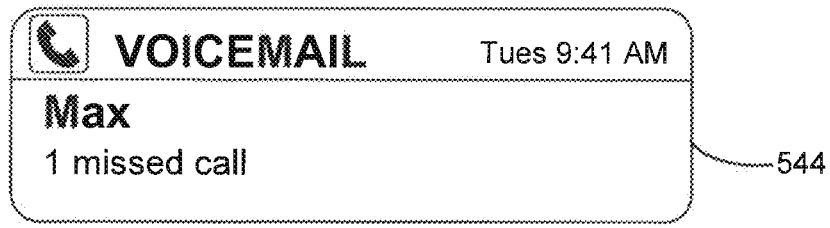
Figures 2, 5R:
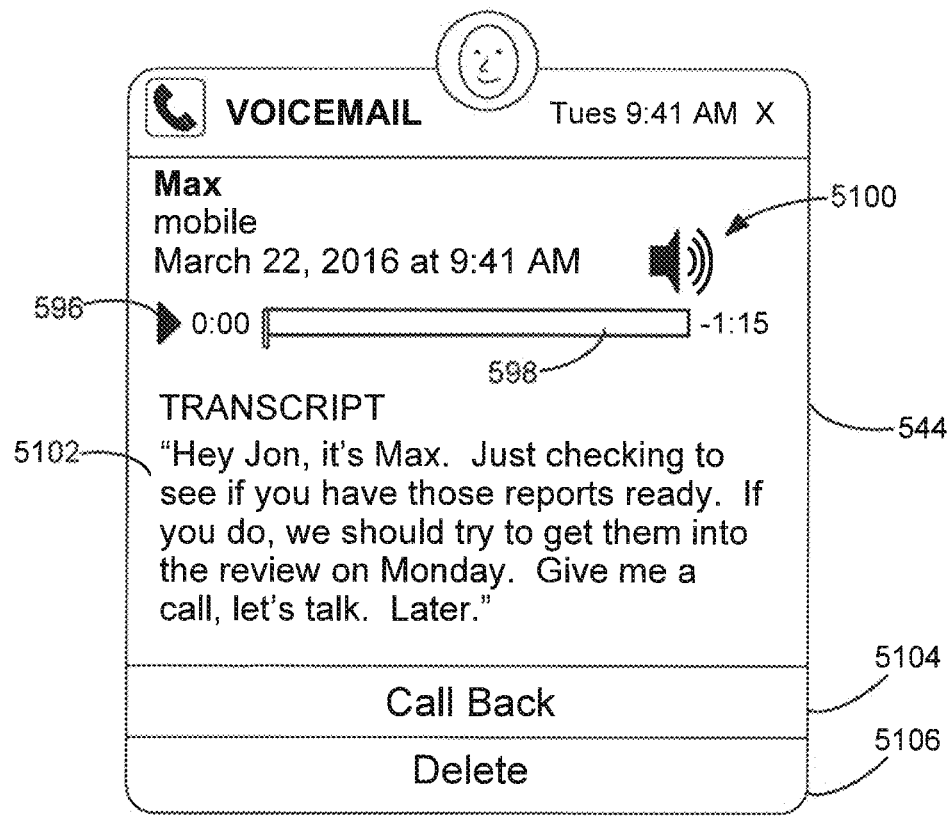

FIG. 5R-1 shows a voicemail notification 544. FIG. 5R-2 shows an expanded view of the voicemail notification 544. The expanded view of the voicemail notification 544 includes, e.g., playback controls for playing back the voicemail audio (such as play/pause control 596, playback position slider 598, and/or volume control 5100), a transcript 5102 of the voicemail (e.g., that is automatically generated by the device based on the voicemail audio), and/or an action item menu including action items 5104 ("Call Back") and 5106 ("Delete").

Figures 1, 5S:
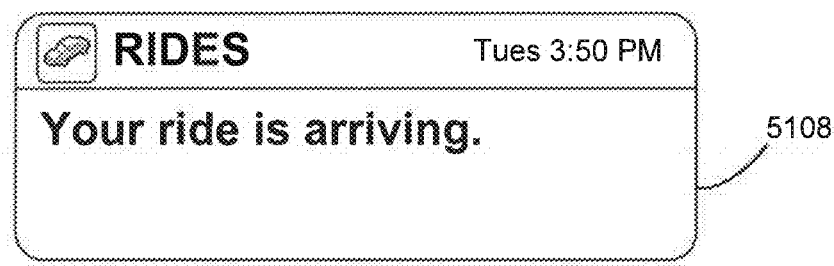
Figures 2, 5S:
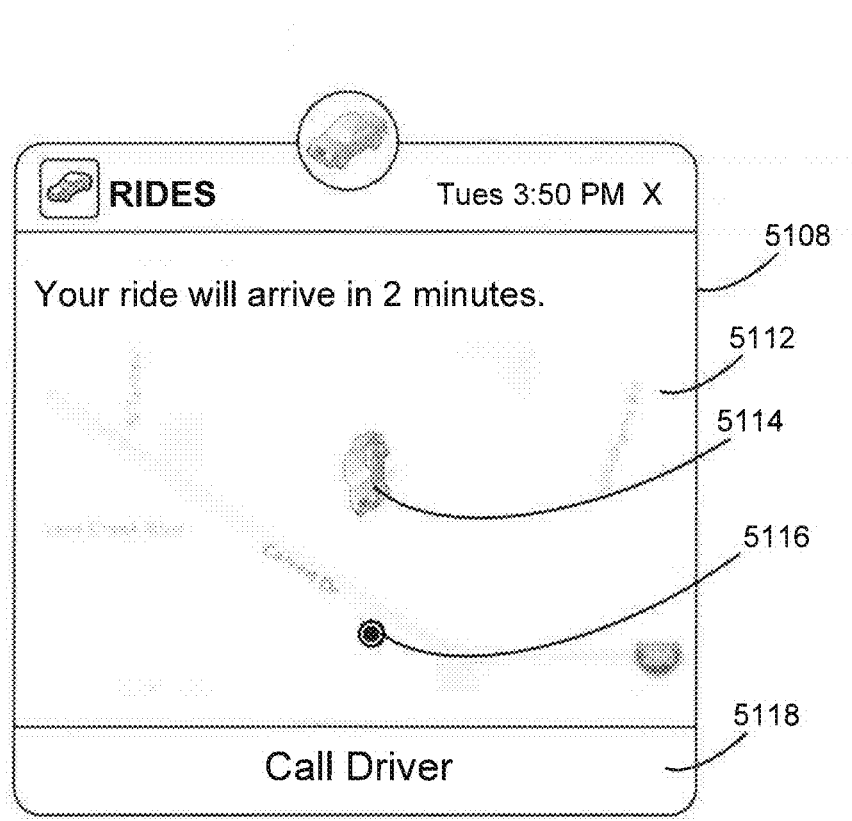

FIG. 5S-1 shows a notification 5108 for another exemplary application (e.g., a driving service application). FIG. 5S-2 shows an expanded view of notification 5108. The expanded view of notification 5108 includes, e.g., a map 5112 and/or action item 5118 ("Call Driver"). In some embodiments, the map 5112 includes content that is updated in real-time and/or near real-time. For example, a representation 5114 of a real-time location of a car is displayed on map 5112 relative to a representation 5116 of a destination of the car. As the car moves, the representation 5114 of the car is updated to reflect the movement of the car.

Figures 2, 5T:
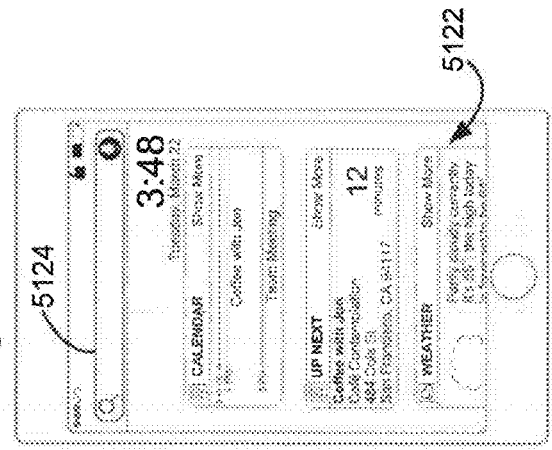
Figures 4, 5T:
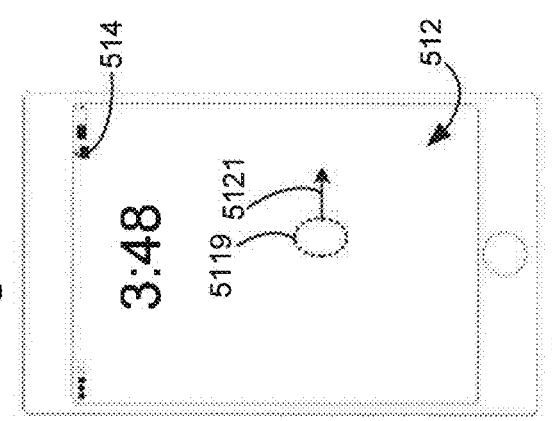
Figures 1, 5T:
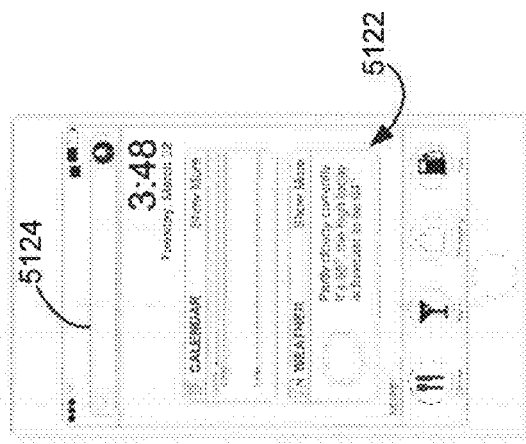
Figures 3, 5T:
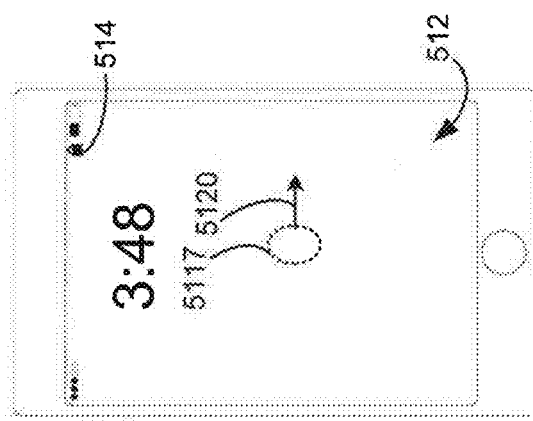

FIGS. 5T-1 to 5T-2 illustrate a sequence of user interfaces that are displayed in response to an input detected while device 100 is in a locked mode. In FIG. 5T-1, wake screen interface 512 is displayed in a locked mode, as indicated by the locked state of lock icon 514.

FIG. 5T-1 illustrates a rightward swipe gesture in which contact 5117 moves along a path indicated by arrow 5120. In response to the rightward swipe gesture, a locked mode of mini applications user interface 5122 is displayed, as indicated in FIG. 5T-2. In some embodiments, as the rightward swipe occurs, an animation is displayed in which the notifications user interface 520 appears to gradually slide rightward from the left side of the display.

In some embodiments, mini-applications user interface 5122 includes a search input region 5124. In response to an input received at search input region 5124, a locked mode of search results user interface is displayed (e.g., similar to search results user interface 532 as illustrated in FIGS. 5F-4 and 5I).

FIGS. 5T-3 to 5T-4 illustrate a sequence of user interfaces that are displayed in response to an input detected while device 100 is in an unlocked mode. In FIG. 5T-3, wake screen interface 512 is displayed in an unlocked mode, as indicated by the unlocked state of lock icon 514.

FIG. 5T-3 illustrates a rightward swipe gesture in which contact 5119 moves along a path indicated by arrow 5121. In response to the rightward swipe gesture, an unlocked mode of mini applications user interface 5122 is displayed, as indicated in FIG. 5T-2. In response to an input received at search input region 5124, an unlocked mode of search results user interface is displayed (e.g., similar to search results user interface 532 as illustrated in FIGS. 5F-8 and 5J)

Figure 5U:
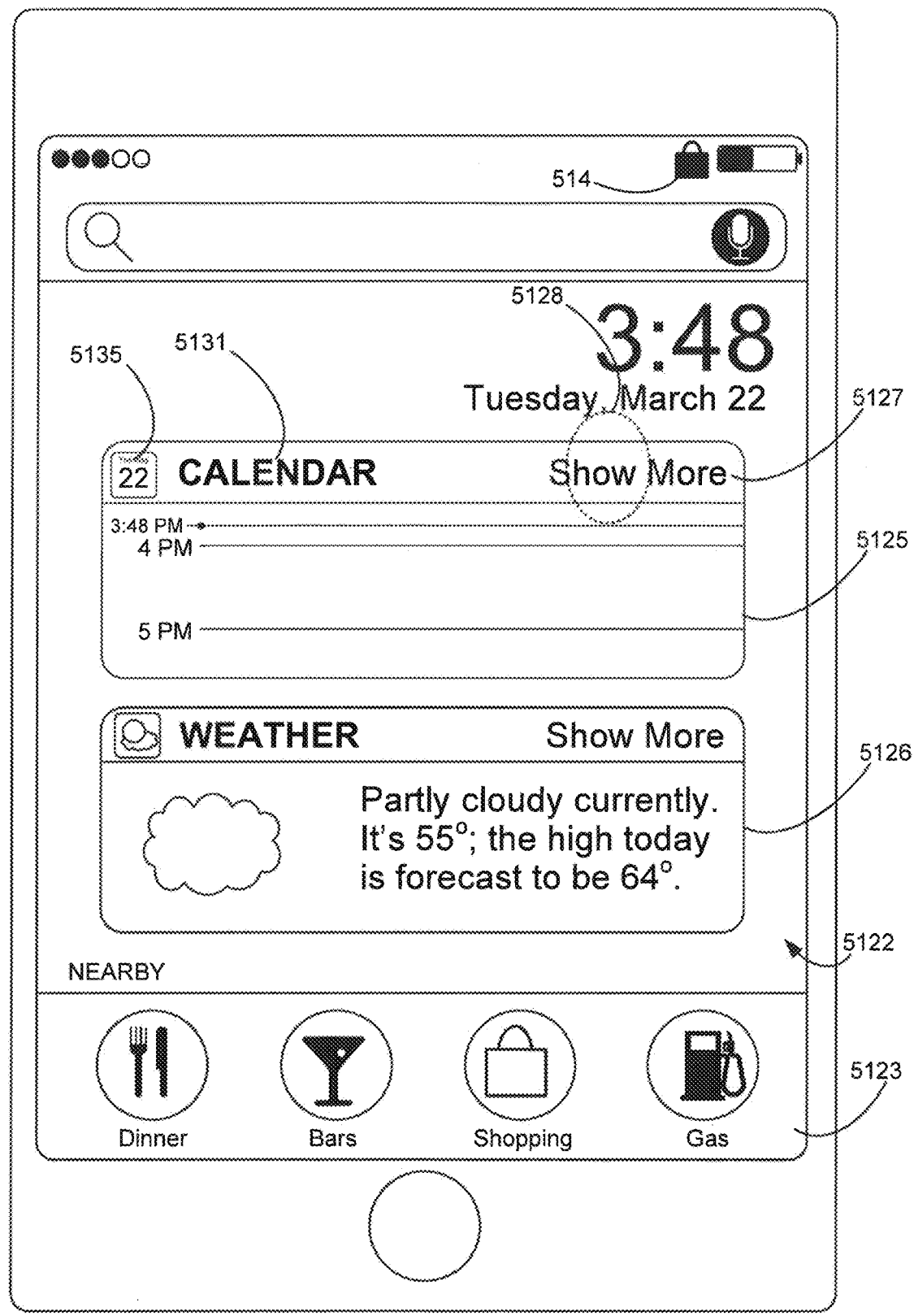

FIG. 5U illustrates the locked mode of mini applications user interface 5122. The locked mode of mini applications user interface displays, e.g., a locked mode of calendar mini application 5125 and/or a locked mode of weather mini applications user interface 5126. In some embodiments, the locked and/or unlocked mode of mini applications user interface 5122 includes information 5123, such as information about points of interest that are in the vicinity of the device 100 (e.g., as determined using GPS and/or Wi-Fi data received by device 100 and/or points of interest data stored and/or accessed by device 100). In some embodiments, calendar mini application 5125 includes an identifier (e.g., text 5131 that identifies the corresponding application and/or an icon 5135 that identifies the corresponding application).

Figure 5V:
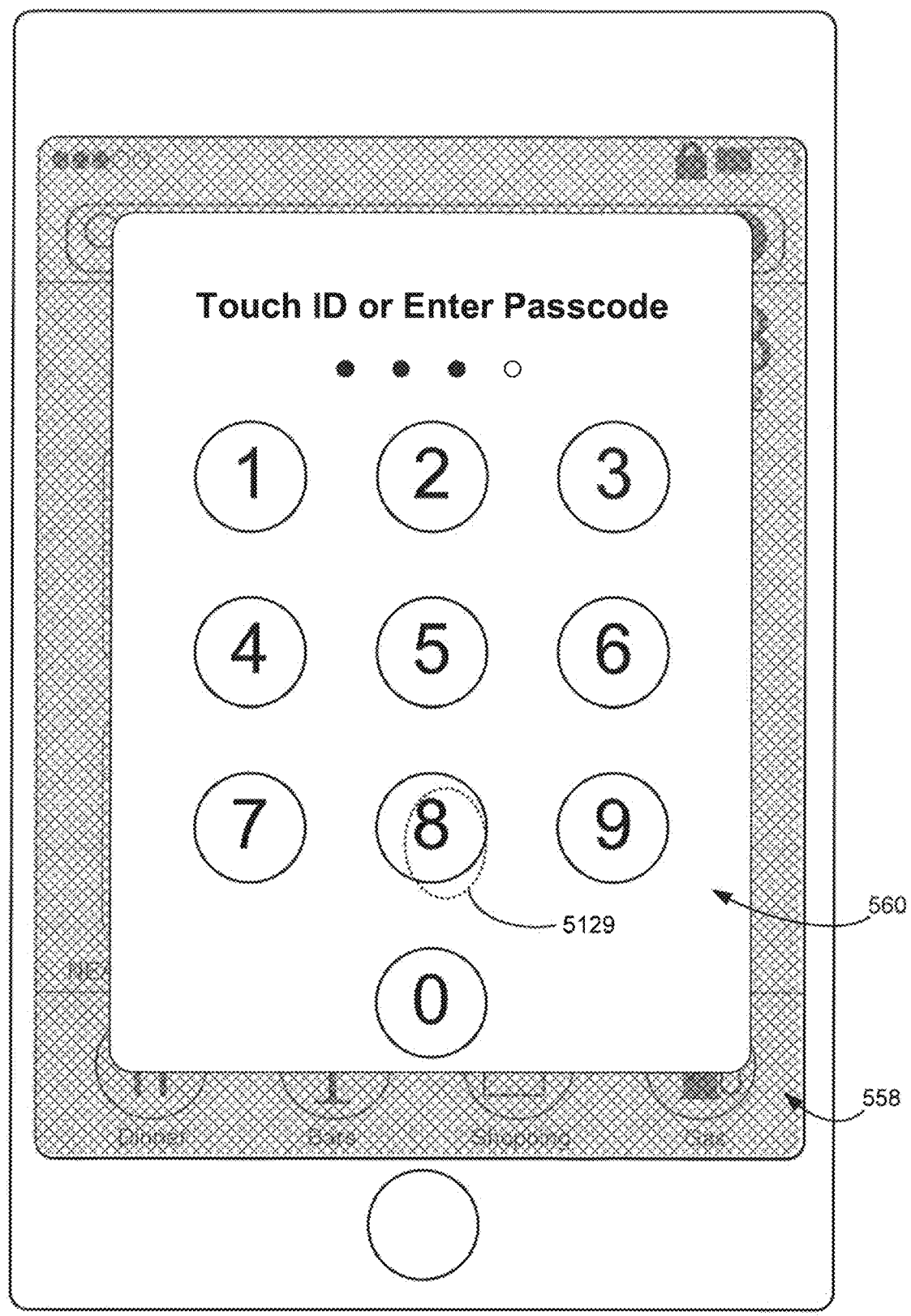
Figure 5W:

In FIG. 5U, an input is provided by contact 5128 at "Show More" affordance 5127 for displaying an expanded view of calendar mini application 5125. Because the device is in a locked mode (as indicated by lock icon 514), user verification is required before the expanded view of mini application 5125 is shown. FIG. 5V is a user verification prompt user interface 558 that includes a passcode entry interface 560. In accordance with a determination that the user verification information (e.g., provided via input by a contact 5129 at passcode entry interface 560 and/or a fingerprint sensor of physical button 204) is valid, an expanded view of mini application 5125 is displayed, as shown at FIG. 5W. In some embodiments, the expanded view of mini application 5125 includes, e.g., an expanded time range (in comparison with the locked view and/or the unlocked view of calendar mini application 5125) and calendar event information (e.g., "Coffee with Jon," "Team Meeting," "Meet Shelby at Shellfish Market") that is not shown in the locked view of calendar mini application 5125. Weather mini application 5126 is adjusted downward in mini applications user interface 5122 to accommodate the expansion of calendar mini application 5125.

Figure 5X:
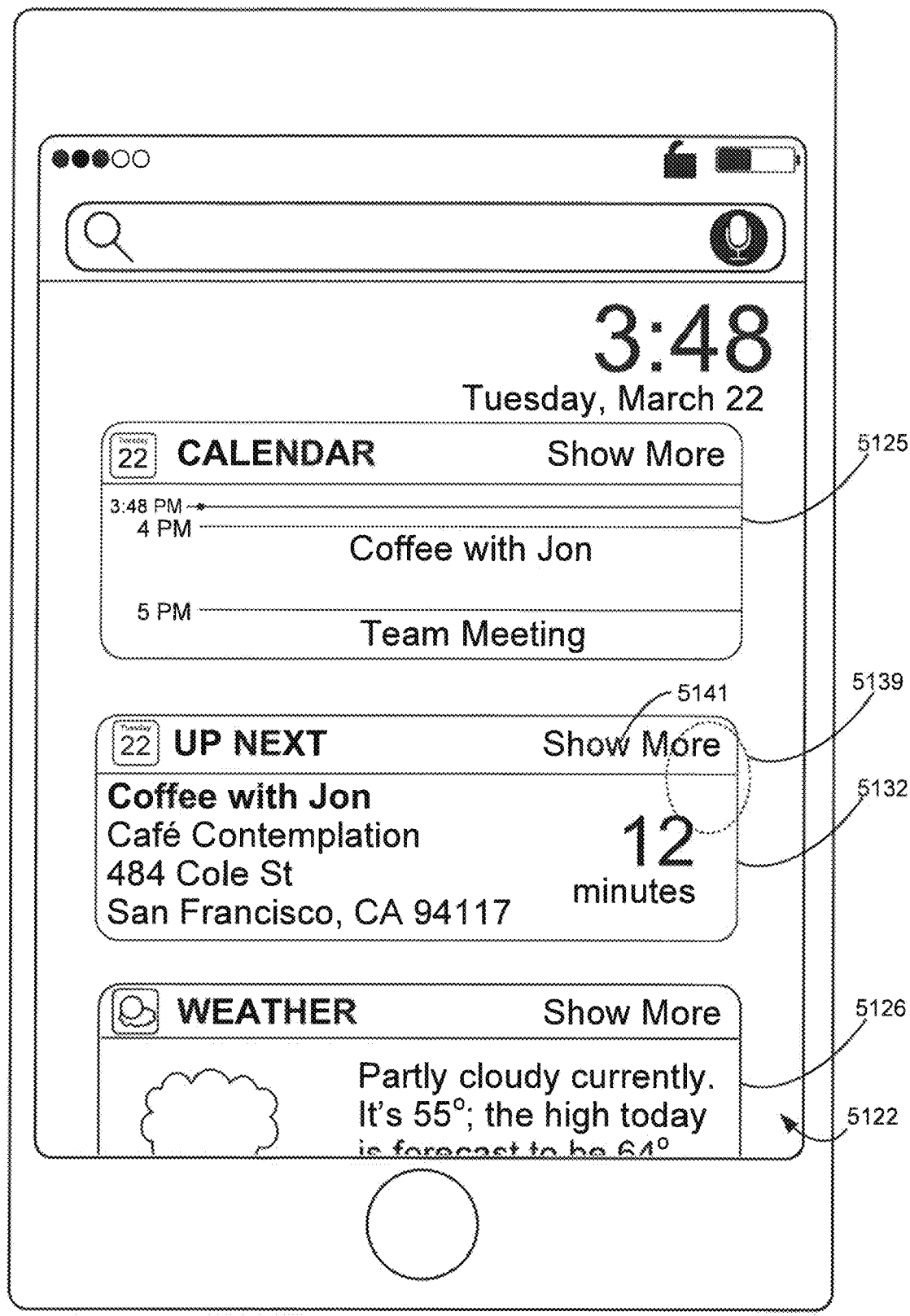

In FIG. 5W, an input is provided by contact 5137 at a location corresponding to affordance 5130 for reducing the expanded view of calendar mini application 5125, as shown in FIG. 5W, to a non-expanded view of calendar mini application 5125, as shown in an unlocked mode of mini applications user interface 5122 of FIG. 5X.

In the unlocked mode of mini applications user interface 5122, an unlocked view of (unexpanded) calendar mini application 5125 is displayed. Compared with the locked view of calendar mini application 5125, locked mode of calendar mini application 5125 includes additional information, such as calendar event information (e.g., "Coffee with Jon" and/or "Team Meeting") that is not shown in the unlocked view of calendar mini application 5125. The unlocked mode of mini applications user interface 5122 displays up next mini application 5132 that is not displayed in the locked mode of mini applications user interface 5122.

In FIG. 5X, an input is provided by contact 5139 at a location corresponding to a "Show More" affordance 5141 for a displaying an expanded view of up next mini application 5132.

Figure 5Y:
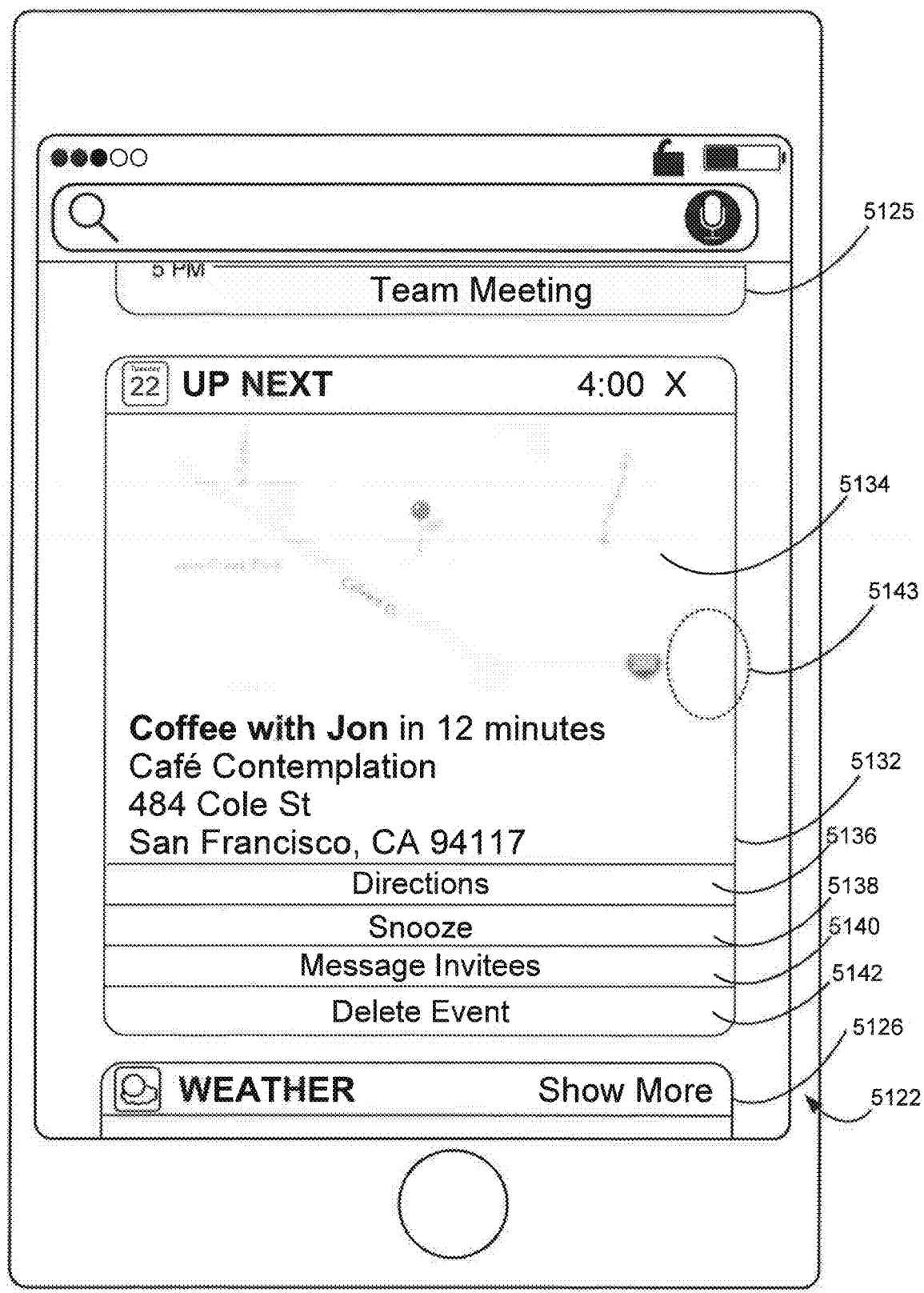
Figure 5Z:
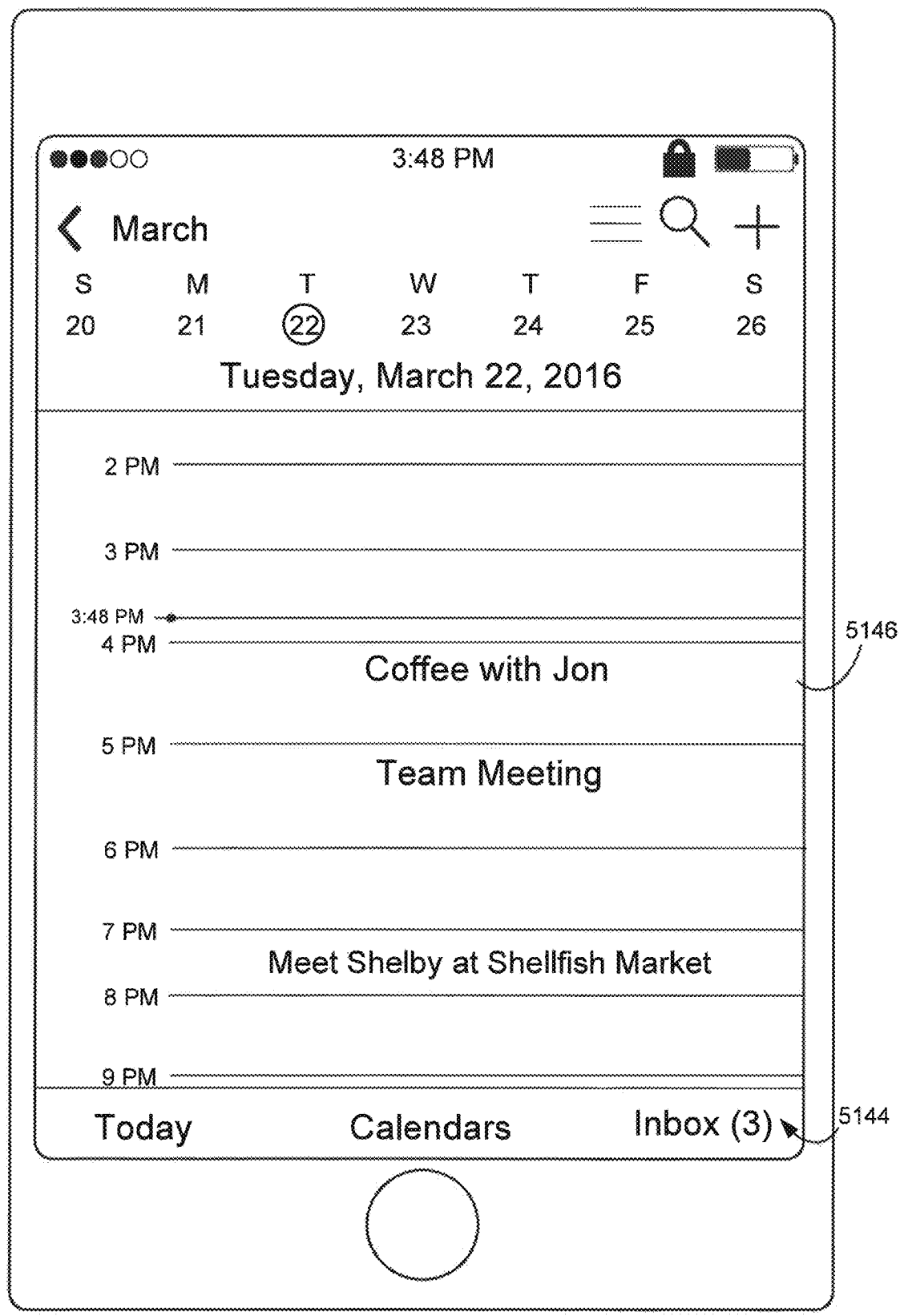
Figure 5A:
Figure 5A:
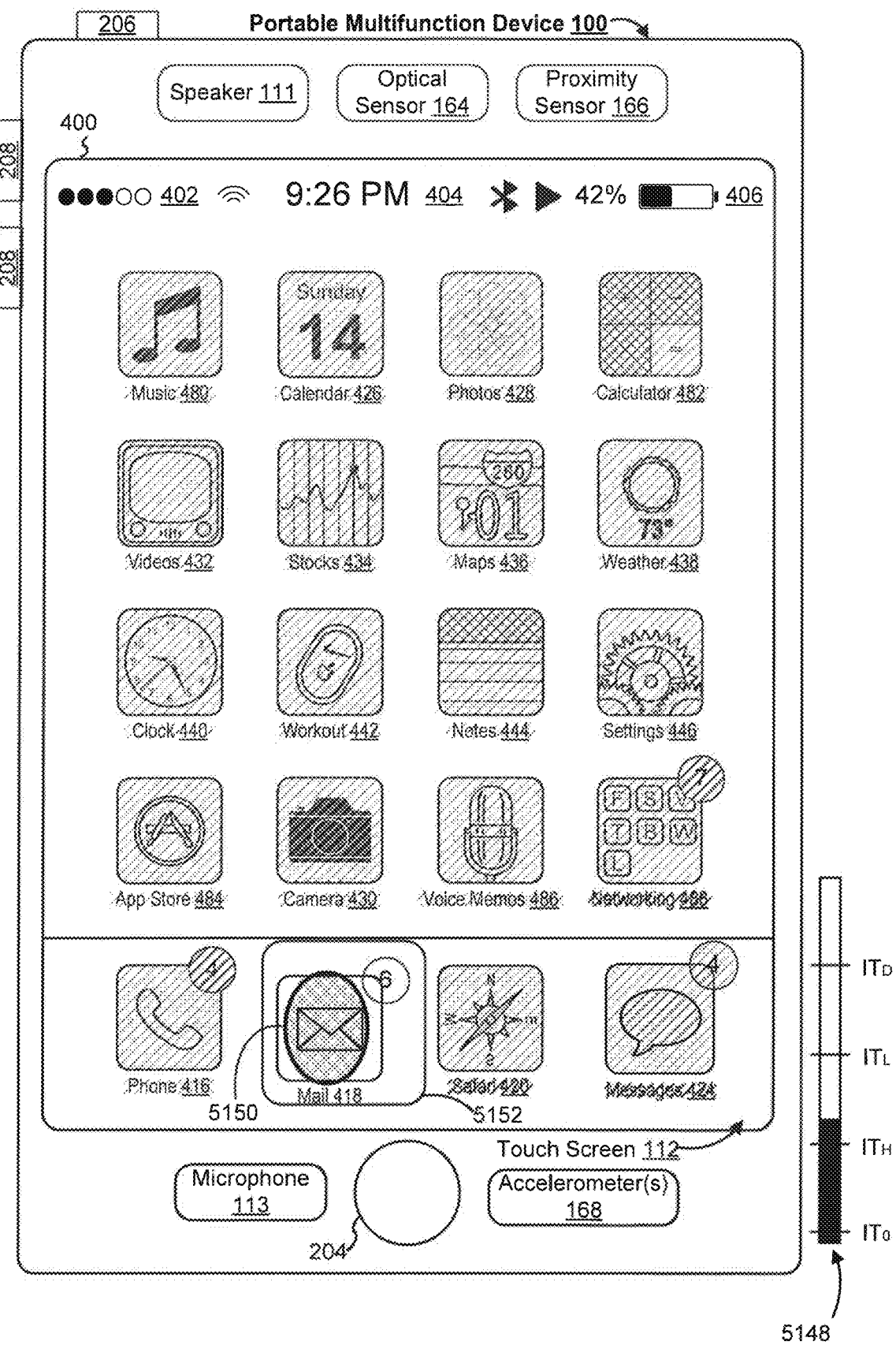
Figure 5A:
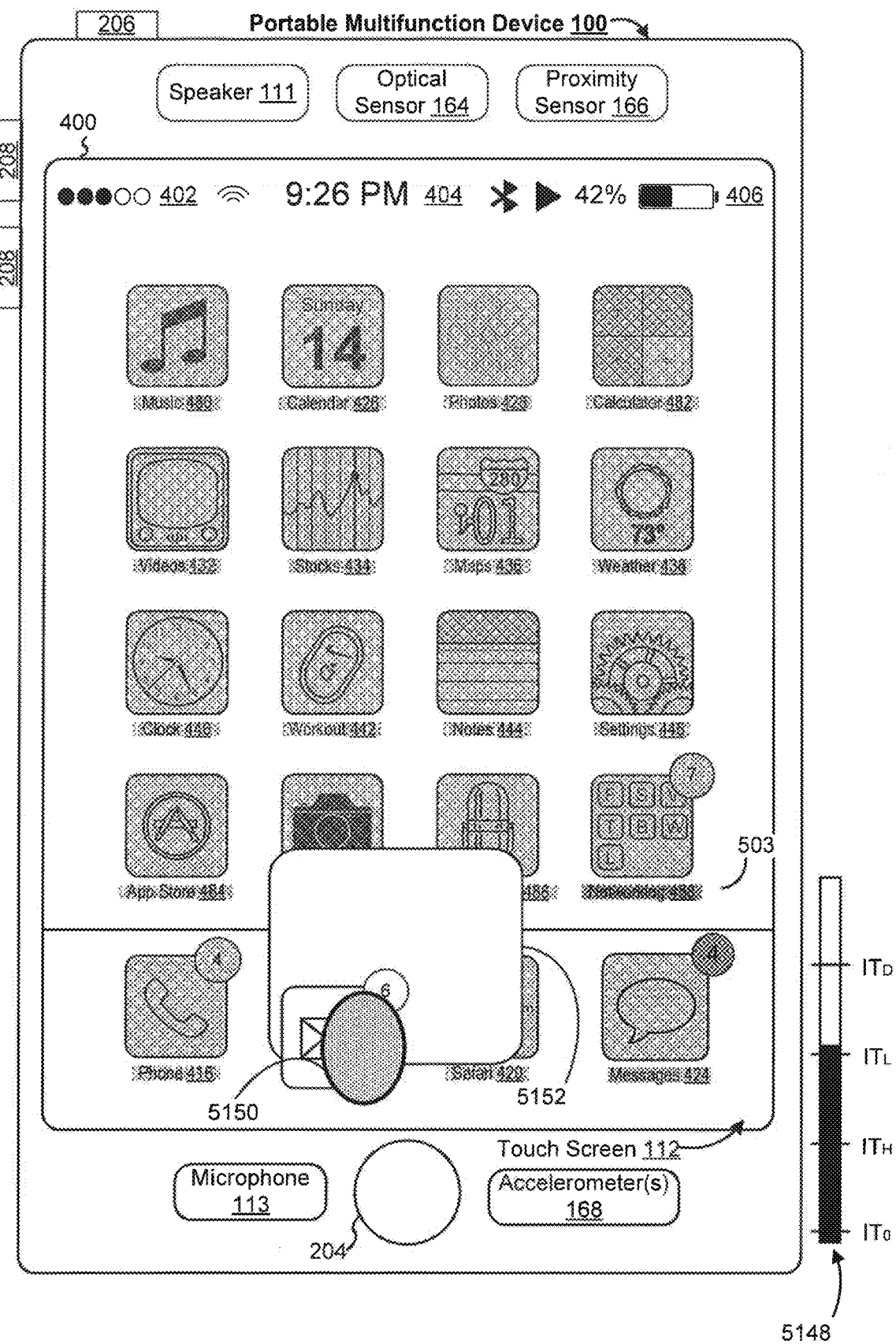
Figure 5A:
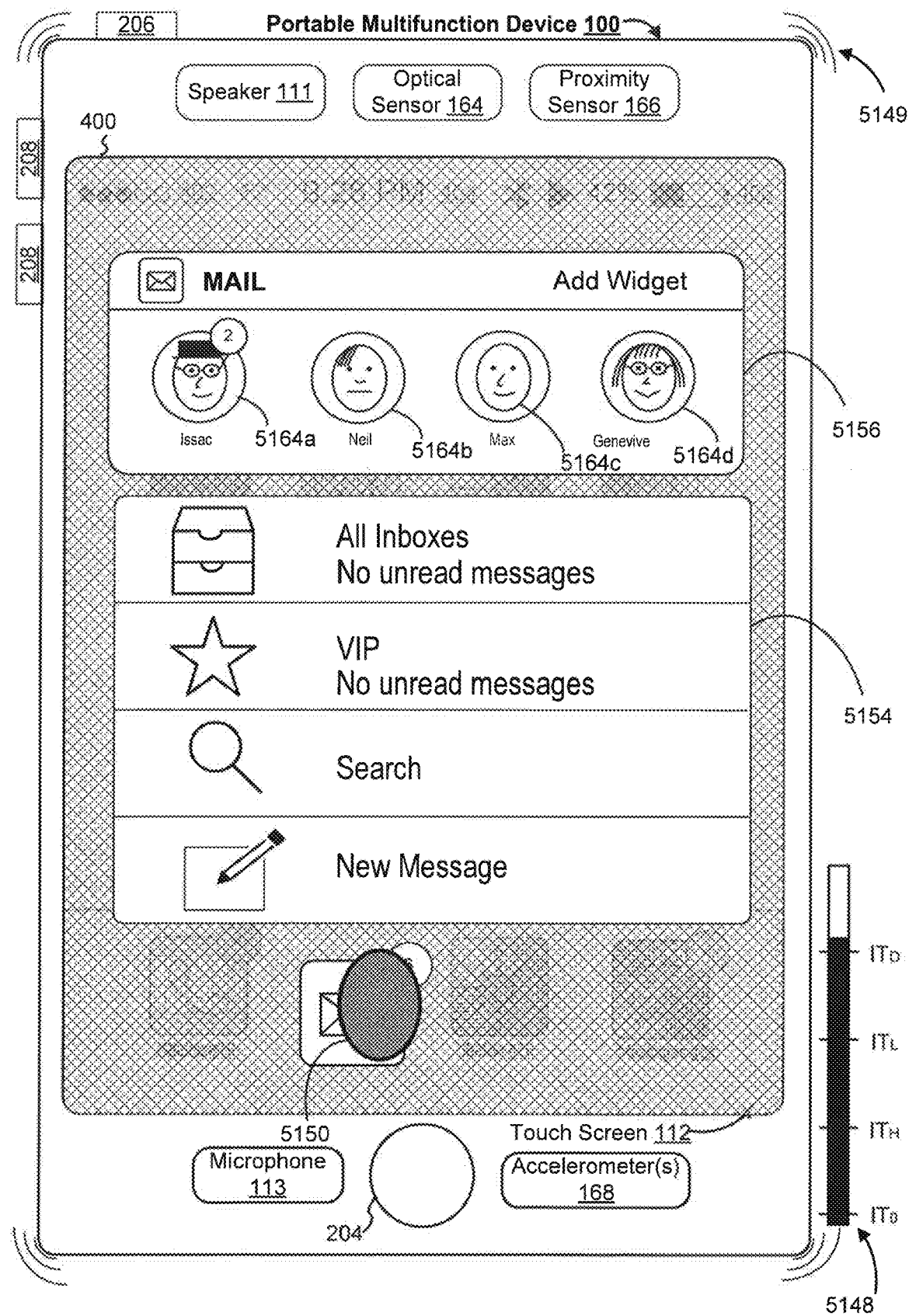
Figure 5A:
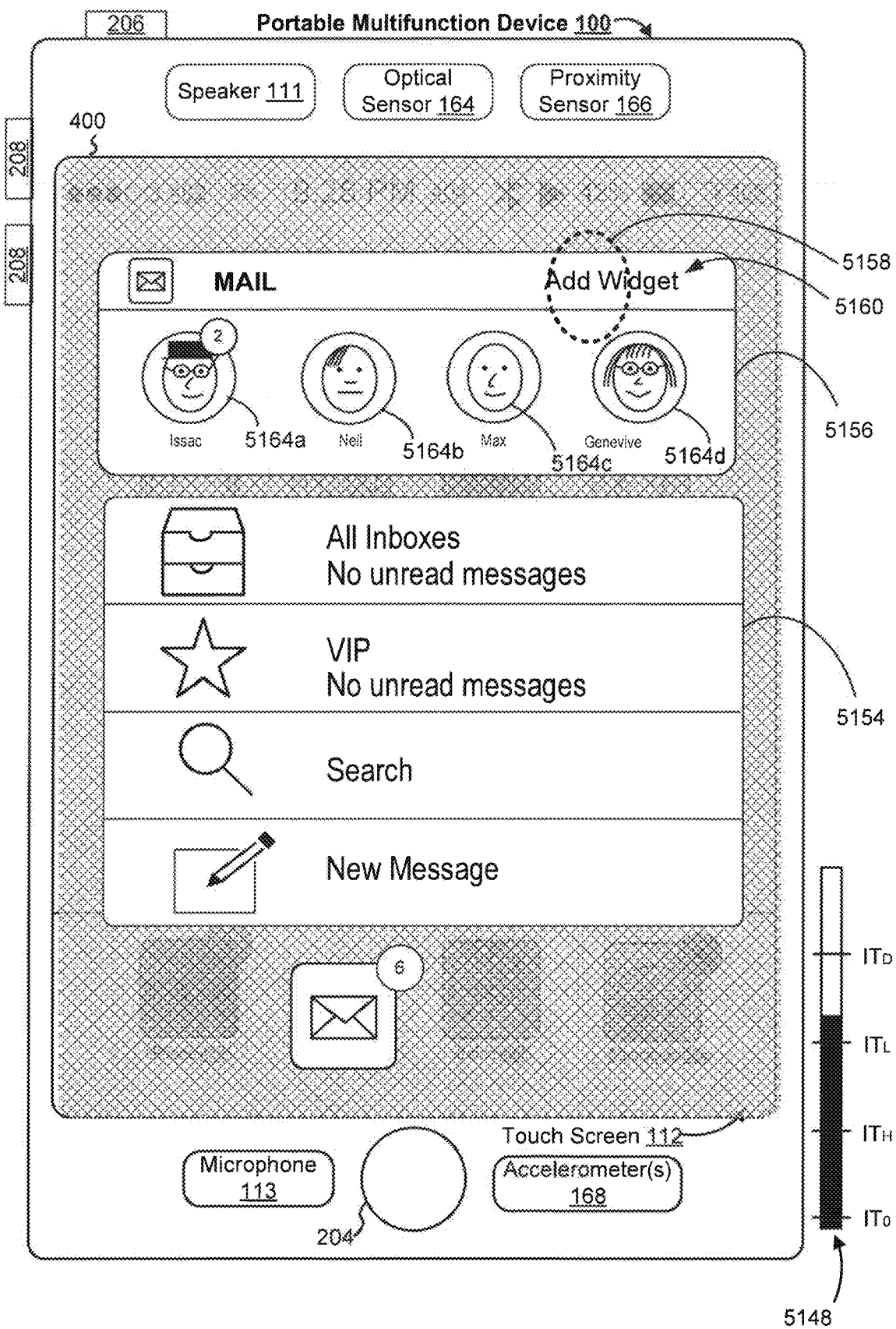
Figure 5A:
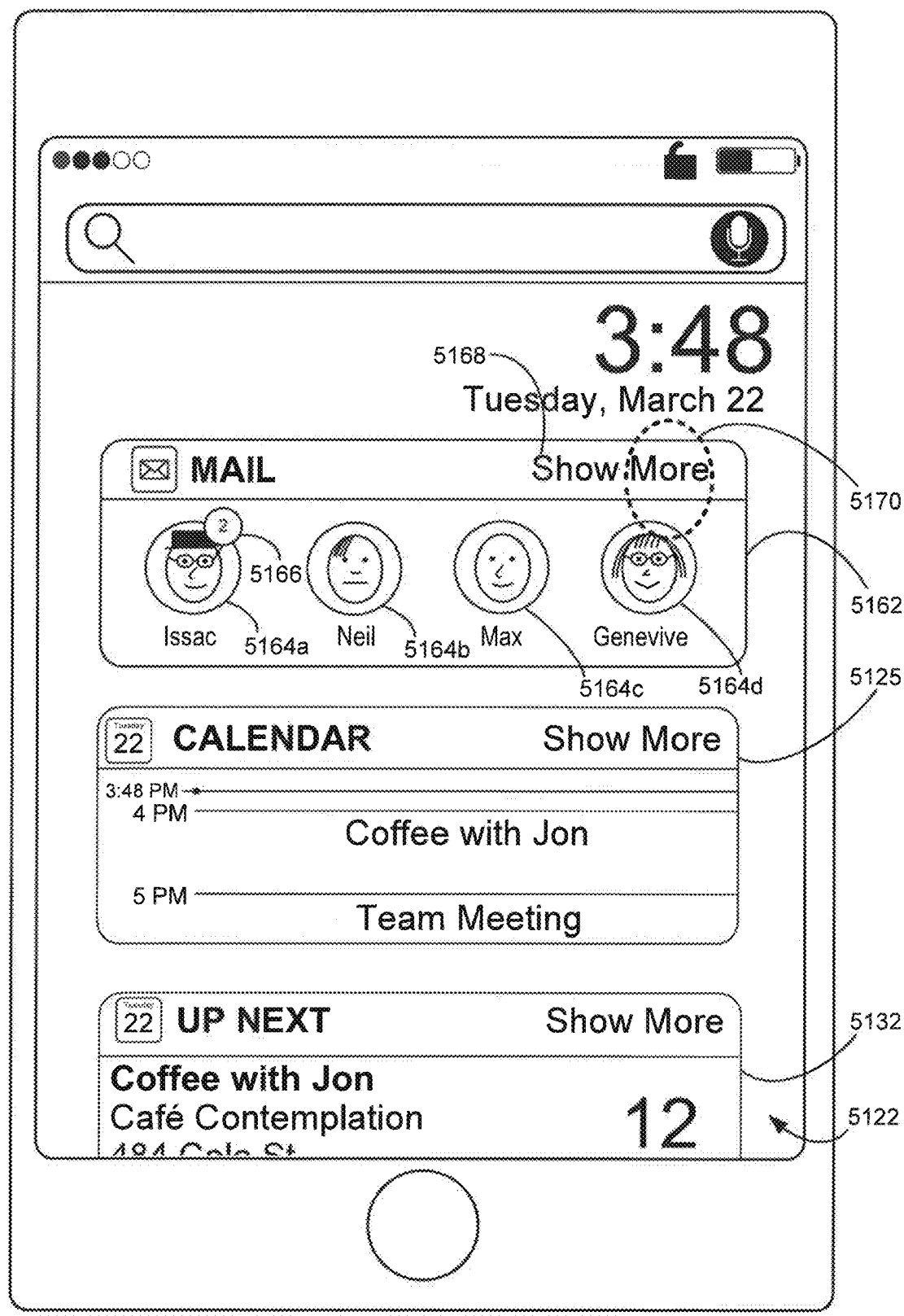
Figure 5A:
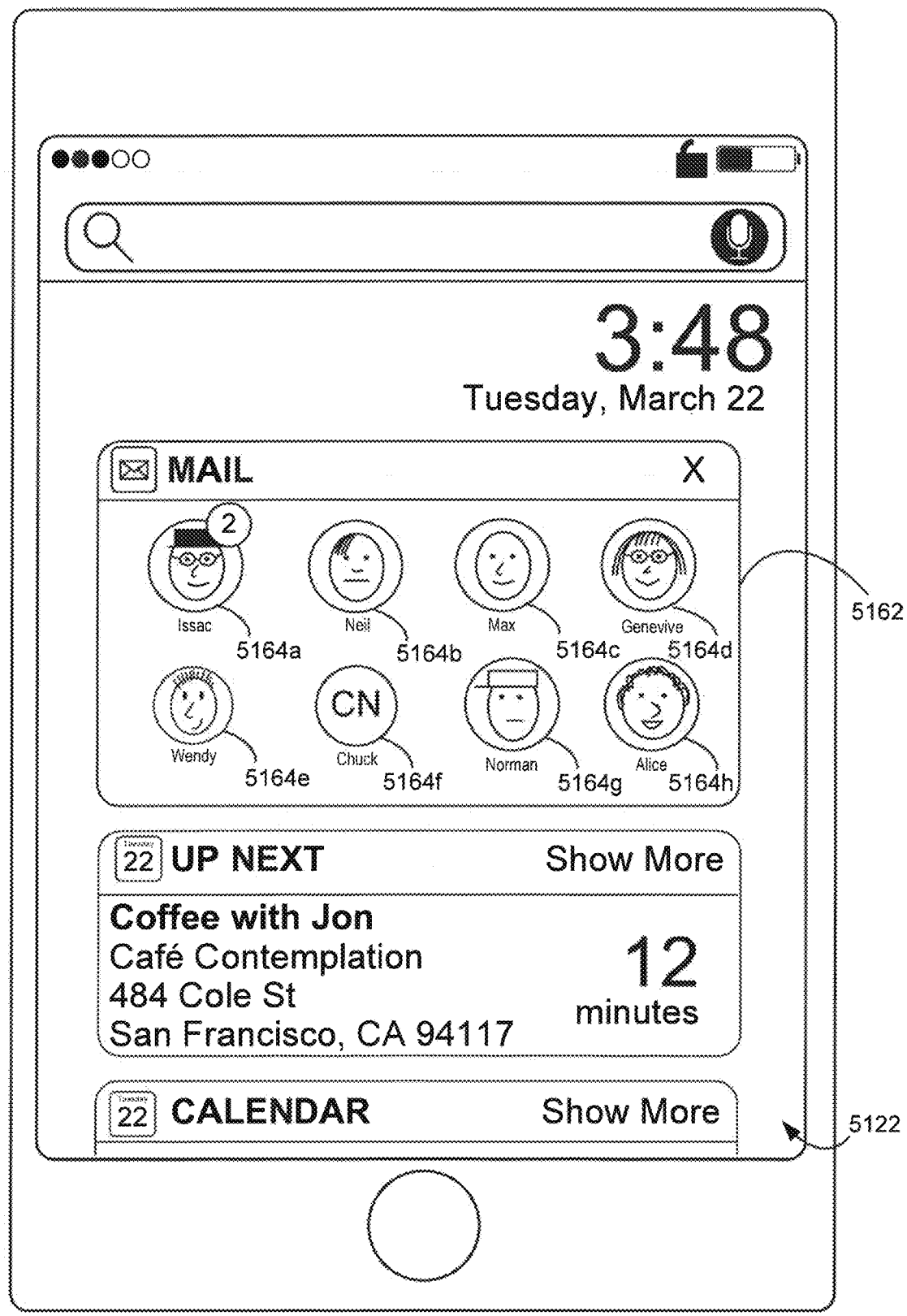
Figure 5A:
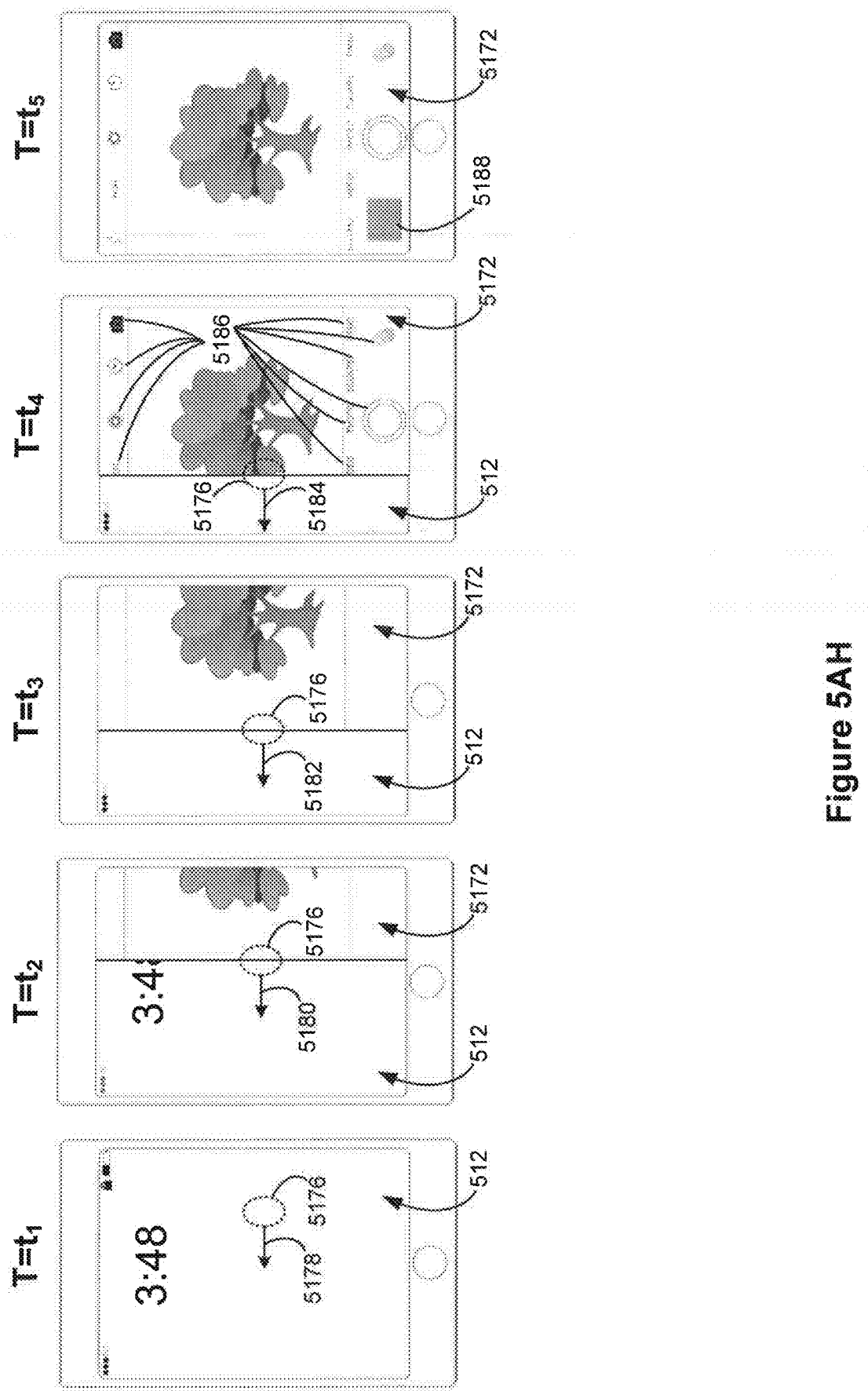
Figure 5A:
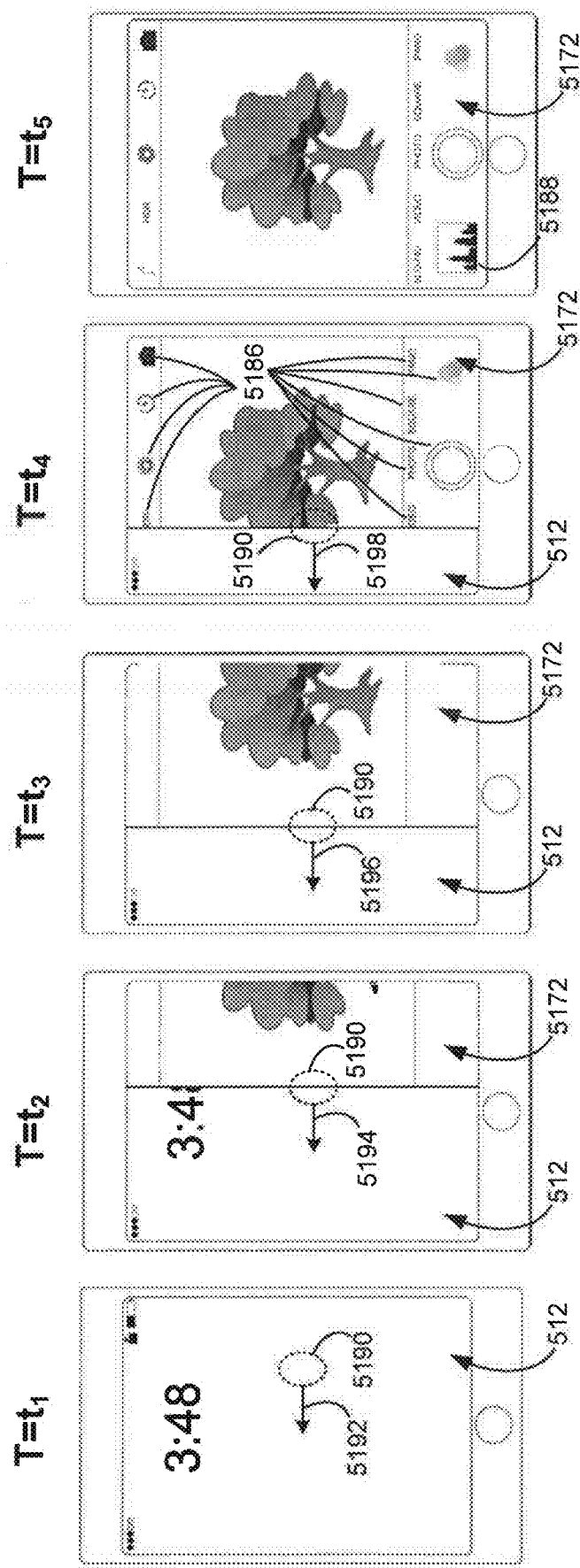
Figure 5A:
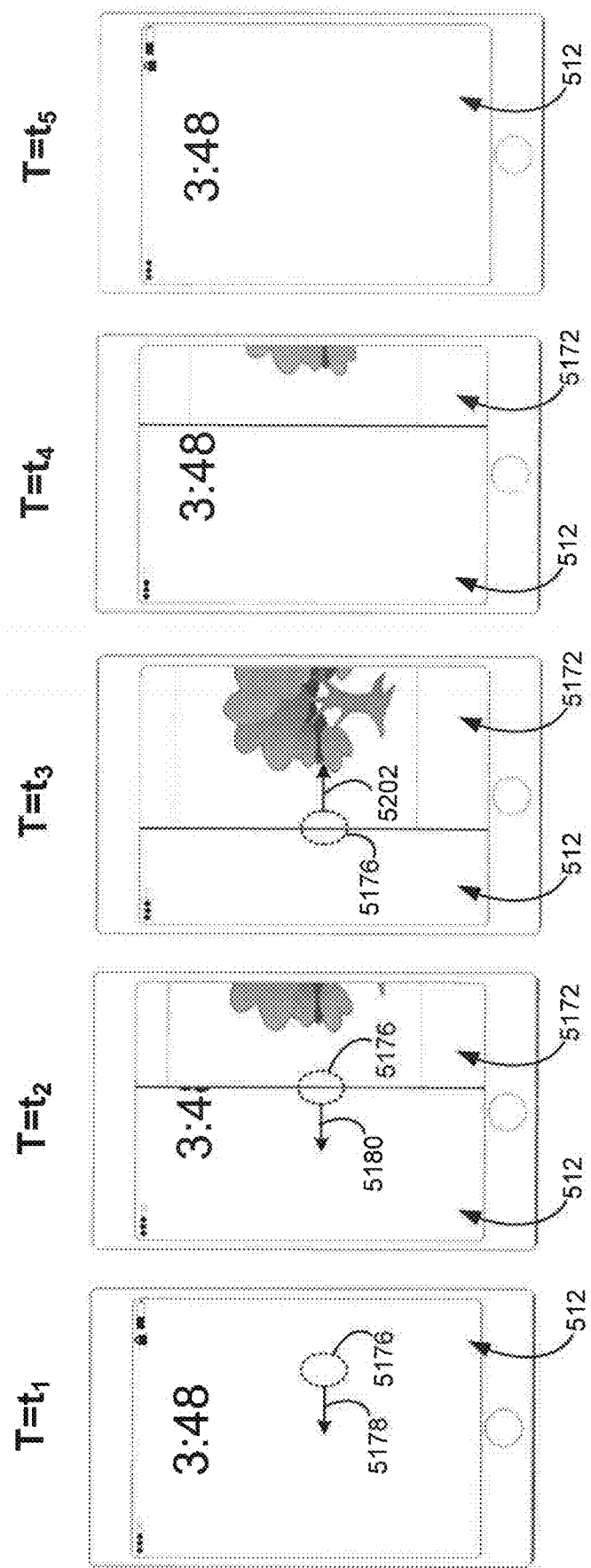
Figure 5A:
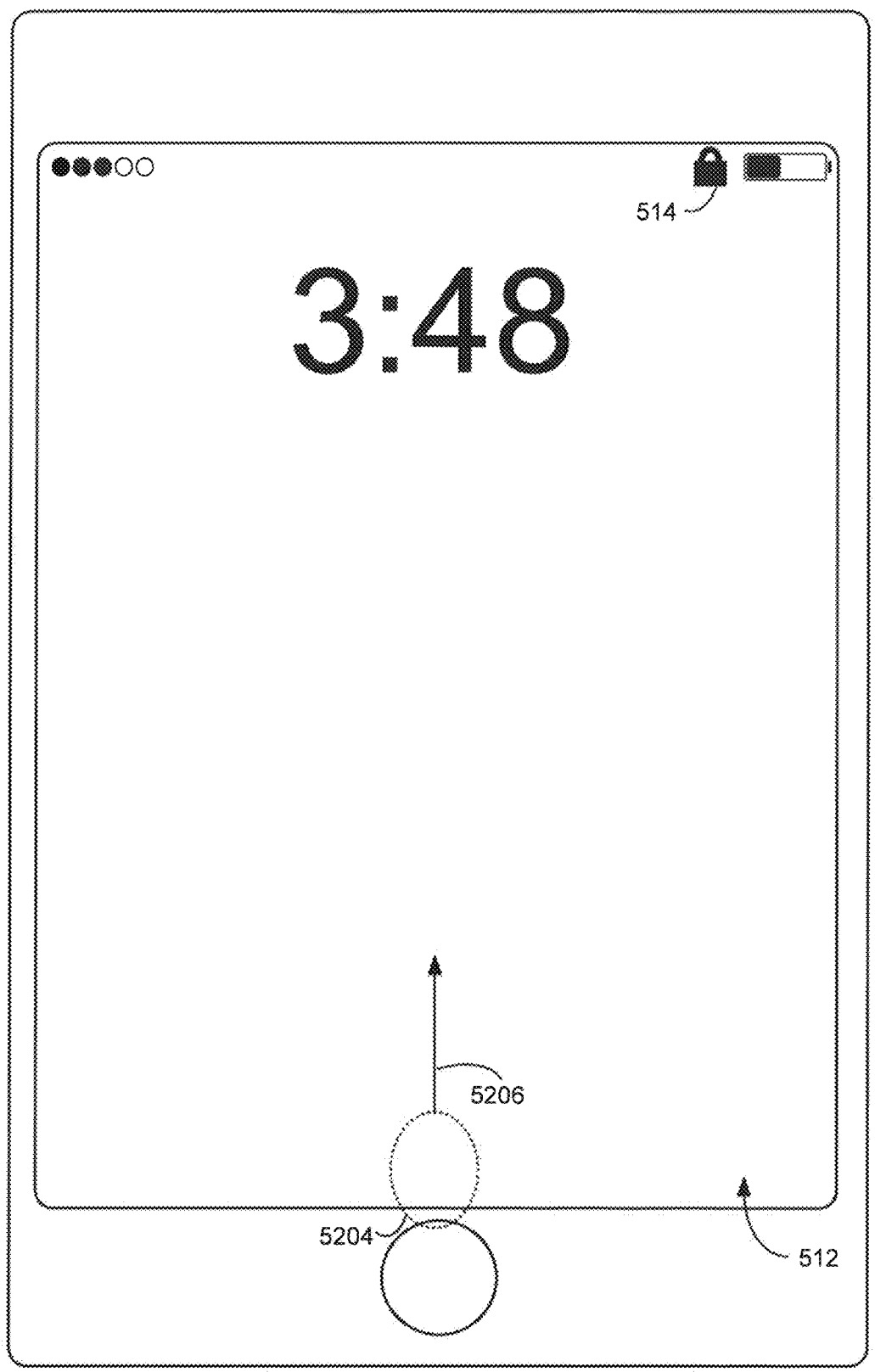
Figure 5A:
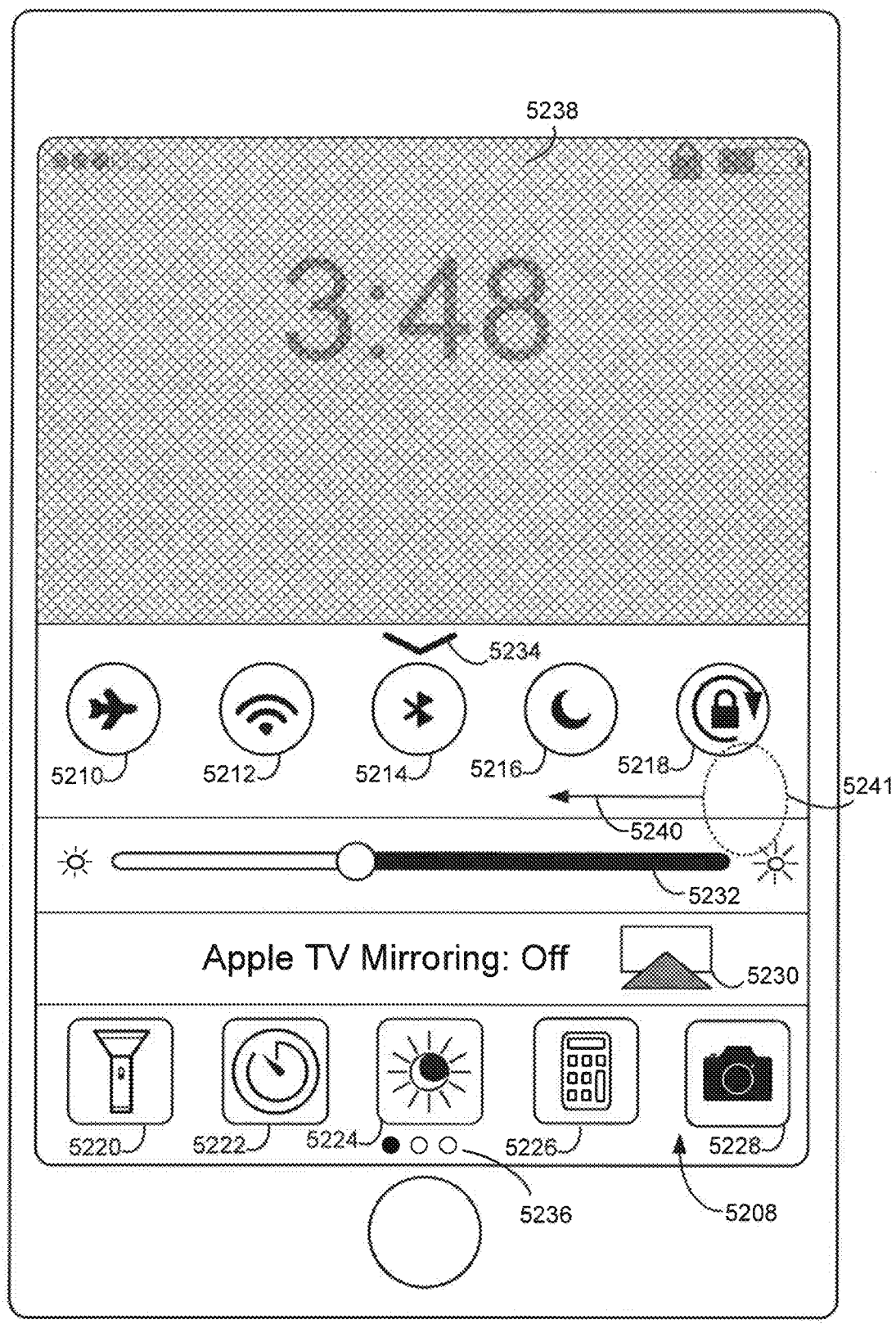
Figure 5A:
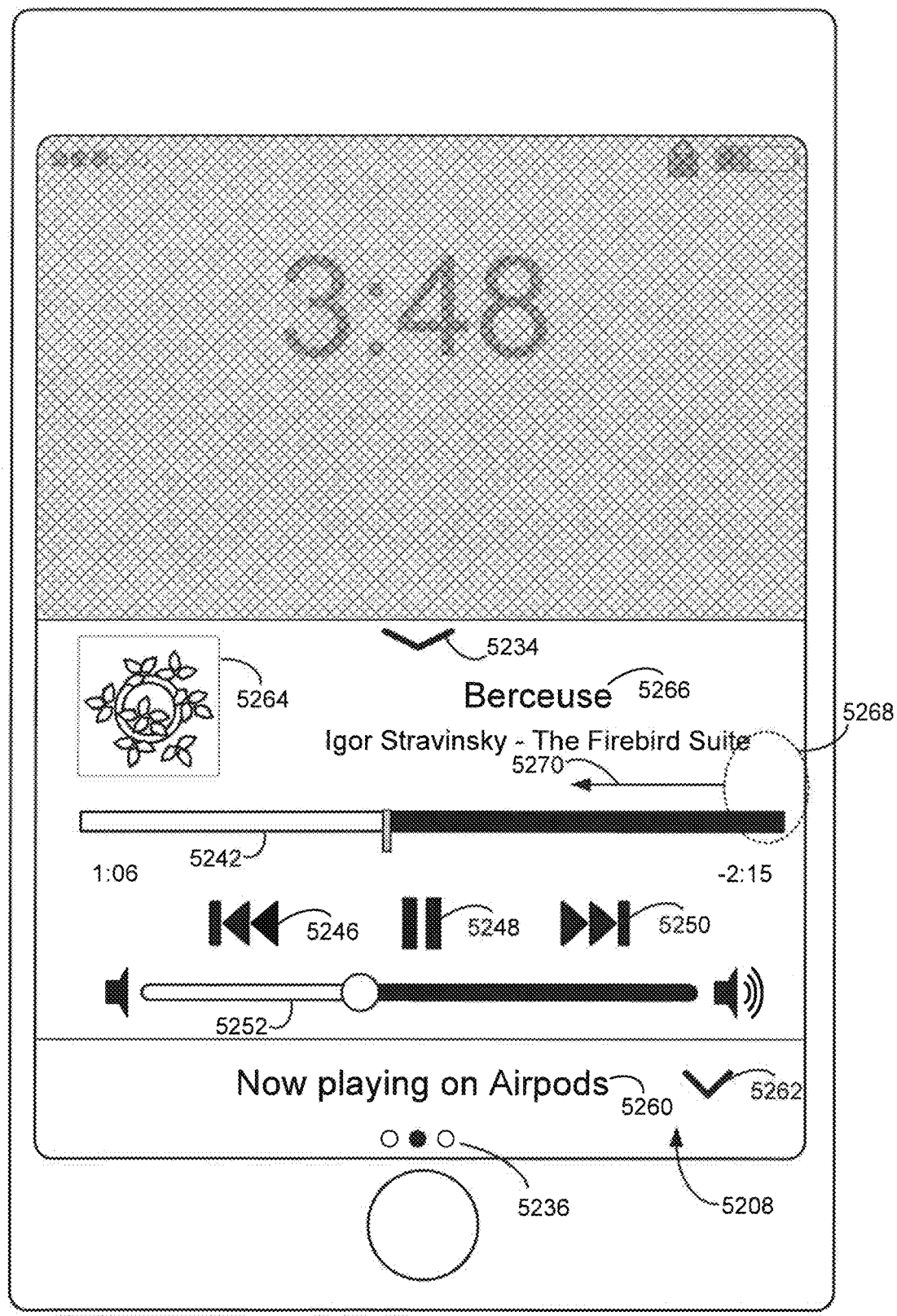
Figure 5A:
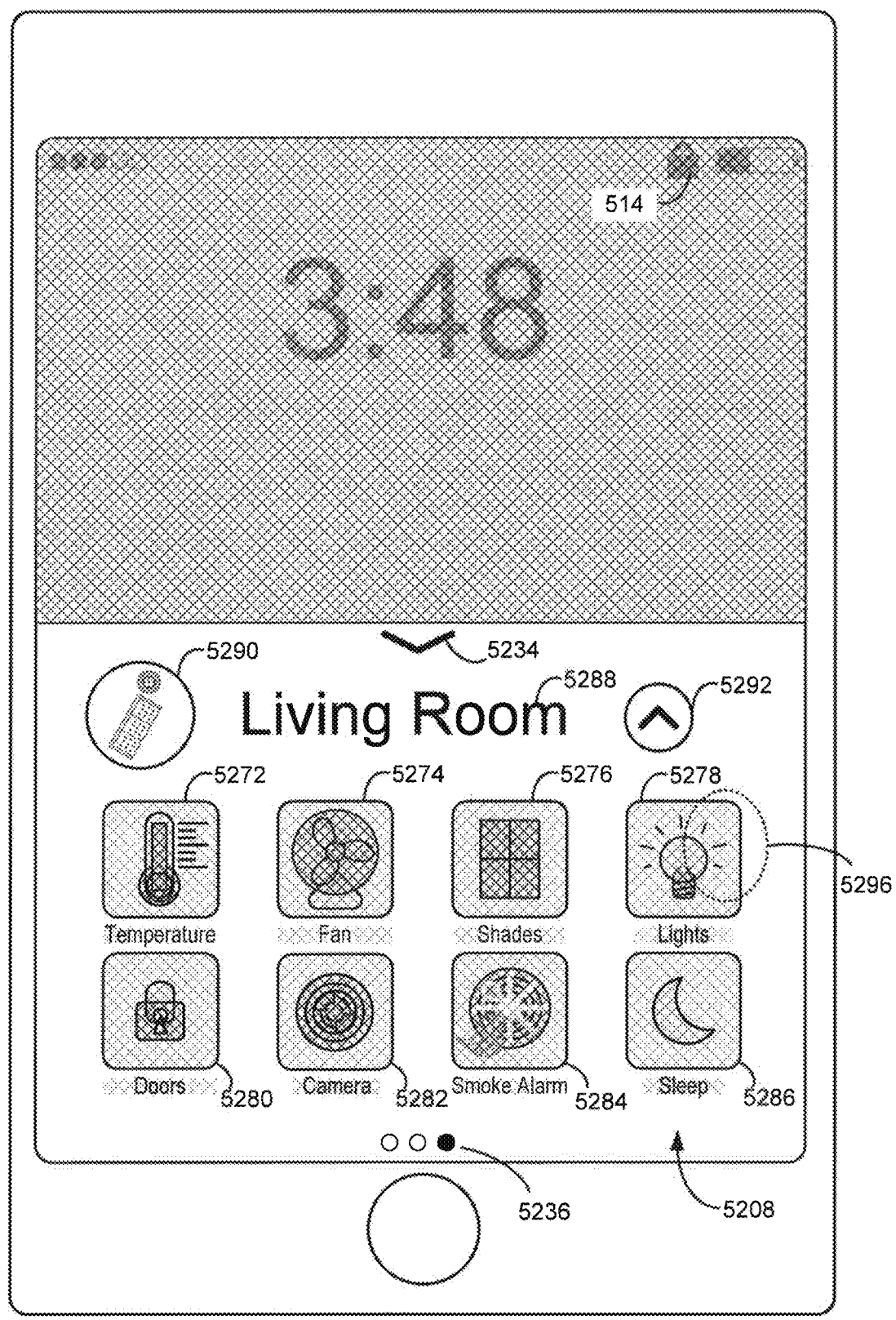
Figure 5A:
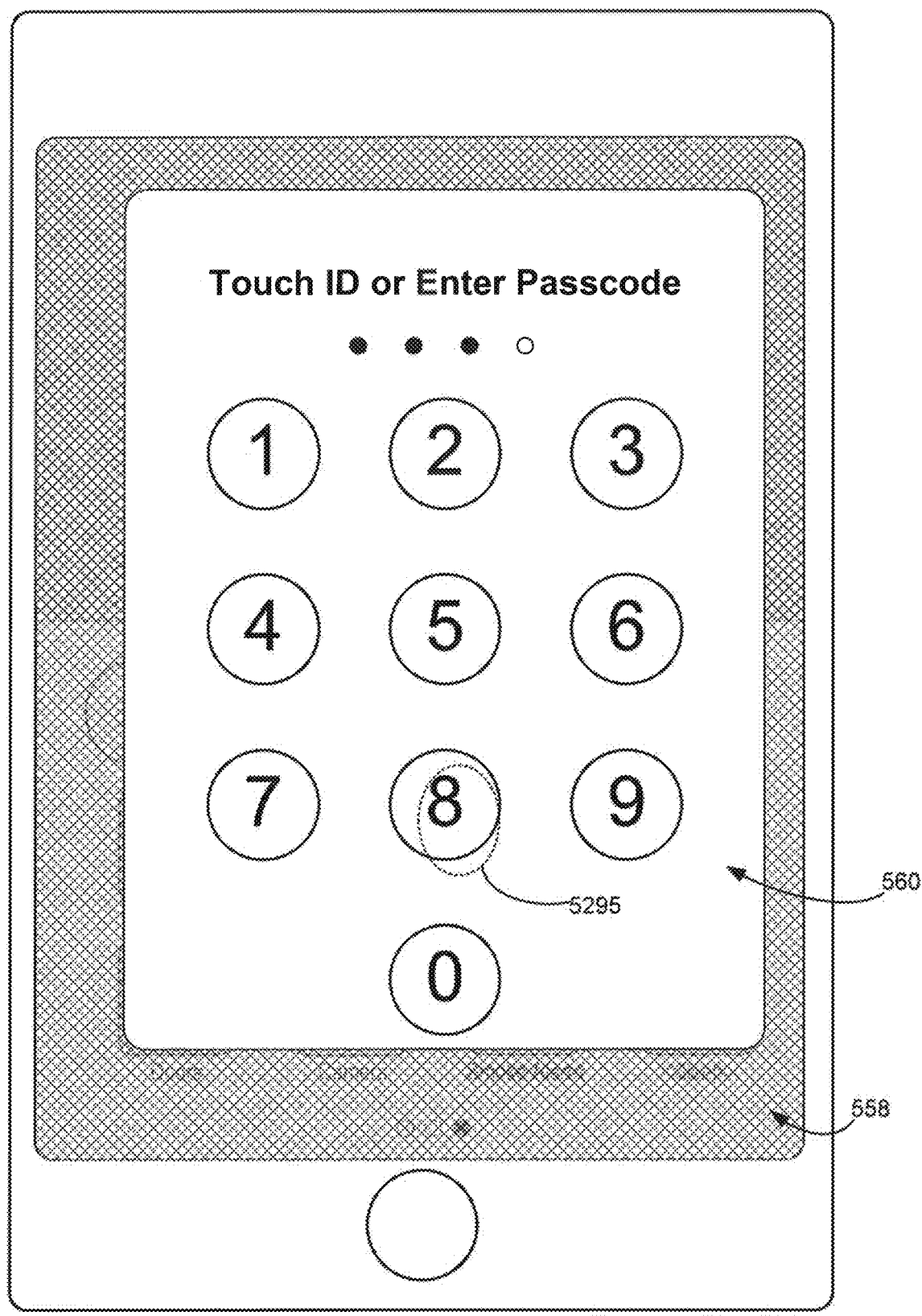
Figure 5A:
Figure 5A:
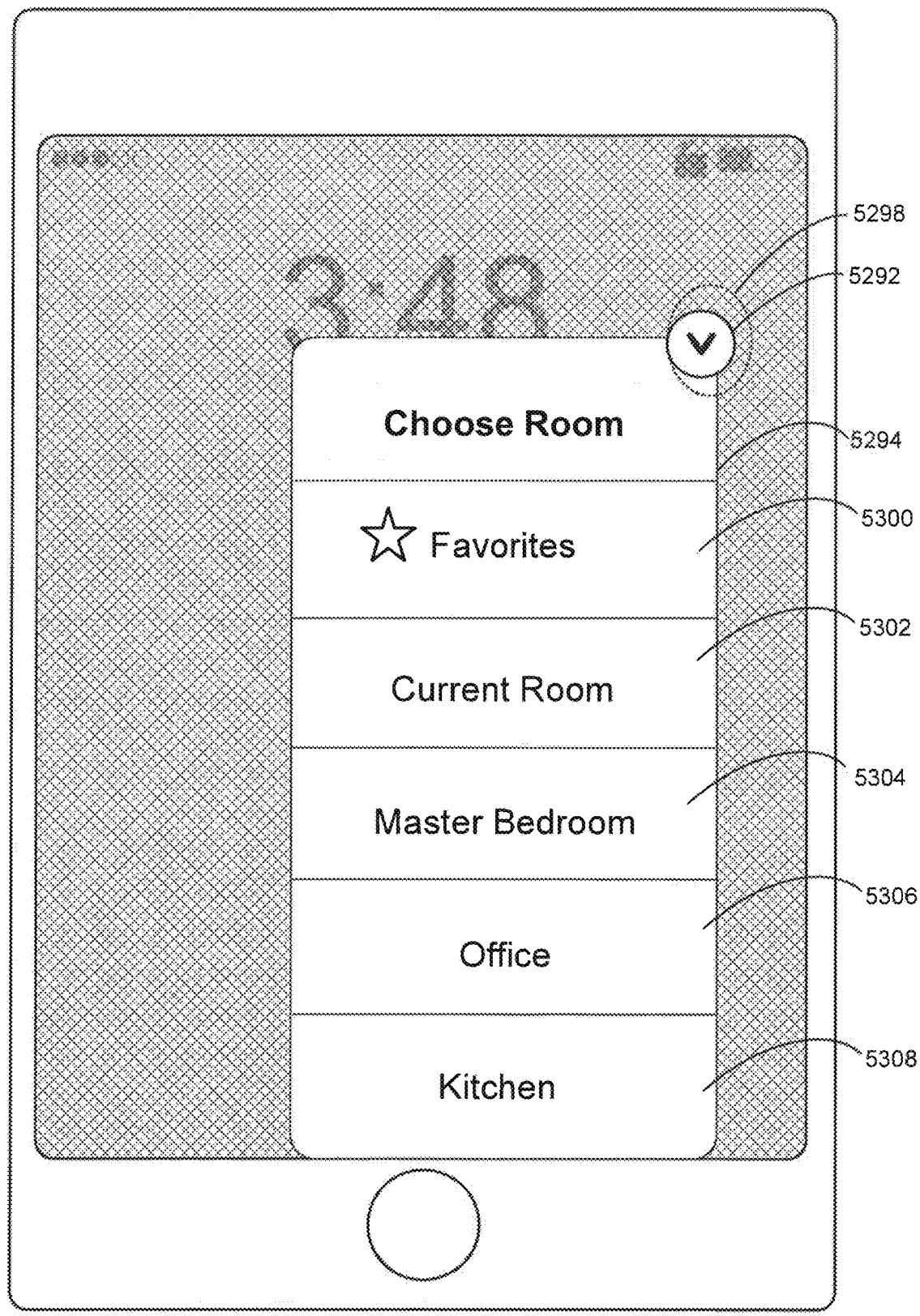
Figure 5A:
Figure 5A:
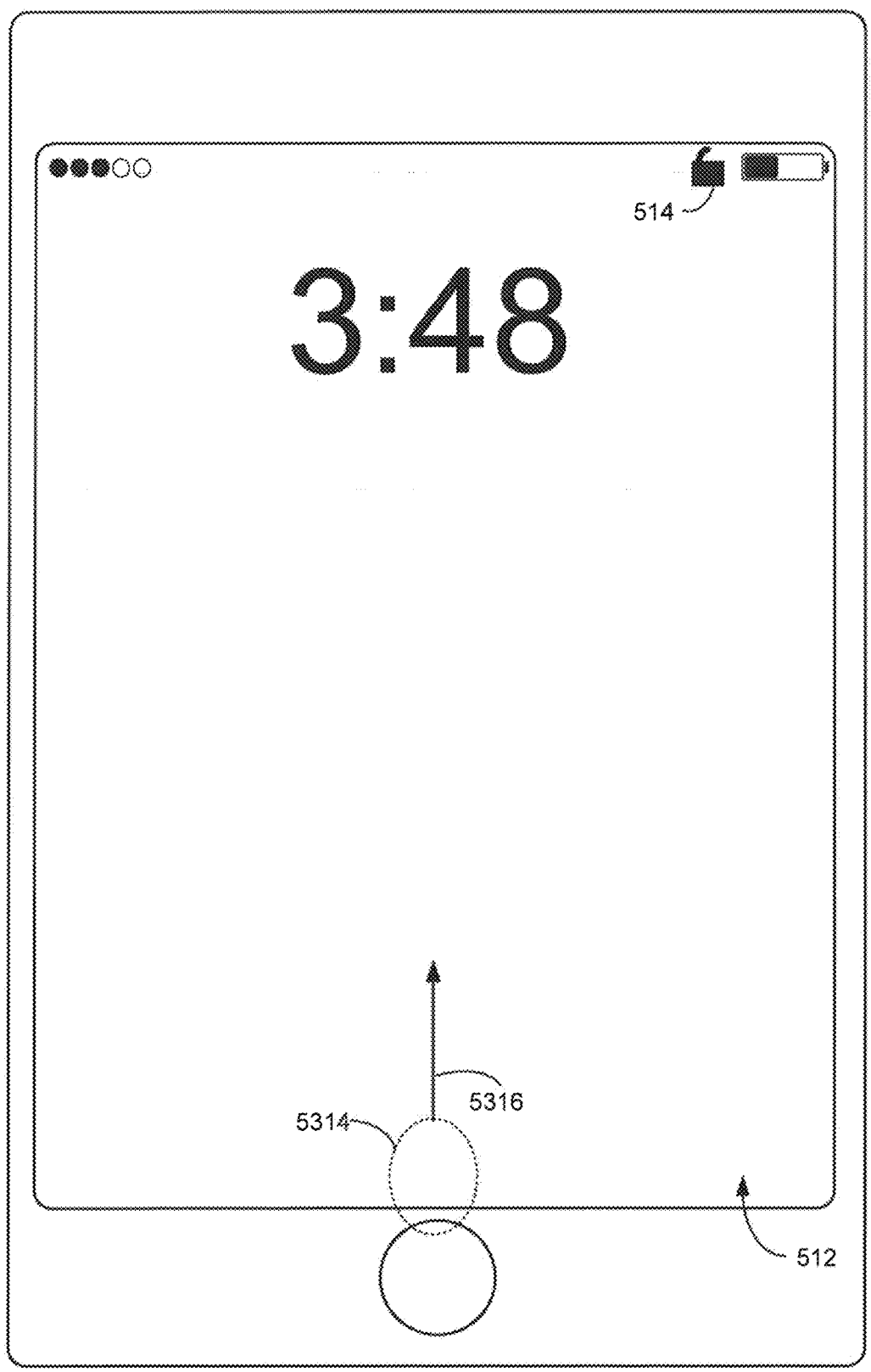
Figure 5A:
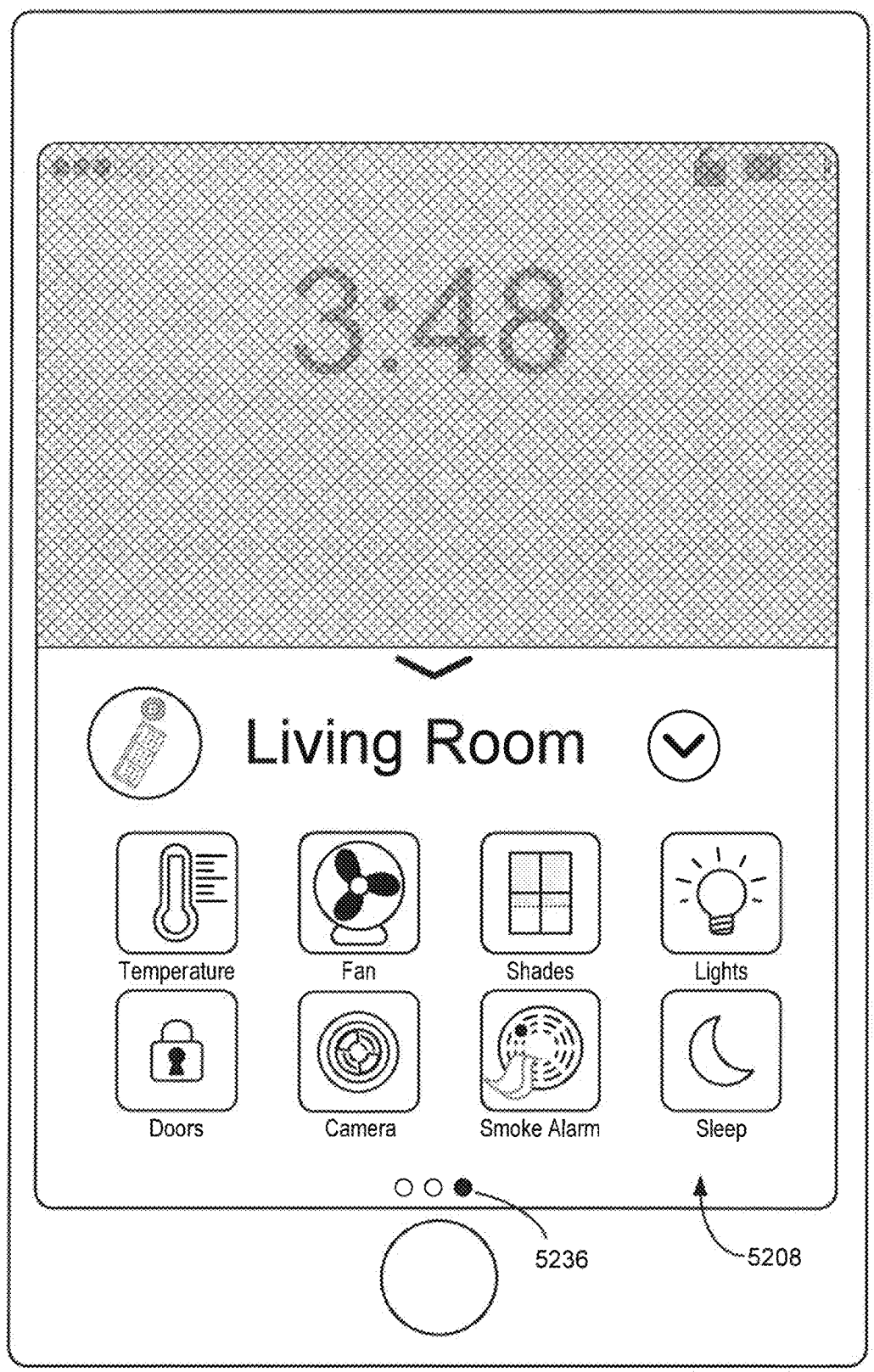
Figure 5A:
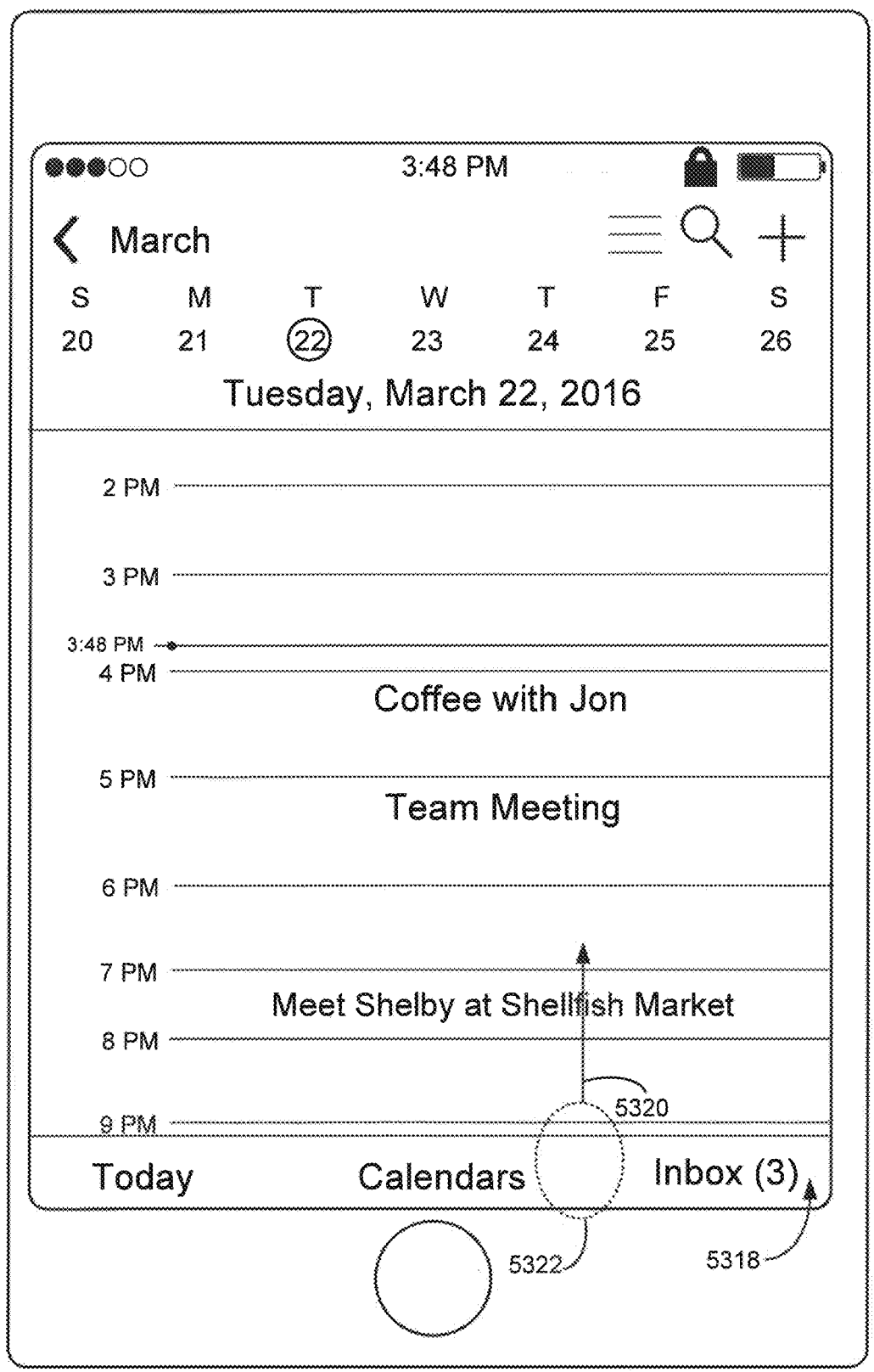
Figure 5A:
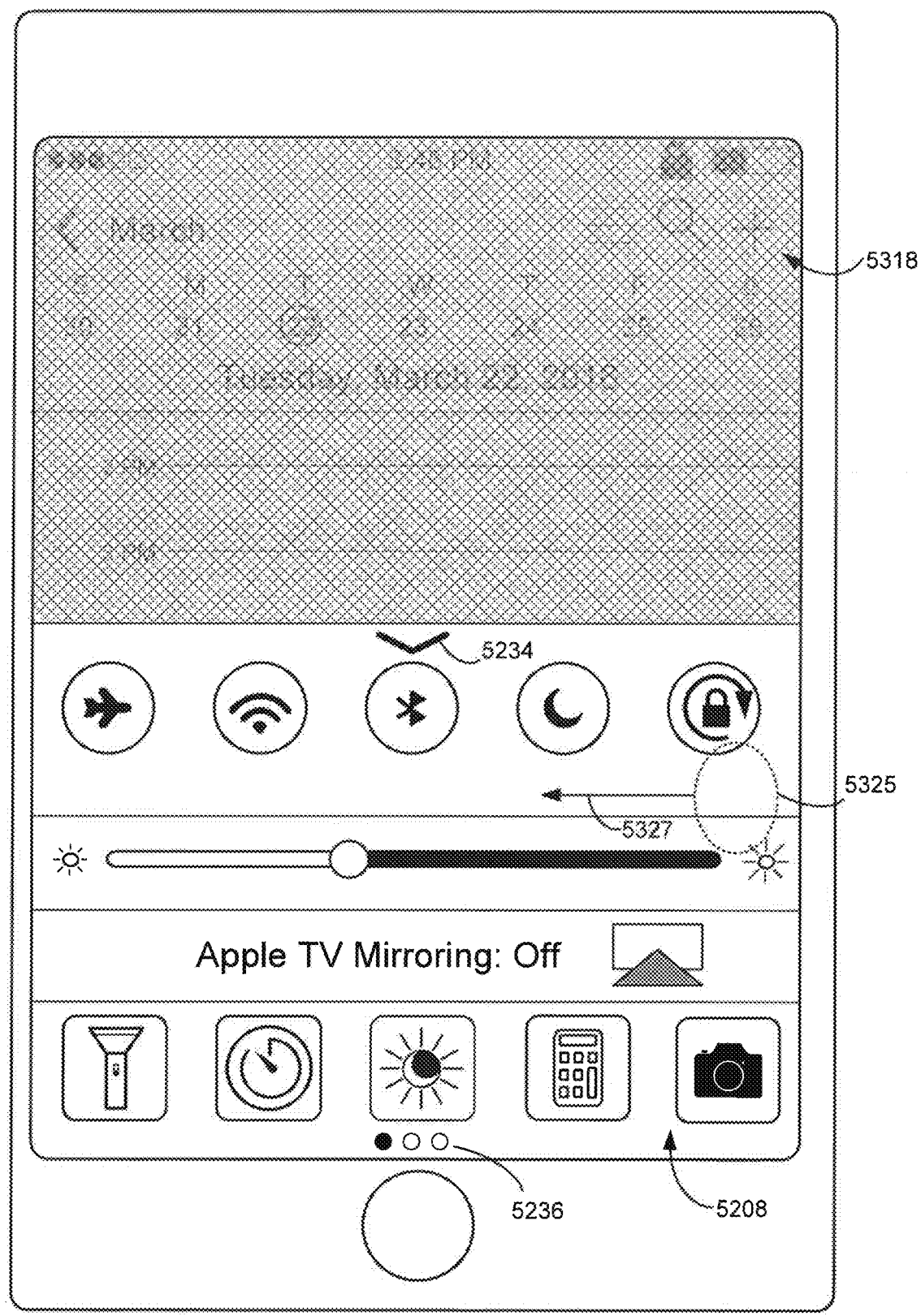
Figure 5A:
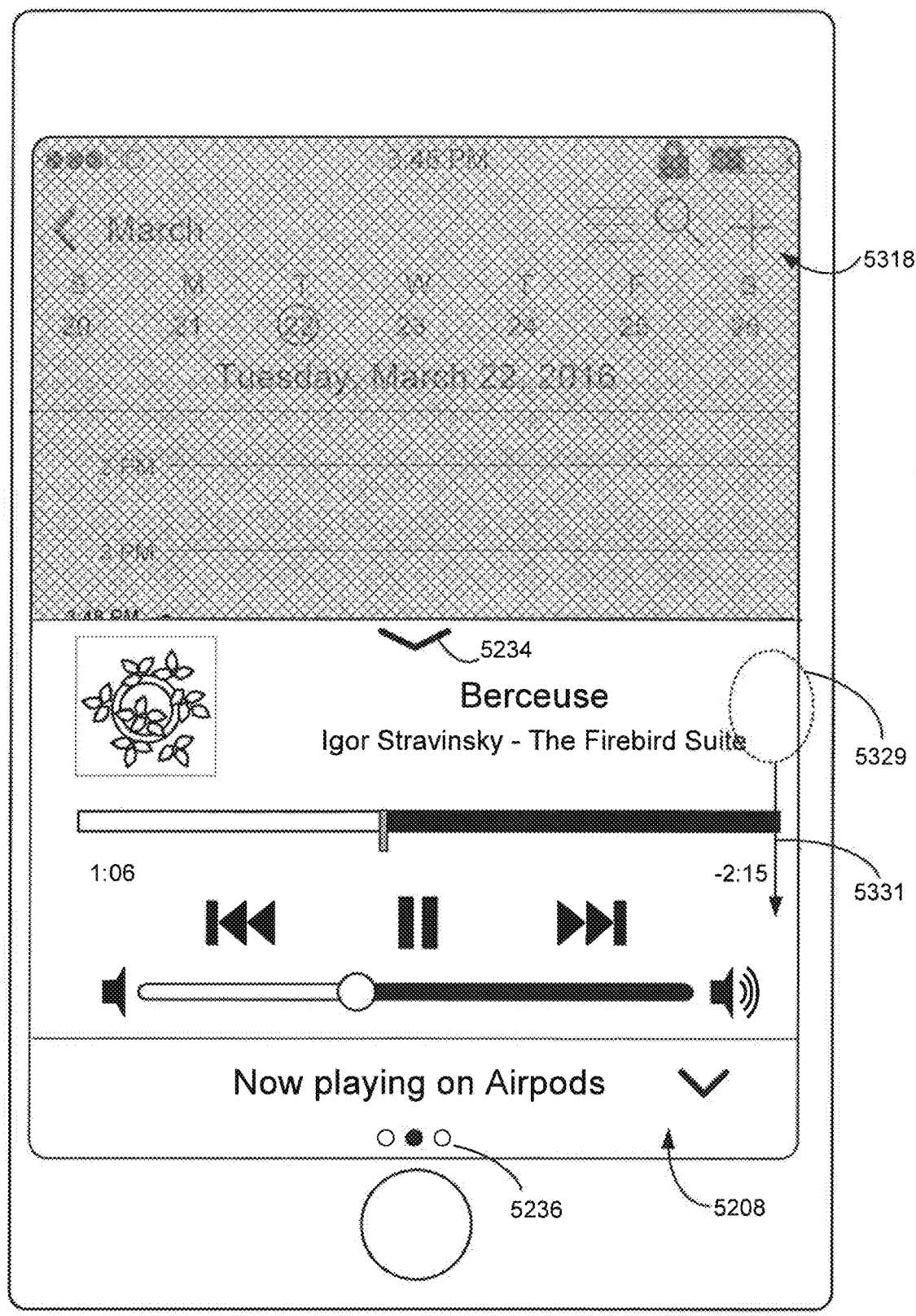
Figure 5A:
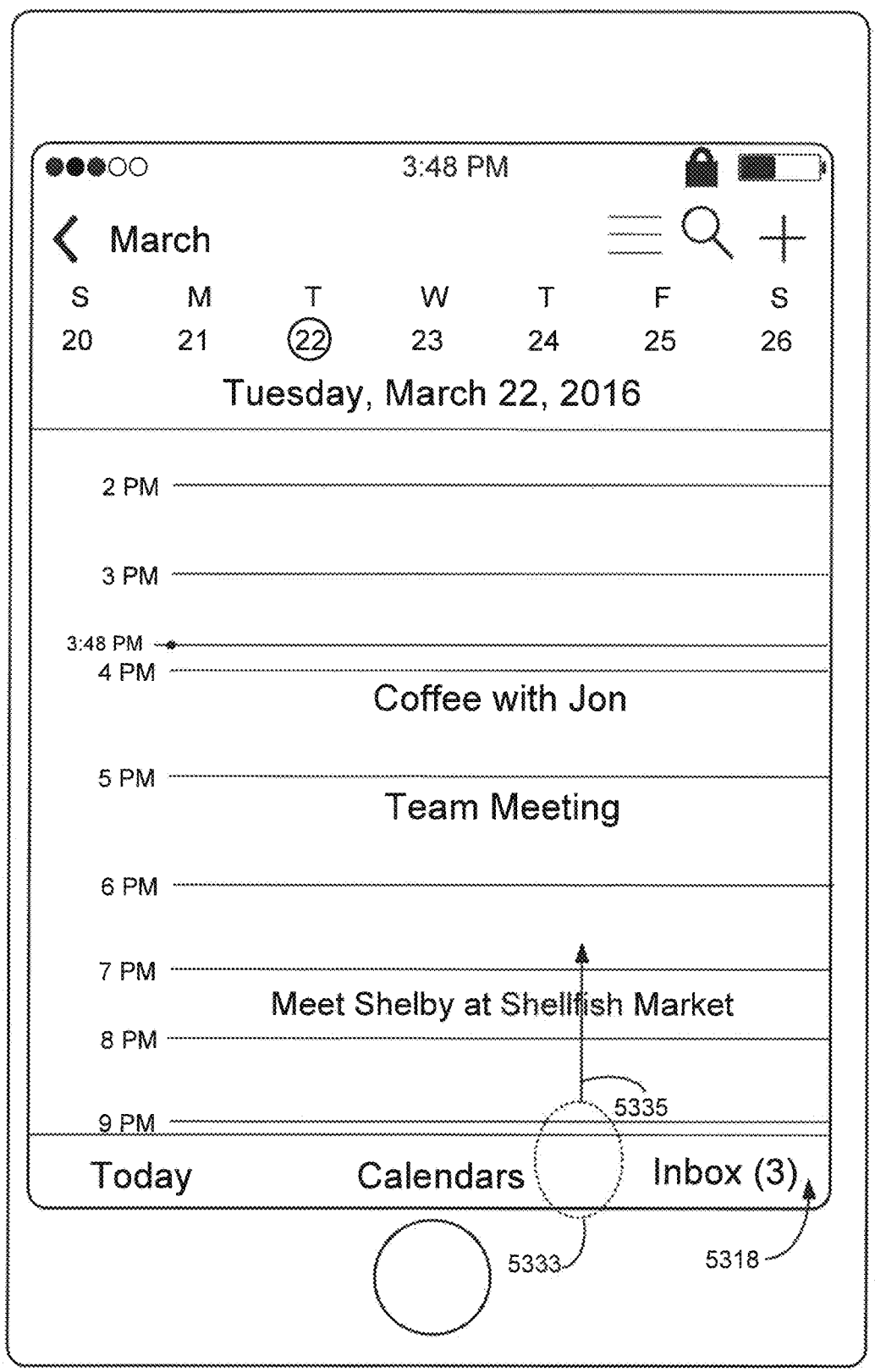
Figure 5A:
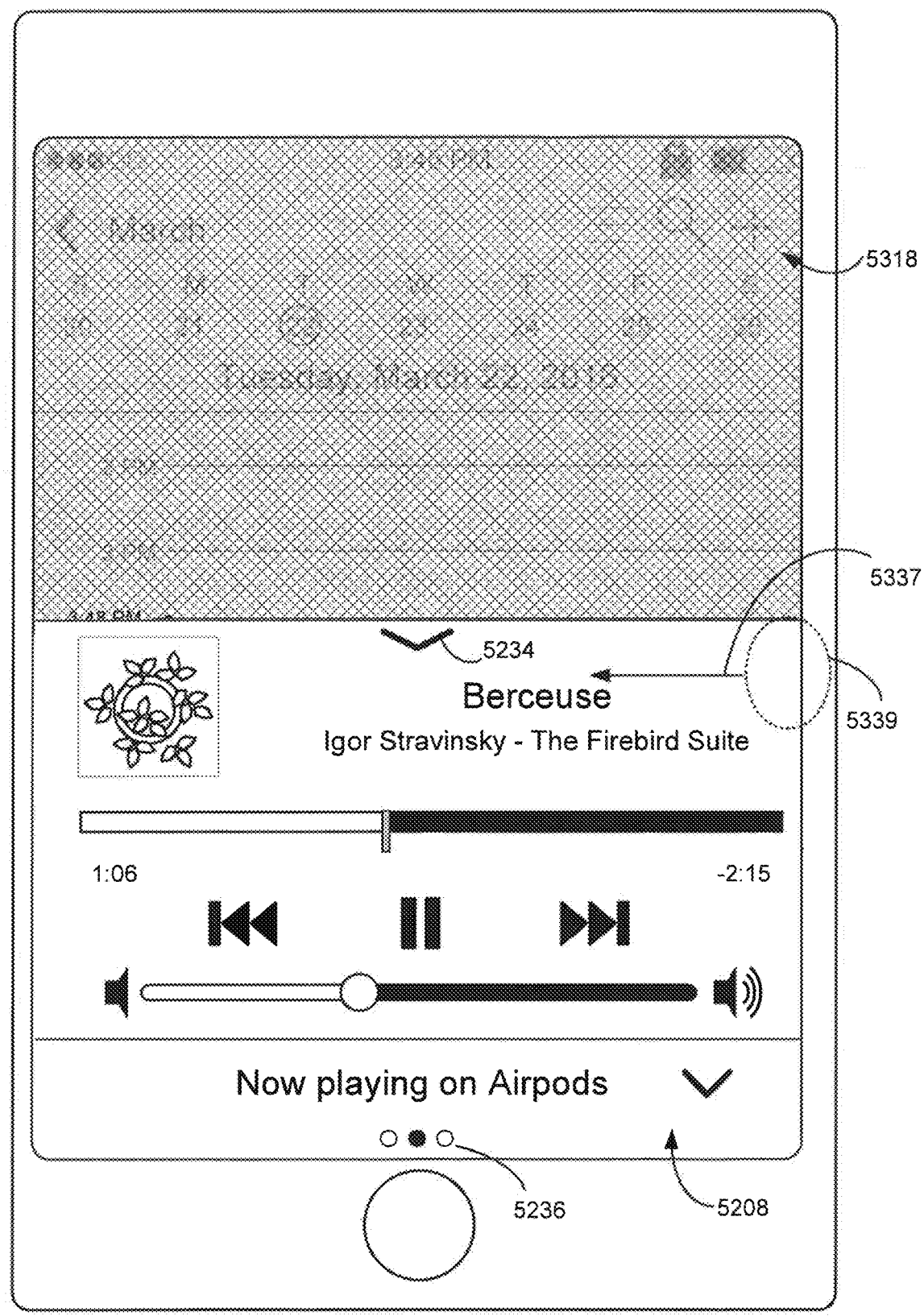
Figure 5A:
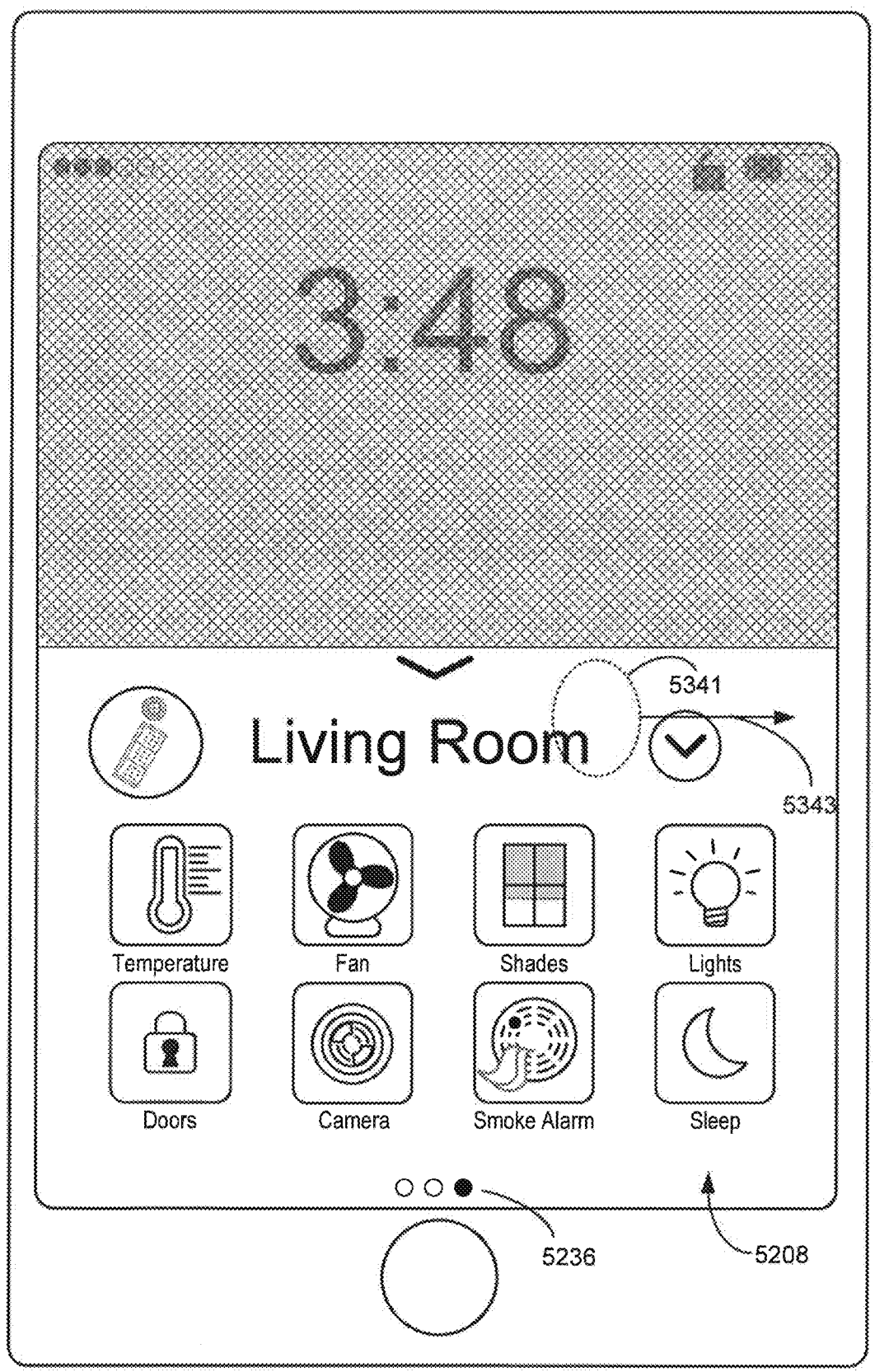
Figure 5B:
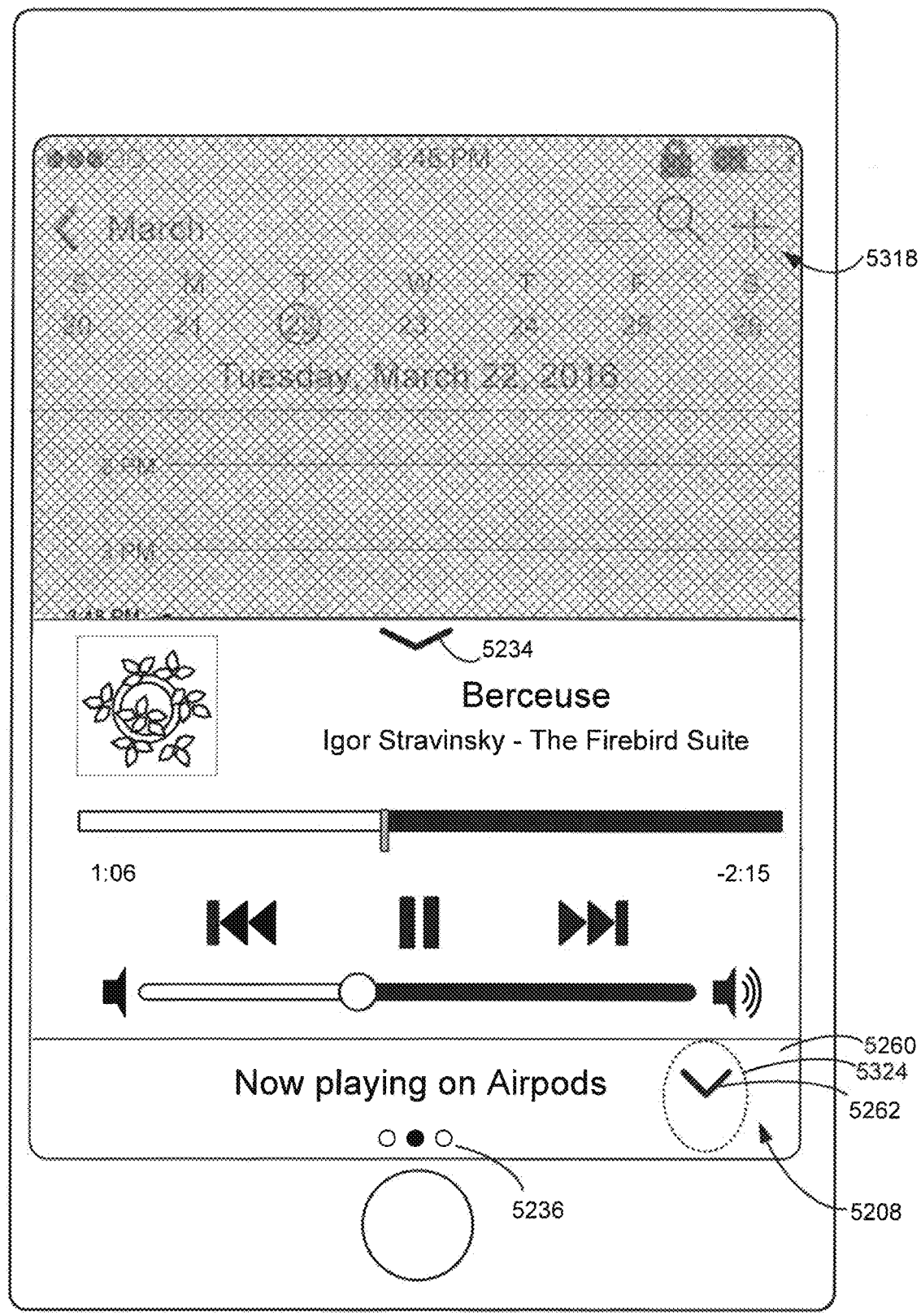
Figure 5B:
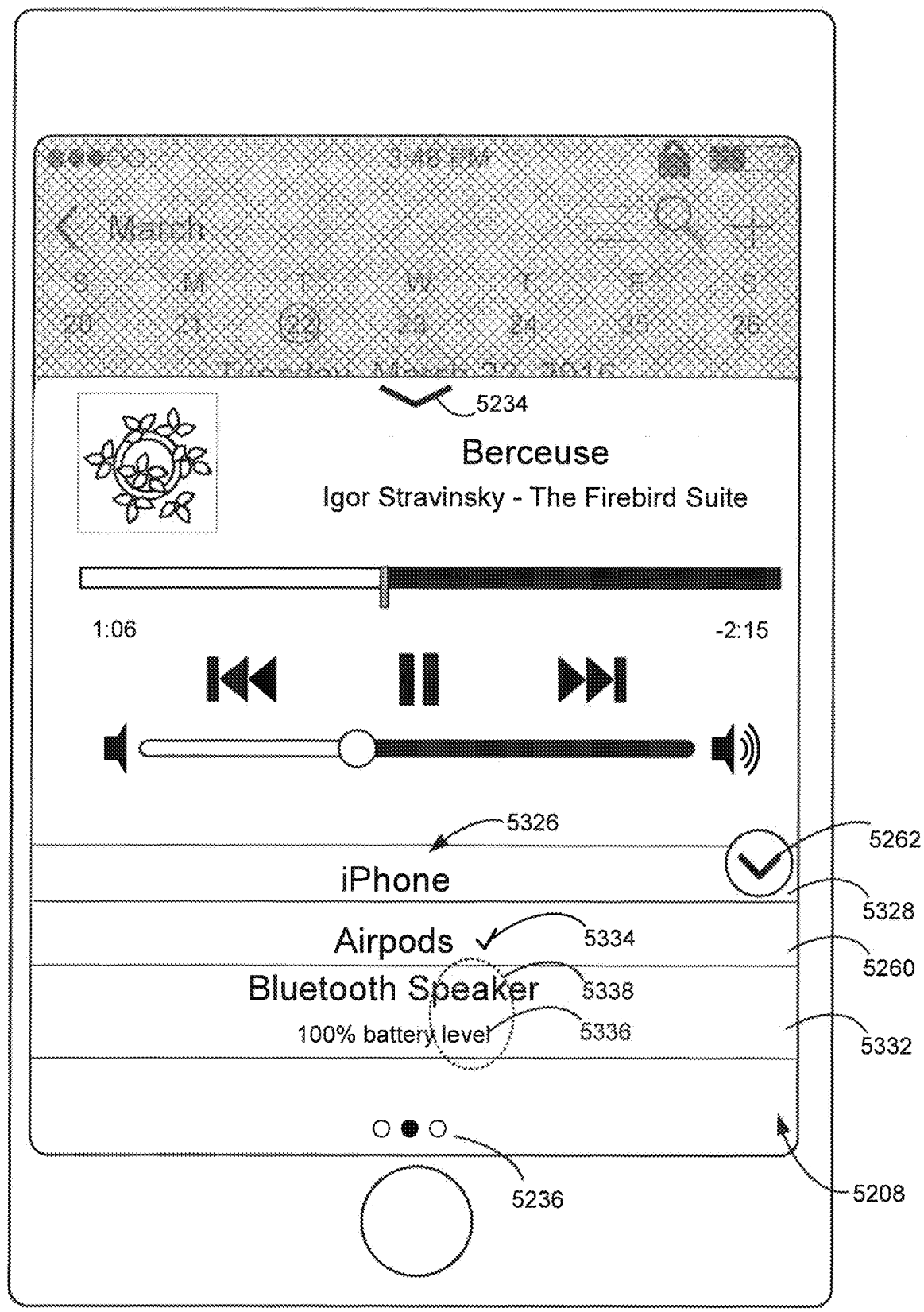
Figure 5B:
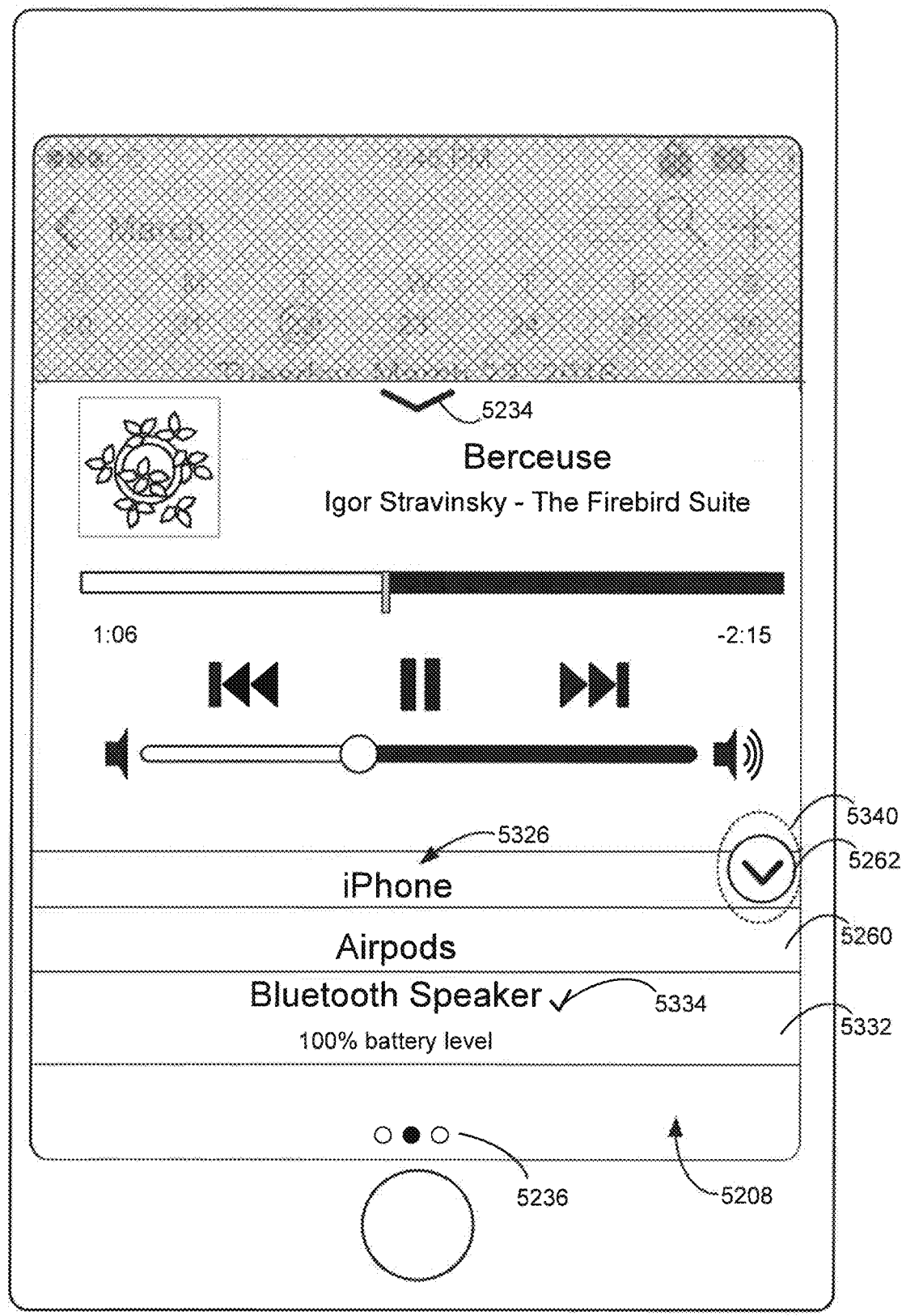
Figure 5B:
Figure 5B:
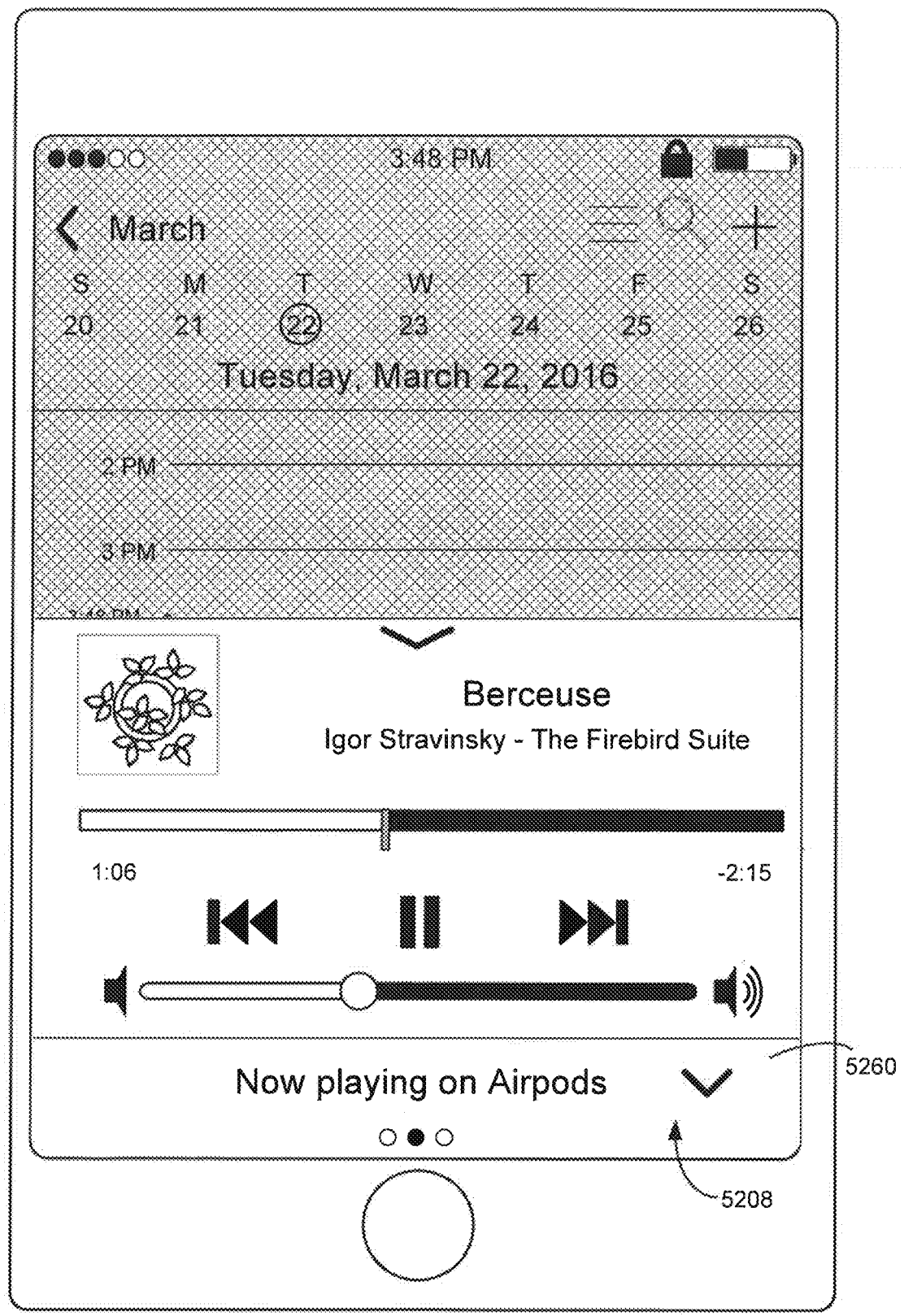
Figure 5B:
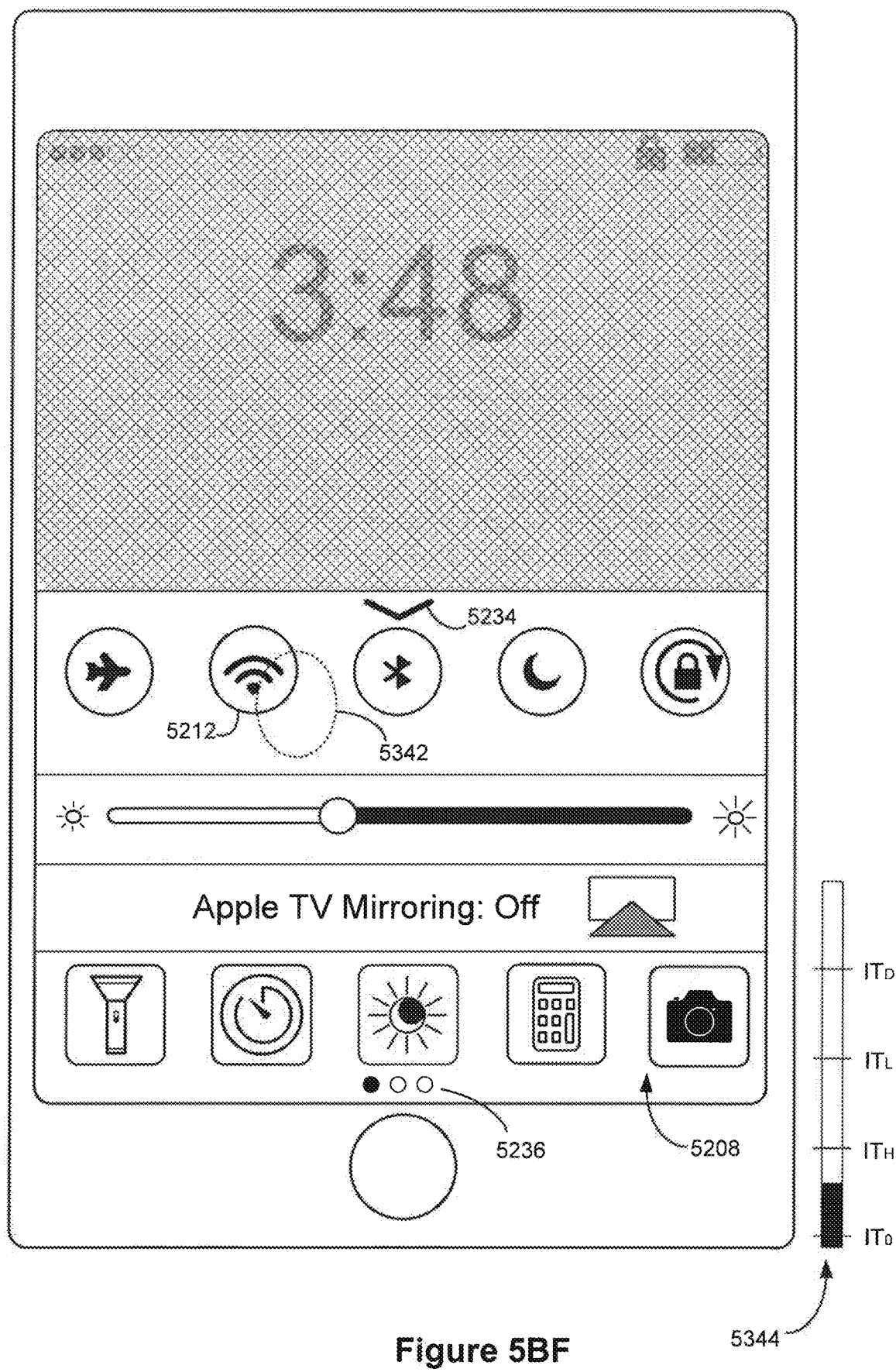
Figure 5B:
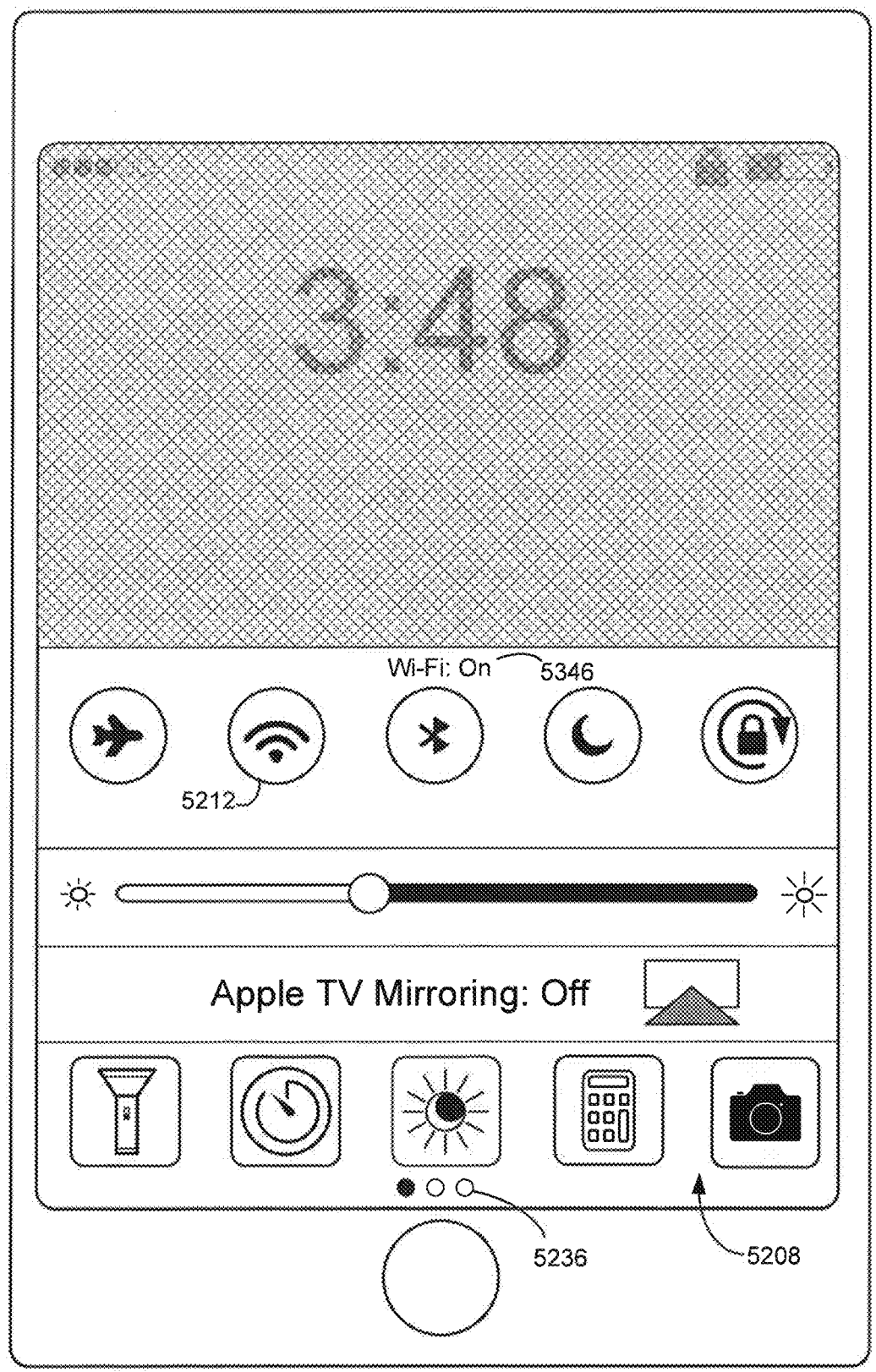
Figure 5B:
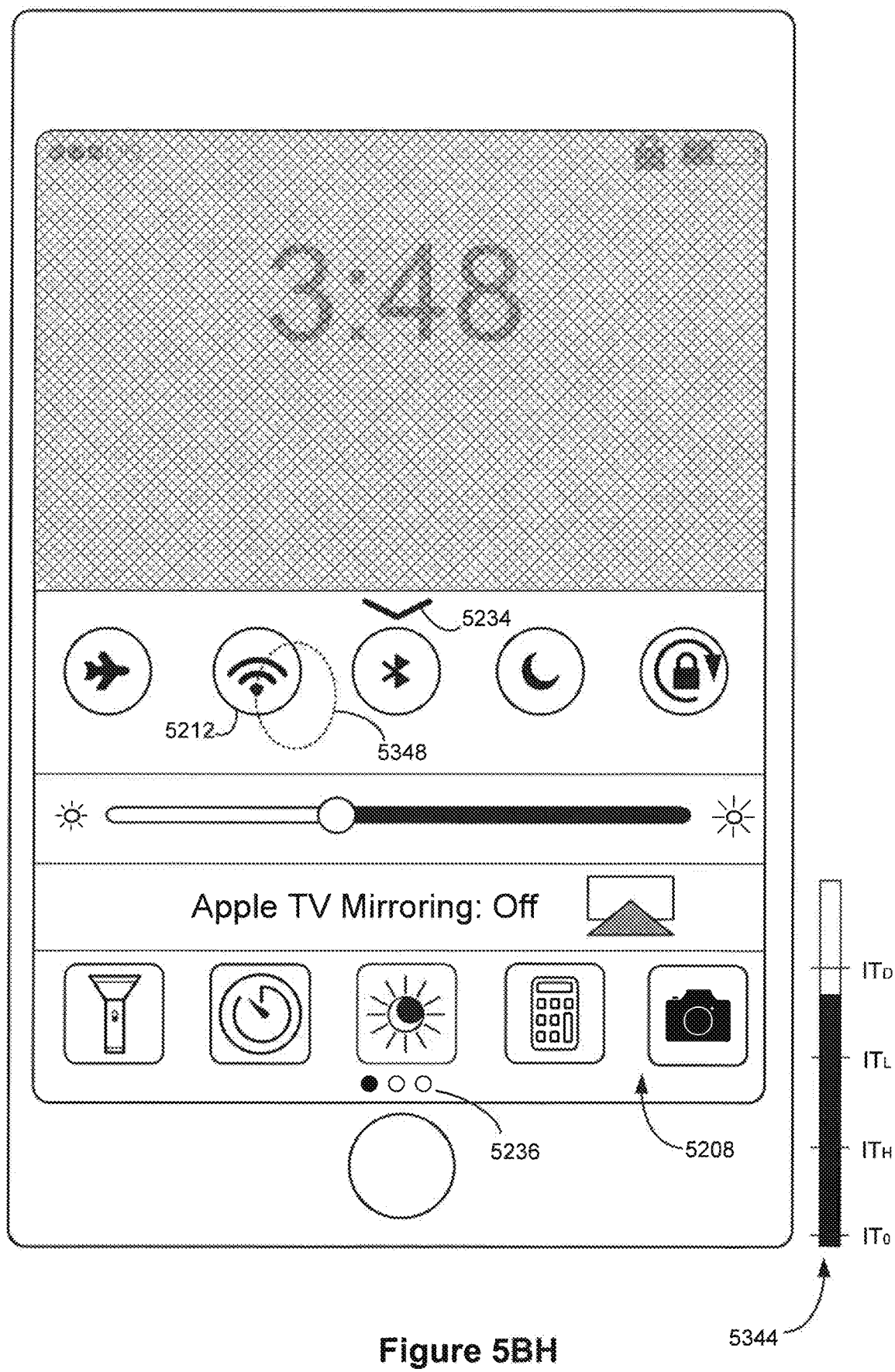
Figure 5B:
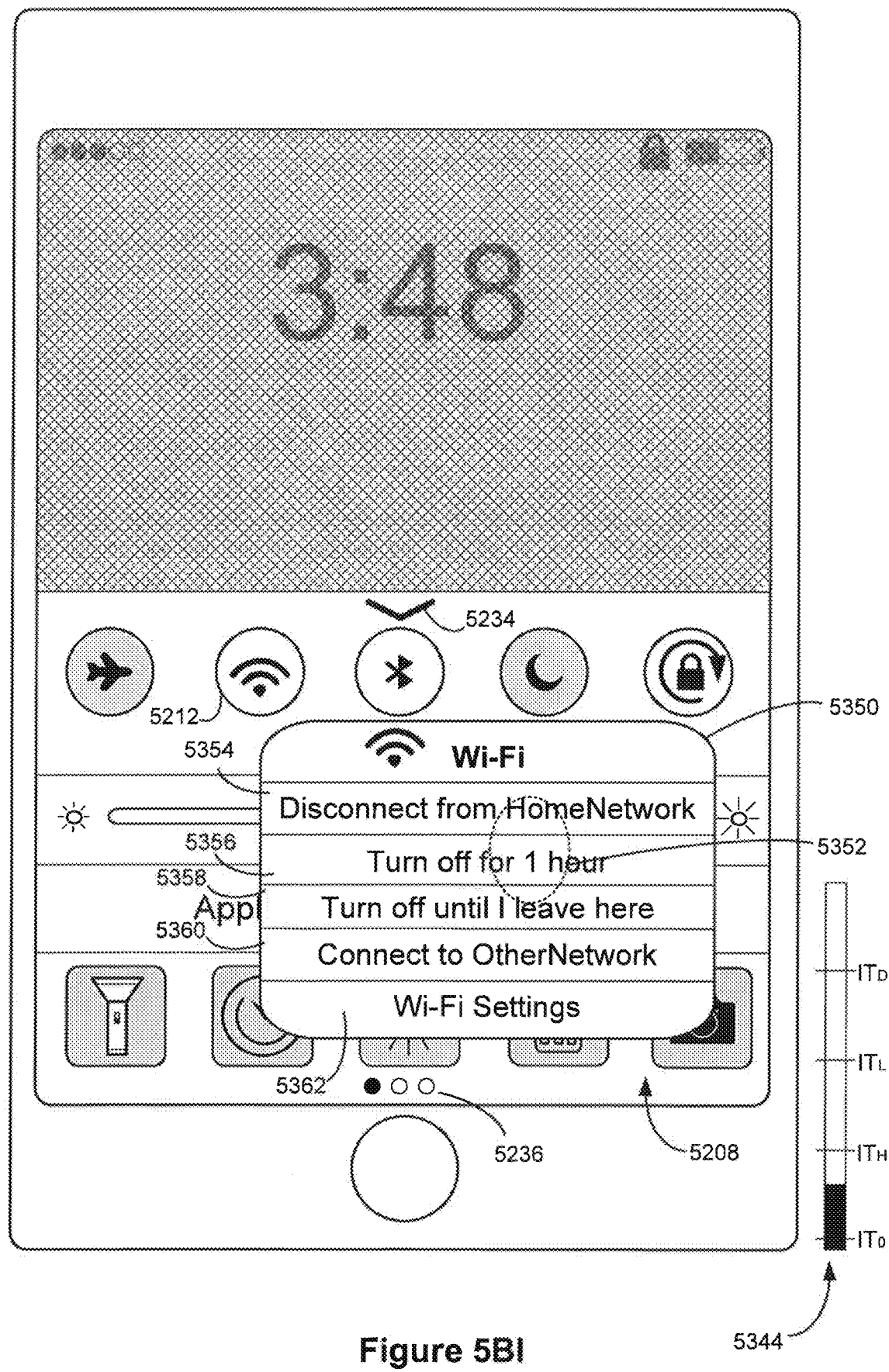
Figure 5B:
Figure 7B:
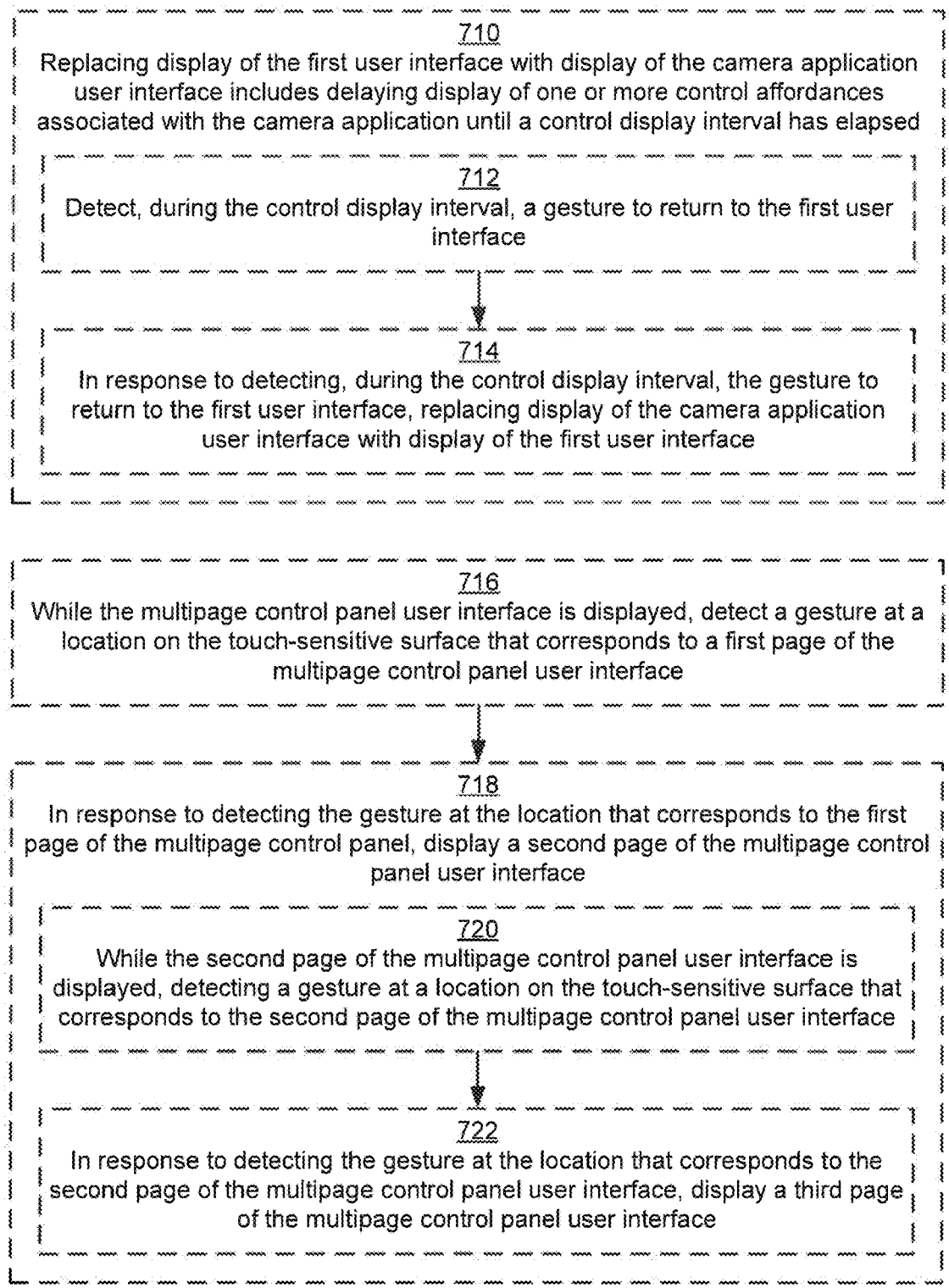

FIG. 5Y displays an expanded view of up next mini application 5132. The expanded view of up next mini application 5132 includes map 5134 indicating the location of the event that is up next and an action item menu including action items 5136 ("Directions"), 5138 ("Snooze"), 5140 ("Message Invitees"), and 5142 ("Delete Event"). An input by a contact 5143 is detected at a location that corresponds to up next mini application 5132. In response to detecting the input, the device displays a calendar application user interface 5144 that includes an indication 5146 of the event that is up next, as shown in FIG. 5Z.

FIGS. 5AA-5AD illustrate changes that occur in an application springboard user interface 400 as an input is received for displaying a quick action menu. In FIG. 5AA, an input by contact 5150 is detected at a location corresponding to mail application icon 418. Mail application icon 418 corresponds to a mail application (e.g., a mail application that is launched in response to a tap input detected at mail application icon 418). A characteristic intensity of the contact is indicated by intensity level meter 5148. In FIG. 5AB, the characteristic intensity of the contact increases above a hint intensity threshold level $IT_H$, as indicted by intensity level meter 5148. In some embodiments, in accordance with a determination that the characteristic intensity of the contact 5149 has increased above the hint intensity threshold level $IT_H$, a blurring effect is applied to at least part of user interface 400. As indicated in FIGS. 5AB-5AD, the blurring effect intensifies as the characteristic intensity of the contact increases. In some embodiments, in accordance with a determination that the characteristic intensity of the contact has increased above the hint intensity threshold level $IT_H$, a precursor view 5152 of a quick action menu 5154 that corresponds to mail icon 418 is displayed. As indicated in FIGS. 5AB-5AC, the size of precursor view 5152 increases as the characteristic intensity of the contact increases.

In FIG. 5AD, the characteristic intensity of the contact 5150 has increased above deep press intensity threshold $IT_D$. In some embodiments, one or more tactile output generators of the device 100 output a tactile output as indicated at 5150 in accordance with a determination that the characteristic intensity of the contact increased above deep press intensity threshold $IT_D$. In some embodiments, quick action menu 5154 that corresponds to mail application icon 418 is displayed. In some embodiments, a mini application preview 5156 that corresponds to a mail mini application 5162 is displayed (e.g., in a position that is proximate to quick action menu 5154 and/or on a platter that includes quick action menu 5154 and/or mini application preview 5156). In some embodiments, quick action menu 5154 and/or mini application preview 5156 are displayed at least partially overlaying application springboard user interface 400.

In FIG. 5AE, input by a contact 5158 is detected at "Add Widget" affordance 5160 of mini application preview 5156. In response to detecting the input, the device adds a mail mini application 5162 that corresponds to mini application preview 5156 to mini applications user interface 5122, as shown in FIG. 5AF. In some embodiments, In response to detecting the input by contact 5158 at "Add Widget" affordance 5160, the device displays mini applications user interface 5122 including mini application preview 5156.

In FIG. 5AF, mail mini application 5162 is displayed in mini applications user interface 5122. In some embodiments, mail mini application 5162 includes avatars 5164 (e.g., 5164a, 5164b, 5164c, and/or 5164d) that correspond to one or more e-mail senders that recently and/or frequently sent e-mail to device 100 and/or received e-mail from device 100. A badge 5166 at a location that corresponds to an avatar 5164a indicates, e.g., a number of unread e-mails received from an e-mail sender corresponding to avatar 5164a. An input by a contact 5170 is detected at a location that corresponds to an affordance 5168 for a displaying an expanded view of mail mini application 5162. In response to detecting the input, the device displays an expanded view of mail mini application 5162, as indicated in FIG. 5AG.

FIG. 5AG illustrates an expanded view of mail mini application 5162 displayed in mini applications user interface 5122. Additional avatars 5164e, 5164f, 5164g, and/or 5164h that were not shown in the non-expanded view of mail mini application 5162 are shown in the expanded view of mail mini application 5162.

FIG. 5AH illustrates a transition from a state in which wake screen interface 512 is displayed to a state in which a locked mode of camera application user interface 5172 is displayed. At a first time $t_1$, a leftward swipe gesture is initiated in which contact 5176 begins to move along a first part of the swipe gesture, as indicated by arrow 5178. At a second time $t_2$ that is after time $t_1$, a first part of camera application user interface 5172 is revealed by the first part of the swipe gesture and contact 5176 continues to move along a second part of the swipe gesture as indicated by arrow 5180. At a third time $t_3$ that is after time $t_2$, camera application user interface 5172 is further revealed by the second part of the swipe gesture and contact 5176 continues to move along a third part of the swipe gesture as indicated by arrow 5182. At a fourth time $t_4$ that is after time $t_3$, camera application user interface 5172 is further revealed by the third part of the swipe gesture and contact 5176 continues to move along a fifth part of the swipe gesture as indicated by arrow 5184. At a fifth time $t_5$ that is after time $t_4$, the locked mode of camera application user interface 5172 is fully revealed.

In some embodiments, one or more camera controls 5186 are not initially displayed in the locked mode of camera application user interface 5172. For example, one or more camera controls 5186 are revealed in camera application user interface 5172 after a delay from time $t_1$ at which the leftward swipe gesture is initiated (e.g., a delay for a period of time between time $t_1$ and time $t_3$). In some embodiments, one or more camera controls 5186 are revealed in camera application user interface 5172 after a threshold portion of camera application user interface 5172 has been revealed.

In some embodiments, when the locked mode of camera application user interface 5172 is displayed (e.g. as shown at time $t_5$ of FIG. 5AH), one or more images in an image library of device 100 are not accessible. For example, a most recently captured image is displayed in region 5188 when the unlocked mode of camera application user interface 5172 is displayed (e.g., as shown at time $t_5$ in FIG. 5AI) and no image is displayed in region 5188 when the locked mode of camera application user interface 5172 is displayed (e.g., as shown in region 5188 at time $t_5$ indicated in FIG. 5AH).

FIG. 5AI illustrates a transition from a state in which wake screen interface 512 is displayed to a state in which an unlocked mode of camera application user interface 5172 is displayed. At a first time $t_1$, a leftward swipe gesture is initiated in which contact 5190 begins to move along a first part of the swipe gesture, as indicated by arrow 5192. At a second time $t_2$ that is after time $t_1$, a first part of camera application user interface 5172 is revealed by the first part of the swipe gesture and contact 5190 continues to move along a second part of the swipe gesture as indicated by arrow 5194. At a third time $t_3$ that is after time $t_2$, camera application user interface 5172 is further revealed by the second part of the swipe gesture and contact 5190 continues to move along a third part of the swipe gesture as indicated by arrow 5196. At a fourth time $t_4$ that is after time $t_3$, camera application user interface 5172 is further revealed by the third part of the swipe gesture and contact 5190 continues to move along a fourth part of the swipe gesture as indicated by arrow 5198. At a fifth time $t_5$ that is after time $t_4$, the unlocked mode of camera application user interface 5172 is fully revealed.

In some embodiments, one or more camera controls 5186 are not initially displayed in the unlocked mode of camera application user interface 5172. For example, one or more camera controls 5186 are revealed in camera application user interface 5172 after a delay from time $t_1$ at which the leftward swipe gesture is initiated (e.g., a delay for a period of time between time $t_1$ and time $t_3$). In some embodiments, one or more camera controls 5186 are revealed in camera application user interface 5172 after a threshold portion of camera application user interface 5172 has been revealed. In this way, accidental operation of a camera application user interface is avoided.

In FIG. 5AJ, input to partially reveal camera application user interface 5172 is followed by input to re-reveal wake screen interface 512. In some embodiments, input to reveal camera application user interface 5172 is cancelled by ceasing a leftward swipe gesture (e.g., completing only a first part of the gesture before all of camera application user interface 5172 or a threshold portion of camera application user interface 5172 is revealed). In some embodiments, input to reveal camera application user interface 5172 is cancelled by providing an input (e.g., a rightward swipe gesture) before all of camera application user interface 5172 and/or before a threshold portion of camera application user interface 5172 is revealed. For example, an input is detected that includes first part 5178 and second part 5180 of a leftward gesture, followed by rightward gesture along a path indicated by arrow 5202. The rightward gesture cancels the revealing of camera application user interface 5172. In this way, accidental display and/or operation of a camera application interface are avoided.

In FIG. 5AK, wake screen interface 512 is displayed in a locked mode, as indicated by the locked state of lock icon 514. FIG. 5AK illustrates an upward swipe gesture (e.g., from the lower edge of touch screen 112) in which contact 5204 moves along a path indicated by arrow 5206. In response to the upward swipe gesture, a first page of a multi-page control panel user interface 5208 is displayed, as indicated in FIG. 5AL. In some embodiments, as the upward swipe occurs, an animation is displayed in which the multi-page control panel user interface 5208 appears to gradually slide upward from the lower edge of the display.

FIG. 5AL illustrates a first page of multi-page control panel user interface 5208. Multi-page control panel user interface 5208 includes a plurality of control affordances, e.g., 5210 (Airplane Mode), 5212 (Wi-Fi), 5214 (Bluetooth), 5216 (Do Not Disturb Mode), 5218 (Rotation Lock), 5220 (Flashlight), 5222 (Timer), 5224 (Night Shift), 5226 (Calculator), 5228 (Camera), 5230 (Apple TV Mirroring), and/or 5232 (Brightness). In some embodiments, one or more control affordances of the first page of multi-page control panel user interface 5208 are not available in a locked mode of the first page of multi-page control panel user interface 5208. In some embodiments, the appearance of one of more of the control affordances of the first page of multi-page control panel user interface 5208 indicates a state of the control affordance. For example, Wi-Fi control affordance 5212 is shown not shaded to indicate that Wi-Fi is enabled and Bluetooth control affordance 5214 is shown shaded to indicate that Bluetooth is disabled.

In some embodiments, multi-page control panel user interface 5208 includes a control user interface dismissal affordance 5234. In some embodiments, page indicator 5236 is used to indicate the page of the multipage control panel that is currently displayed. In some embodiments, multi-page control panel user interface 5208 is displayed partially or fully overlaying another user interface (e.g., an initial screen such as a lock screen and/or wake screen 5238 as shown in FIG. 5AL, an application springboard user interface 400, and/or an application user interface) at which input to display the control user interface is detected. In some embodiments, the appearance of a user interface (e.g., wake screen user interface 512) that is partially overlaid by the multi-page control panel user interface 5208 is altered, as indicated at 5238. For example, the partially overlaid user interface 512 is blurred and/or has reduced brightness compared with a prior appearance of the user interface.

In response to input by a contact 5241 that includes movement along a path indicated by arrow 5240 (e.g., a leftward swipe), a second page of the multi-page control panel user interface 5208 is displayed, as indicated in FIG. 5AM. In some embodiments, the second page of the multi-page control panel user interface 5208 includes a plurality of content playback control affordances, e.g., playback scrubber 5242, prior track control 5246, pause/play control 5248, next track control 5250, and/or volume adjustment control 5252. In some embodiments, the second page of the multi-page control panel user interface 5208 includes content routing destination information 5260 and/or an affordance 5262 for displaying/ceasing to display a routing destination menu. In some embodiments, the second page of the multi-page control panel user interface 5208 includes content information for currently playing and/or most recently played content, e.g., an image 5264 that represents the content (such as album art), and/or identifying information 5266 for the content (such as track title, album title, and/or artist). In some embodiments, one or more control affordances of the first page of multi-page control panel user interface 5208 are not available in a locked mode of the second page of multi-page control panel user interface 5208.

In response to input by a contact 5268 that includes movement along a path indicated by arrow 5270 (e.g., a leftward swipe), a third page of the multi-page control panel user interface 5208 is displayed, as indicated in FIG. 5AN. In some embodiments, the third page of the multi-page control panel user interface 5208 includes a plurality of remote device control affordances, e.g., temperature control 5272, fan control 5274, shades control 5276, lights control 5278, doors control 5280, camera control 5282, smoke alarm control 5284, and/or sleep control 5286. In some embodiments, one or more remote device controls are not available in a third page of a locked mode of the multi-page control panel user interface 5208. For example, remote device control affordances 5272-5286 are shown visually altered (e.g., shaded) from a default state of the control affordances 5272-5286 as displayed in an unlocked mode of the multi-page user interface 5208 to indicate that one or more remote device controls that correspond to visually altered remote device control affordances are not available in the locked mode. In this way, remote device control access is limited to adjustment by a user that has provided validation information to unlock the device. In some embodiments, the third page of the multi-page control panel user interface 5208 includes identifying information for a defined area (e.g., a scene, such as "Living Room") in which one or more remote devices controlled by the control affordances 5272-5286 are located (e.g., a name 5288 of the defined area and/or an image 5290 that corresponds to the area).

In some embodiments, the remote device control affordances 5272-5286 displayed in the third page of the multi-page control panel user interface 5208 are remote device control affordances that correspond to (e.g. are located in) a defined area (e.g., a room) in which device 100 is currently located, e.g., as determined by GPS and/or Wi-Fi signals received by the device). In some embodiments, the remote device control affordances 5272-5286 displayed in the third page of the multi-page control panel user interface 5208 are remote device control affordances that correspond to a most recently accessed defined area. In some embodiments, the third page of the multi-page control panel user interface 5208 includes an affordance 5292 for displaying/ceasing to display a plurality of defined area identifiers (e.g., a menu 5294 for displaying a plurality of defined area identifiers, as shown in FIG. 5AQ).

In FIG. 5AN, an input is provided by contact 5296 for operating lights control affordance 5278. Because the device is in a locked mode (as indicated by lock icon 514), user verification is required before the lights control affordance 5278 is operable. In some embodiments, in response to detecting an input at control affordance 5278 while a lock mode is active, the device displays verification prompt user interface 558. FIG. 5AO is a user verification prompt user interface 558 that includes a passcode entry interface 560. In accordance with a determination that the user verification information (e.g., provided via input by a contact 5295 at passcode entry interface 560 and/or a fingerprint sensor of physical button 204) is valid, an unlocked view of the third page of the multi-page control panel user interface 5208 is displayed, as shown at FIG. 5AP.

In FIG. 5AP, remote device control affordances 5272-5286 are shown without shading because the control affordances 5272-5286 are available for use in the unlocked mode of the device. An input (e.g., a tap gesture) is provided by contact 5296 at a location that corresponds to an affordance 5292 for displaying/ceasing to display a plurality of defined area identifiers. In response to the input, a menu 5294 including a plurality of defined area identifiers is displayed, as shown in FIG. 5AQ. In some embodiments, the visual appearance of affordance 5292 for displaying/ceasing to display the plurality of defined area identifiers changes in response to the input provided at the location that corresponds to affordance 5292. For example the orientation of the chevron icon of affordance 5292 changes from FIG. 5AP to FIG. 5AQ.

In FIG. 5AQ, a menu 5294 of a plurality of defined area identifiers (e.g., "Favorites" 5300, "Current Room" 5302, "Master Bedroom" 5304, "Office" 5306 and/or "Kitchen" 5308) is displayed. An input (e.g., a tap gesture) is provided by contact 5298 at a location that corresponds to an affordance 5292 for displaying/ceasing to display the plurality of defined area identifiers. In response to the input, menu 5294 of the plurality of defined area identifiers 5300-5308 ceases to be displayed, and the third page of the multi-page control panel user interface 5208 is re-displayed e.g., as shown in FIG. 5AR. In some embodiments, in response to an input (e.g., a tap input) received a respective defined area identifier of menu 5294, a set of control affordances that correspond to the selected respective defined area identifier are displayed.

As illustrated in FIGS. 5AR-5AS, in response to input by a contact 5310 that includes movement along a path indicated by arrow 5312 (e.g., a downward swipe), a third page of the multi-page control panel user interface 5208 ceases to be displayed, and underlying user interface 512 is redisplayed, as illustrated in FIG. 5AS. (In some embodiments, an input received at a location corresponding to control user interface dismissal affordance 5234 causes the multi-page control panel user interface 5208 to cease to be displayed, and underlying wake screen interface 512 to be redisplayed, as illustrated in FIG. 5AS.)

As illustrated in FIGS. 5AS-5AT, in response to input by a contact 5314 that includes movement along a path indicated by arrow 5316 (e.g., an upward swipe), the multi-page control panel user interface 5208 is redisplayed. In some embodiments, the most recently displayed page of multi-page control panel user interface 5208 (e.g., the third page of multi-page control panel user interface 5208) is redisplayed in response to the input, as illustrated in FIG. 5AT.

FIG. 5AU illustrates an input received by a contact 5322 (e.g., an upward swipe along a path indicated by arrow 5320) at an application user interface (e.g., calendar application user interface 5318) to display a first page of a multi-page control panel user interface 5208, as shown in FIG. 5AV.

In FIG. 5AV, an input by contact 5235 (e.g., a leftward swipe along a path indicated by arrow 5327) is received to display a second page of a multipage user interface 5208, as shown in FIG. 5AW.

In FIG. 5AW, the second page of the multi-page control panel user interface 5208 is displayed partially overlaying calendar application user interface 5318. In response to input to cease to display the multi-page control panel user interface 5208, (e.g., a downward swipe by contact 5329 along a path indicated by arrow 5331), the second page of the multi-page control panel user interface ceases to be displayed, and calendar application user interface 5318 is redisplayed, as indicated in FIG. 5AX.

In FIG. 5AX, input to redisplay multi-page control panel user interface 5208, (e.g., an upward swipe by contact 5333 along a path indicated by arrow 5335) is detected at calendar application user interface 5318. In response to detecting the input, the device redisplays the second page of redisplay multi-page control panel user interface 5208, as indicated at FIG. 5AY.

In FIG. 5AY, input to display a third page of multi-page control panel user interface 5208 (e.g., a horizontal swipe by contact 5339 along a path indicated by arrow 5337) is detected at the second page of multi-page control panel user interface 5208. In response to detecting the input, the device displays the third page of multi-page control panel user interface 5208, as indicated at FIG. 5AZ.

At FIG. 5AZ, input to display a second page of multi-page control panel user interface 5208 (e.g., a horizontal swipe by contact 5343 along a path indicated by arrow 5341) is detected at the third page of multi-page control panel user interface 5208. In response to detecting the input, the device displays second page of multi-page control panel user interface 5208, as indicated at FIG. 5BA.

In FIG. 5BA, in response to input (e.g., a tap input) by a contact 5324 at a location that corresponds to affordance 5262 for displaying/ceasing to display a routing destination menu, routing destination menu 5326 is shown, as illustrated at FIG. 5BB.

In FIG. 5BB, the second page of a multi-page control panel user interface 5208 includes routing destination menu 5326 that includes routing destinations 5328 ("iPhone"), 5260 ("Airpods"), and 5332 ("Bluetooth Speaker"). For example, the routing destination menu expands from content routing destination information region 5260 and the size of multi-page control panel user interface 5208 expands (vertically) to accommodate routing destination menu 5326. In some embodiments, one or more routing destinations include information that corresponds to the routing destination, such as an indication 5334 of a current routing destination (e.g., a checkmark icon) and/or a battery level indication 5336. In some embodiments, the visual appearance of affordance 5262 changes in response to the input provided at the location that corresponds to affordance 5262. For example, the orientation of the chevron icon of affordance 5262 changes from FIG. 5BA to FIG. 5BB.

In FIG. 5BB, in response to input (e.g., a tap input) by a contact 5338 at a location that corresponds to routing destination 5332 ("Bluetooth Speaker") the routing destination of content (e.g., currently playing content) is changed from routing destination 5260 ("Airpods") to routing destination 5332 ("Bluetooth Speaker"), as shown in FIG. 5BC.

In FIG. 5BC, content has been routed to destination 5332 ("Bluetooth Speaker") and/or ceased being routed to routing destination 5260 ("Airpods"), e.g., as indicated by the absence of an indication 5334 of a current routing destination in a region corresponding to routing destination 5260 ("Airpods") and the presence of an indication 5334 of a current routing destination in a region corresponding to routing destination 5332 ("Bluetooth Speaker"). In response to input (e.g., a tap input) by a contact 5340 at a location that corresponds to affordance 5262 for displaying/ceasing to display a routing destination menu 5326, routing destination menu 5326 is dismissed, as shown in FIG. 5BD.

In FIG. 5BD, an input to change a content routing destination (e.g., a horizontal swipe by contact 5323 along a path indicated by arrow 5345) is shown. In response to detecting the input to change the content routing destination, the device updates the content routing destination information region 5260 to indicate the changed content routing destination (e.g., "Airpods"), as shown in FIG. 5BE.

FIGS. 5BF-5BJ illustrate modifying the functionality of a control affordance of a first page of multi-page control panel user interface 5208, in accordance with some embodiments.

In FIG. 5BF, an input by a contact 5342 is detected at a location corresponding to Wi-Fi control affordance 5212 of the first page of multi-page control panel user interface 5208. As indicated by intensity meter 5344, the characteristic intensity of the contact is below hint press intensity threshold $IT_H$, light press intensity threshold $IT_L$, and deep press intensity threshold $IT_D$. In accordance with a determination that the characteristic intensity of the contact meets control toggle criteria (e.g., the characteristic intensity of the contact is below hint press intensity threshold $IT_H$), the input by contact 5342 toggles a Wi-Fi control that corresponds to the Wi-Fi control affordance 5212 from a disabled state to an enabled state.

FIG. 5BG illustrates first page of multi-page control panel user interface 5208 after the Wi-Fi control has been toggled from a disabled state, as indicated in FIG. 5BF, to an enabled state, as indicated in FIG. 5BG. To indicate that the Wi-Fi control has been toggled to an enabled state, the appearance of Wi-Fi control affordance 5212 is changed (e.g., visually altered, such as from a shaded state to a non-shaded state) and/or a notification 5346 (e.g., "Wi-Fi: On") is displayed.

FIGS. 5BH-5BI illustrate input to display modification options for the Wi-Fi control. In FIG. 5BH, an input by a contact 5348 at a location corresponding to Wi-Fi control affordance 5212 meets enhanced control criteria (e.g., the characteristic intensity of the contact 5348 increases above light press intensity threshold level $IT_L$, as indicated by intensity meter 5344, and/or the characteristic intensity of the contact 5348 increases above deep press intensity threshold level $IT_D$). In response to the input, a modification option menu 5350 including modification options 5354 ("Disconnect from HomeNetwork"), 5356 ("Turn off for 1 hour"), 5358 ("Turn off until I leave here"), 5360 ("Connect to OtherNetwork") and 5362 ("Wi-Fi Settings") is displayed. An input by contact 5352 is detected at a location that corresponds to modification option 5356 ("Turn off for 1 hour").

In FIG. 5BJ, in response to the input illustrated in FIG. 5BI, the Wi-Fi control is (temporarily) disabled, e.g., as indicated by the shaded state of Wi-Fi control affordance 5212 and the notification 5346 (e.g., "Wi-Fi: Off").

FIGS. 6A-6E illustrate a flow diagram of a method 600 of accessing controls from a display-on user interface, in accordance with some embodiments. The method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to access controls from a display-on user interface. The method reduces the cognitive burden on a user when accessing controls from a display-on user interface, thereby creating a more efficient human-machine interface. For battery-operated electronic devices, enabling a user to access controls faster and more efficiently conserves power and increases the time between battery charges.

While in a display-off state (e.g., as illustrated in FIGS. 5B and 5D), the device detects (602) a first input. In some embodiments, a display-off state is a state in which the display is turned off or dimmed, a state in which the touchscreen is turned off, and/or a state in which the display function of the touch screen is turned off while the touch-sensitive surface in the touchscreen remains active, e.g., as implemented in a sleep/dormant mode, a power saving mode, or another mode with limited functions. In some embodiments, the first input is an input on a display-activation affordance (e.g., a physical or virtual button) that meets display-activation criteria for activating the display of the device (e.g., wake the device and/or or wake the touch-screen display). For example, the first input is an input by contact 508 at physical button 204, as shown in FIGS. 5B and 5D. In some embodiments, the display-activation criteria do not require that a characteristic intensity of the contact in a detected input meets a respective intensity threshold in order for the display-activation criteria to be met (e.g., the display-activation criteria are met by a tap gesture). In some embodiments, display-activation criteria are met when lift-off of the contact is detected before a characteristic intensity of the contact exceeds a predetermined intensity threshold (if the display-activation affordance is a virtual button), or when the contact does not physically actuate the display-activation affordance (if the display-activation affordance is a physical button, such as physical button 204). In some embodiments, display-activation criteria are met by other types of inputs (e.g., a voice input, a user picking up and tilting the device, etc.) without requiring detecting a contact.

In response to detecting the first input, the device (604) activates the display (e.g., touch-screen display 112) of the device, and displays, on the display, a first user interface that corresponds to a display-on state of the device (e.g., the device displays a wake screen 512 as shown in FIG. 5C, the device displays a user interface that is shown immediately upon waking the device, or the device activates the display of the device).

While displaying the first user interface that corresponds to the display-on state of the device, the device detects (606) a swipe gesture (e.g., a downward gesture along a path indicated by arrow 518 in FIG. 5F-1, a downward gesture along a path indicated by arrow 536 in FIG. 5F-5, a rightward gesture along a path indicated by arrow 5120 in FIG. 5T-1, a rightward gesture along a path indicated by arrow 5121 in FIG. 5T-3, a leftward gesture as illustrated in FIG. 5AH, a leftward gesture as illustrated in FIG. 5AI, an upward gesture along a path indicated by arrow 5206 in FIG. 5AK, and/or an upward gesture along a path indicated by arrow 5314 in FIG. 5AS) on the touch sensitive surface.

In response to detecting the swipe gesture on the touch sensitive surface (608): in accordance with a determination that the device is in a locked mode of the display-on state (e.g., as indicated by a locked state of lock icon 514) and the swipe gesture is in a first direction (e.g., downward and/or rightward), the device replaces display of the first user interface (e.g., wake screen 512 as shown in FIG. 5C) with display of a second user interface, the second user interface displaying first content (e.g., a notifications screen as shown in FIG. 5F-2 and/or a mini application object screen as shown in FIG. 5T-2). In accordance with a determination that the device is in an unlocked mode of the display-on state (e.g., as indicated by an unlocked state of lock icon 514) and the swipe gesture is in the first direction (e.g., downward and/or rightward), the device replaces display of the first user interface with display of the second user interface, the second user interface displaying the first content and first additional content that is not displayed when the device is in the locked mode of the display-on state (e.g., restricted notification content and/or restricted mini application object content). For example, an unlocked mode of notifications user interface 520, as shown in FIGS. 5F-6 and 5H, includes additional content such as notification 550, text 546 of notification 542, and/or image 548 of notification 542 that is not shown in the locked mode of notifications user interface 520. An unlocked mode of mini application user interface 5122, as shown in FIGS. 5T-4 and FIG. 5X, includes additional content such as up next mini application 5132 and/or calendar event information (e.g., "Coffee with Jon," "Team Meeting") that is not shown in the locked view of calendar mini application 5125.

Displaying different content depending on whether a device is a locked mode or an unlocked mode provides efficient access to information available from the device while maintaining security for sensitive information available from the device. Providing secure access to information stored by the device enhances the operability of the device and makes the user-device interface more efficient (e.g., by allowing a user to access information in a display-on state of the device without fully activating the device) which, additionally, reduces power usage and improves battery life of the device by enabling the user to use the device more quickly and efficiently.

In some embodiments, a notification includes information that corresponds to a communication, such as a telephone call, video call, voicemail, e-mail, SMS, MMS, and/or calendar invitation received by the device. In some embodiments, a notification is a calendar appointment notification, a calendar appointment invitation, a reminder, and/or another type of notification generated by an application installed on the device.

In some embodiments, the first content includes (610) one or more notifications (e.g., that do not include restricted notification information) and the first additional content includes restricted notification information (e.g., notification content and/or other notification information that is subject to restricted access by a setting, such as a privacy and/or security setting, of the device). For example, the first additional content includes contextual information, such as earlier communication content in a thread that includes the first content in a conversation transcript (such as message 568 that precedes a received message 548 for which notification 542 was generated, as shown in FIG. 5M) and/or calendar information for a range of time that corresponds to a time associated with a calendar appointment notification in the first content (e.g., contextual calendar information 582 as shown in the expanded view of calendar invitation message notification 550 as shown in FIG. 5P). In some embodiments, when the device is in the unlocked mode of the display-on state, the second user interface (e.g., as shown at FIGS. 5F-6, 5G, 5M, 5N, 5P, 5R-2, and 5S-2) includes longer versions of the notifications that are shown in the second user interface when the device is in the locked mode of the display-on state (e.g. as shown at FIGS. 5F-2 and 5H). The longer version of a notification includes expanded notification content that, for example, includes all of the content in the short version or standard version of the notification, and some additional content that is not included in the short version or standard version of the notification. In some embodiments, the expanded notification content includes more complete versions of the notification content shown in the short version of the notification. In some embodiments, the expanded notification content includes images, interactive controls, selectable options for performing actions with respect to the notification, that are not included in the short versions of the notification.

In some embodiments, the first content includes (612) one or more mini application objects (e.g., one or more "widgets") and the first additional content includes restricted mini application object information (e.g., mini application object information and/or other information that is subject to restricted access by a setting, such as a privacy and/or security setting of the device). For example, calendar mini application 5125 as shown in the unlocked mode of mini applications user interface 5122 (e.g., as shown in FIGS. 5T-4, 5W, and 5X), includes mini application object information that is not displayed in calendar mini application 5125 (e.g., as shown in FIGS. 5T-2 and 5U).

In some embodiments, restricted mini application object information and/or restricted notification information includes, e.g.: contextual content (such as additional messages in a conversation transcript or an expanded view of a calendar), photo content, video, audio, live updating content (such as a transportation application map view showing real time vehicle location), a control (e.g., an action button), a list of favorite contacts of the user, and/or a keyboard for entering text inline (e.g., when a "respond" control is operated in a communication notification). For example, additional content includes, e.g., contextual content (e.g., messages 568 and 570) and/or reply affordance 572 in the expanded view of message notification 542 as shown in FIG. 5M; message input area 578 and/or keyboard 576 in the expanded view of message notification 542 as shown in FIG. 5N; invitation message notification 550 as shown in FIGS. 5O and 5P (but not present in the locked mode of notifications user interface 520); playback controls for playing back the voicemail audio (such as play/pause control 596, playback position slider 598, and/or volume control 5100), transcript 5102 of the voicemail in the expanded view of voicemail notification 544, and/or action items 5104 ("Call Back") and 5106 ("Delete") as shown in FIG. 5R-2; map 5112 and/or action item 5118 ("Call Driver") in expanded view of notification 5108 as shown in FIG. 5S-2; calendar event information (e.g., "Coffee with Jon," "Team Meeting," "Meet Shelby at Shellfish Market") and the expanded calendar time range of the expanded view of calendar mini-application 5125, up next mini application 5132 as shown in FIGS. 5W and 5Y, and/or additional avatars 5164e-5164h in the expanded view of mail mini application 5162, as shown in FIG. 5AG).

Displaying mini application objects in an interface accessible in a display-on state of the device allows a user to view information (e.g., prevalent information, such as frequently accessed, user-designated, and/or otherwise designated information) from an application without fully activating a device and/or activating the application. Providing access to application information in a display-on state of the device enhances the operability of the device and makes the user-device interface more efficient (e.g., by allowing a user to access information in a display-on state of the device without fully activating the device) which, additionally, reduces power usage and improves battery life of the device by enabling the user to use the device more quickly and efficiently.

In some embodiments, in response to detecting the swipe gesture on the touch sensitive surface (614): in accordance with a determination that the device is in the locked mode of the display-on state (e.g., as shown in FIGS. 5F-1 and/or 5T-1) and the swipe gesture is in a second direction (e.g., rightward, as shown in FIG. 5T-1 and/or downward, as shown in FIG. 5F-1), distinct from the first direction, the device replaces display of the first user interface with display of a third user interface, the third user interface displaying second content (e.g., a mini application objects screen, as shown in FIG. 5T-2 and/or a notifications screen, as shown in FIG. 5F-2); and, in accordance with a determination that the device is in the unlocked mode of the display-on state (e.g., as shown in FIGS. 5F-5 and 5T-3) and the swipe gesture is in the second direction (e.g., rightward, as shown in FIG. 5T-3 and/or downward, as shown in FIG. 5F-5), the device replaces display of the first user interface with display of the third user interface, the third user interface displaying the second content and second additional content that is not displayed when the device is in the locked mode of the display-on state (e.g., restricted mini application object content (e.g., as shown in FIG. 5T-4) and/or restricted notification content or other notification information that is subject to restricted access by privacy and/or security settings on the electronic device (e.g., as shown in FIG. 5F-6).

In some embodiments, the swipe gesture is in a third direction (e.g., leftward, e.g., as shown in FIGS. 5AH and 5AI), distinct from the first direction and the second direction. In accordance with a determination that the device is in the unlocked mode (e.g., as shown in FIG. 5AI), the first user interface is replaced with display of a fourth user interface that is associated with a camera application (e.g., camera application user interface 5172). In accordance with a determination that the device is in the locked mode (e.g., as shown in FIG. 5AH), the first user interface is replaced with display of a fourth user interface that is associated with the camera application and access to an image library that is associated with the camera application is limited (e.g., only images captured since the first input was received are accessible).

In some embodiments, the swipe gesture is in a fourth direction (e.g., upward, e.g., along a path indicated by arrow 5206 as shown in FIG. 5AK and/or a path indicated by arrow 5314 in FIG. 5AS), distinct from the first direction, the second direction, and the third direction. In accordance with a determination that the device is in the unlocked mode (e.g., as shown in FIG. 5AS), the first user interface 512 is replaced with display of a control panel user interface (e.g., a multipage control panel user interface 5208). In some embodiments, in accordance with a determination that the device is in the locked mode (e.g., as shown in FIG. 5AK), the first user interface 512 is replaced with display of the multipage control panel user interface 5208 and at least one panel and/or control of the control panel user interface 5208 is not accessible (e.g., as described with regard to FIG. 5AN). For example, remote device controls, such as home accessory controls (e.g., remote device control affordances 5272-5286), are inoperable and/or not displayed when the device is in the locked mode (e.g., as indicated by the locked state of lock icon 514 in FIG. 5AN). In some embodiments, in accordance with the determination that device is in the locked mode, the device displays lock mode indicia (e.g., a closed padlock icon 514) on the first user interface 512, the second user interface (e.g., notifications user interface 520 and/or mini applications user interface 5122), the third user interface (e.g., notifications user interface 520 and/or mini applications user interface 5122), the fourth user interface (e.g., camera application user interface 5172), and/or the control panel user interface 5208. In some embodiments, in accordance with the determination that device is in the unlocked mode, the device displays unlock mode indicia (e.g., an opened padlock icon, such as the unlocked state of lock icon 514) on the first user interface, the second user interface, the third user interface, the fourth user interface, and/or the control panel user interface.

In some embodiments, the second content includes (616) one or more mini application objects (e.g., calendar mini application 5125, weather mini application 5126, up next mini application 5132, and/or mail mini application 5162); and the second additional content includes restricted mini application object information.

In some embodiments, the second content includes (618) one or more notifications (e.g., calendar invitation notification 550, message notification 542, voicemail notification 544, and/or notification 5108); and the second additional content includes restricted notification information.

In some embodiments, the second user interface includes (620) a first search input region 524 (e.g., as shown in FIGS. 5F-2 to 5F-4 and 5F-6 to 5F-8) and the third user interface includes a second search input region 5124 (e.g., as shown in FIGS. 5T-2 and 5T-4).

In some embodiments, the device detects (622) input in a respective search input region (e.g., search input region 524, which contains the input word "movie," and/or search input region 5124) of the first search input region and the second search input region (e.g., text input for filtered search).

In response to detecting the input in the respective search region: in accordance with a determination that the device is in a locked mode of the display-on state, the device displays (624) a first set of search results (e.g., as shown in FIGS. 5F-4 and 5I). In accordance with a determination that the device is in an unlocked mode of the display-on state, the device displays a second set of search results (e.g., a set of search results that includes additional search results that are restricted due to security and/or privacy policies of the device and that are not included in the first set of search results), distinct from the first set of search results (e.g., as shown in FIGS. 5F-6 and 5J). For example, message 552, message 554, and e-mail 556 are shown in FIG. 5J, which illustrates an unlocked mode of the device, but are not shown in FIG. 5I, which illustrates a locked mode of the device.

In some embodiments, the determination of whether the device is in the unlocked mode or the locked mode of the display-on state is made (626) in response to detecting the first input (e.g., at the time when the activation of the display occurs), such as the input by contact 508 illustrated in FIG. 5D.

In some embodiments, the determination of whether the device is in the locked mode of the display-on state or the unlocked mode of the display-on state is made (628) in response to detecting the swipe gesture (e.g., as described with regard to 606) on the touch sensitive surface (e.g., after the time when the activation of the display has occurred).

In some embodiments, the electronic device includes (630) one or more sensors (including, e.g., an accelerometer, gyro, microphone, vibration sensors, heat sensors, touch sensors, and/or light sensor) and detecting the first input (to activate the display of the device) includes: detecting, with the one or more sensors, a change in a context of the device (e.g., the device is lifted, as illustrated at FIGS. 5A-1 to 5A-4). In some embodiments, a change in the context device is, e.g., a change in the internal and/or external state of the device, such as a change in the orientation of the device and/or a change in the environment (e.g., light level) of the device. For example, the change in the context of the device occurs when a user lifts a device from a table and/or removes the device from a pocket to view the device held in hand 502 and/or in response to detection of a trigger phrase or keyword spoken by a user. In response to detecting the change in the context of the device, the device determines whether the change in the context of the device meets display-activation criteria. In some embodiments, display-activation criteria include one or more of tilt criteria (e.g., a threshold variation from an initial position and/or a threshold variation from a horizontal axis), acceleration criteria, and/or light level change criteria. In some embodiments, the output of the one or more sensors is used to prevent false positives. For example, if the light level change criteria are met but an amount of acceleration is below a threshold acceleration level (e.g., that is distinct from the acceleration criteria), the display-activation criteria are not met. In some embodiments, as an orientation of the device changes, the wallpaper and/or the notifications expand as the change in orientation occurs (e.g., as illustrated at FIGS. 5A-3 to 5A-4).

In some embodiments, detecting the first input (to activate the display of the device) includes (632) detecting activation of a display-activation affordance (e.g., the physical button 204 and/or a virtual button on a touch-sensitive surface 112). In some embodiments, detecting activation of a display-activation affordance includes detecting operation of a physical button 204, such as a sleep/wake button 206. In some embodiments, detecting activation of a display-activation affordance includes detecting, by one or more sensors to detect intensity of contacts with the touch-sensitive surface (e.g., at a location that corresponds to a virtual button, such as a virtual home button that is configured to detect force, contact area, and/or fingerprints), an increase in the characteristic intensity of a contact that meets a respective threshold intensity (e.g., $IT_A$ as indicated by intensity meter 510 of FIG. 5D).

In some embodiments, detecting the first input (to activate the display of the device) includes (634) detecting a contact with a display-activation affordance (e.g., a physical sleep/wake button 206 and/or a physical home button 204) that activates the display-activation affordance (e.g., to activate the display of the device) and that does not actuate the display-activation affordance. In some embodiments, the contact with the display-activation affordance that does not actuate the display-activation affordance is a contact with a physical button 204 that does not move and/or depress the physical button (e.g., a light touch on a button that contains a fingerprint sensor, such as the physical home button, for a Touch ID scan), as illustrated at FIG. 5B.

In some embodiments, detecting the first input (to activate the display of the device) includes (636) detecting a contact with a display-activation affordance (e.g., a virtual button and/or a physical button 204) that activates the display-activation affordance to activate the display of the device (e.g., wake the device, or wake the touchscreen display) and that does not activate the display-activation affordance to perform at least one additional function associated with the display-activation affordance. In some embodiments, the display-activation affordance is a virtual button or physical button 204 that triggers performance of different functions in response to contacts of different levels of intensities. For example, a contact with a characteristic intensity below a first intensity threshold (e.g., $IT_A$ as indicated by intensity meter 510 of FIG. 5B) activates a first function associated with the virtual button (e.g., to activate the display of the device), and a contact 508 with a characteristic intensity at or above the first intensity threshold (e.g., as illustrated in FIG. 5D) activates a second function associated with the virtual button (e.g., to unlock the device (if the device is locked) and displays the home screen (e.g., application springboard user interface 400, as shown in FIG. 5E).

In some embodiments, while the first user interface 512 is displayed, the device detects (638) a second input, and, in response to detecting the second input, the device replaces display of first user interface with display of a user interface that includes a plurality of application icons that correspond to different applications of a plurality of applications at a time after a second swipe gesture in a direction opposite the first direction is detected on the touch-sensitive surface. For example, the device detects a second input that includes a contact 508 on the display-activation affordance (for example, physical button 204 or a virtual button) e.g., that meets device-unlocking criteria for unlocking the device (if device is locked) and, in response to the second input, the device displays the home screen (e.g., application springboard user interface 400, as shown in FIG. 5E). In some embodiments, the device-unlocking criteria require that a characteristic intensity of the contact in a detected input meet or exceed a respective intensity threshold (e.g., if the display-activation affordance is a virtual button). For example, in some embodiments, the device-unlocking criteria include a criterion that is met when a characteristic intensity of a contact increases above a deep press intensity threshold $IT_D$. In some embodiments, the device-unlocking criteria require that the contact physically actuates the display-activation affordance (if the display-activation affordance is a physical button 204), e.g., as illustrated at FIG. 5D. In some embodiments, in response to detecting the second input, the device replaces display of the first user interface (e.g., the wake screen user interface 512) with display of a user interface that includes a plurality of application icons that correspond to different applications of a plurality of applications (e.g., the user interface that includes the plurality of application icons is an application springboard user interface 400, e.g., as shown in FIG. 5E). In some embodiments, the second input includes depression of a physical button (e.g., the home button). In some embodiments, the second input includes detecting, by one or more sensors to detect intensity of contacts with the touch-sensitive surface (e.g., at a location that corresponds to a virtual button, such as a virtual home button that is configured to detect force and/or fingerprints), an increase in the characteristic intensity of the contact that meets the device-unlocking criteria for unlocking the device (if device is locked) and displaying the home screen. In some embodiments, when an input detected on a respective application icon in the user interface that includes the plurality of application icons meets application launching criteria, the device launches the application that corresponds to the respective application icon. In some embodiments, the application launching criteria are met by a tap input, e.g., without requiring that a characteristic intensity of the tap input meet a respective intensity threshold.

In some embodiments, in response to detecting the second input: the device determines (640) whether the device is in a locked mode of the display-on state or an unlocked mode of the display-on state; and in accordance with a determination that the device is in the locked mode of the display-on state, (e.g., the device is not unlocked by a Touch ID scan that occurs as the second input is provided and/or the device has not been unlocked by a prior input that was provided before the second input was provided), the device displays an authentication user interface (e.g., that prompts the user to provide unlock input to unlock the device), such as a user verification prompt user interface 558 that includes a passcode entry interface 560, as shown at FIG. 5L.

In some embodiments, detecting the first input includes (642) detecting activation of a display-activation affordance. For example, the first input includes a contact 508 on the display-activation affordance (for example, physical button 204 or a virtual button).

In some embodiments, a respective mini application object is configured to (644) perform a subset, less than all, of the functions of a corresponding application of the respective mini application object.

In some embodiments, a respective mini application object (e.g., mini application object 5125 shown in FIG. 5U) displays (646) an identifier (e.g., text 5131 that identifies the corresponding application and/or an icon 5135 that identifies the corresponding application, as shown in FIG. 5U) for a corresponding application of the respective mini application object.

In some embodiments, a respective mini application object displays (648) a portion of content from a corresponding application of the respective mini application object. For example, calendar mini application 5125 includes a portion of content from a calendar application as illustrated by calendar application user interface 5144 in FIG. 5Z (e.g., the portion of content includes a subset of hours, such as hours that are proximate to a current time, from a schedule for a day in a calendar application).

In some embodiments, a predefined input (650) on a respective mini application object (e.g., input including a contact 5143 at a location that corresponds to up next mini application object 5132, as shown in FIG. 5Y) launches an application (e.g., a calendar application, as shown by calendar application user interface 5144 in FIG. 5Z) that corresponds to the respective mini application object.

In some embodiments, a respective mini application object operates (652) as a standalone application residing in memory of the device, distinct from an associated application also residing in the memory of the device.

In some embodiments, a respective mini application object operates (654) as an extension or component of an associated application on the device.

In some embodiments, a respective mini application object has (656) a dedicated memory portion for temporary storage of information.

In some embodiments, the memory portion is accessible (658) by a corresponding full-featured application of the respective mini application object.

In some embodiments, a notification is a data object that is issued by an application (or a server associated with the application) for display outside of the normal user interface of the application by the operating system (or a notification management module of the operating system). The notification may include data retrieved from a data store that is accessible by both the notification and the application associated with the notification. In some embodiments, a notification may include programmable components (e.g., mini application objects or extensions) that dynamically load or generate data for display on the device. In some embodiments, a notification received from an application (or a server associated with the application) includes data for generating both a short, more abbreviated displayable version and a long, more complex displayable version of the notification for display on the device.

In some embodiments, a mini application object is configured to perform a subset, less than all, of the functions of a corresponding application.

In some embodiments, a mini application object displays an identifier for the corresponding application.

In some embodiments, a mini application object displays a portion of the content from the corresponding application. For example, a map mini application object displays a portion of a map that is displayed in a map application that corresponds to the map mini application object. For example, a calendar mini application object displays a portion of a calendar that is displayed in a corresponding calendar application.

In some embodiments, a predefined input on a mini application object launches the corresponding application.

In some embodiments, a mini application object operates as a standalone application residing in memory of the device, distinct from an associated application also residing in the memory of the device. For example, a mini application object corresponding to a social networking application operates as a single-purpose or streamlined application with a subset, less than all, of the functionality of the corresponding application, but is associated with the full-featured social networking application. In this example, the mini application object operates independently of the social networking application, and in a scenario where the social networking application is not running, the mini application object continues to operate.

In some embodiments, a mini application object operates as an extension or component of an associated application on the device. For example, a mini application object for a calendar application is a single feature or operational component of the full-featured calendar application. In this example, if the calendar application is not running (e.g., in the background), the calendar mini application object does not operate either.

In some embodiments, a mini application object has a dedicated memory portion for temporary storage of information. In some embodiments, this memory portion can be accessed by the corresponding full-featured application. For example, a mini application object for an instant messaging application has a memory portion for temporary storage of partially written reply messages. In this example, if the user opens the corresponding application in the middle of writing a reply message, the contents of the reply message are retrieved from the temporary storage location and used by the full-featured application to allow the user to complete his reply message.

In some embodiments, a mini application is a combination of any of the features described in the seven paragraphs immediately preceding this paragraph.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6E. For example, the contacts, gestures, user interface objects, intensity thresholds, focus selectors, and animations described above with reference to method 600 optionally have one or more of the characteristics of the contacts, gestures, user interface objects, intensity thresholds, focus selectors, and animations described herein with reference to other methods described herein (e.g., methods 700, 800, and 900). For brevity, these details are not repeated here.

FIGS. 7A-7E illustrate a flow diagram of a method 700 of accessing controls from a display-on user interface in accordance with some embodiments. The method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to access controls from a display-on user interface. The method reduces the cognitive burden on a user when accessing controls, thereby creating a more efficient human-machine interface. For battery-operated electronic devices, enabling a user to access controls faster and more efficiently conserves power and increases the time between battery charges.

While the device is in a display-off state (e.g., a state in which the display is turned off or dimmed, a state in which the touchscreen is turned off, and/or a state in which the display function of the touch screen is turned off while the touch-sensitive surface in the touchscreen remains active, e.g., as implemented in a sleep/dormant mode, a power saving mode, or another mode with limited functions), the device detects (702) a first input, e.g., an input by a contact 508 at a physical button 204, as shown at FIG. 5B, to activate the display of the device (e.g., wake the device or wake the touchscreen display).

In response to detecting the first input (704): the device activates the display of the device, and displays, on the display, a first user interface 512 that corresponds to a display-on state of the device (e.g., a wake screen 512 as shown in FIG. 5C, a user interface that is shown immediately upon waking the device, or activating the display of the device).

While displaying the first user interface that corresponds to the display-on state of the device, the device detects (706) a swipe gesture on the touch sensitive surface.

In response to detecting the swipe gesture (708): in accordance with a determination that the swipe gesture is in a first direction (e.g., leftward, as indicated in FIGS. 5AH and 5AI), the device replaces display of the first user interface 512 with display of a camera application user interface 5172. In accordance with a determination that the swipe gesture is in a second direction (e.g., rightward along a path indicated by arrow 5120 in FIG. 5T-1 and/or along a path indicated by arrow 5121 in FIG. 5T-3), distinct from the first direction, the device replaces display of the first user interface 512 with display of a mini application object user interface 5122 that is configured to include a plurality of mini application objects (e.g., calendar mini application 5125, weather mini application 5126, up next mini application 5132, and/or mail mini application 5162). A respective mini application object of the plurality of mini application objects has a corresponding application that is stored in the device (e.g., calendar application, weather application, and/or mail application). In accordance with a determination that the swipe gesture is in a third direction (e.g., upward along a path indicated by arrow 5206 in FIG. 5AK, and/or upward along a path indicated by arrow 5314 in FIG. 5AS), distinct from the first direction and the second direction, the device displays a first page of a multipage control panel user interface 5208. For example, the device displays a multipage control panel user interface 5208 that includes a first page, as shown at FIG. 5AL, with control affordances (e.g., 5210-5232) for adjusting device settings; a second page, as shown at FIG. 5AM, with a second control user interface that includes media player control affordances (e.g., 5242-5252), and/or a third page, as shown at FIG. 5AN, with a third control user interface that includes remote device control affordances (e.g., 5272-5286). In accordance with a determination that the swipe gesture is in a fourth direction (e.g., downward along a path indicated by arrow 518 in FIG.

5F-1 and/or downward along a path indicated by arrow 536 in FIG. 5F-5), distinct from the first direction, the second direction, and the third direction, the device displays a notifications user interface 520 that is configured to display a plurality of notifications (e.g., calendar invitation notification 550, message notification 542, voicemail notification 544, and/or notification 5108). In some embodiments, a notification includes information that corresponds to a communication, such as a telephone call, video call, voicemail, e-mail, SMS, MMS, and/or calendar invitation received by the device. In some embodiments, a notification is a calendar appointment notification, a calendar appointment invitation, a reminder, and/or another type of notification generated by an application installed on the device.

Providing a camera application user interface, a mini application object user interface, a multipage control panel user interface, and a notifications user interface accessible via input received at a user interface that corresponds to a display-on state of the device allows a user to view information (e.g., prevalent information, such as application information and device settings) on a device display without fully activating the device. Providing access to such information in a display-on state of the device enhances the operability of the device and makes the user-device interface more efficient (e.g., by allowing a user to access information in a display-on state of the device without fully activating the device) which, additionally, reduces power usage and improves battery life of the device by enabling the user to use the device more quickly and efficiently.

In some embodiments, replacing display of the first user interface 512 with display of the camera application user interface 5172 includes (710), delaying (e.g., from a point in time at which the swipe gesture is detected or from a point in time at which the camera application user interface is displayed) display of one or more control affordances associated with the camera application (e.g., control affordances 5186, as shown in FIGS. 5AH and 5AI) until a control display interval has elapsed. For example, control affordances 5186 are not displayed until a time $t_3$ in FIGS. 5AI and 5AH after a leftward gesture is initiated at time $t_1$. In some embodiments, replacing display of the first user interface 512 with display of the camera application user interface 5172 includes gradually revealing the camera application user interface as the swipe gesture is received, and the one or more control affordances are displayed in accordance with a determination that the portion of the camera application user interface 5172 is revealed increases above a threshold portion. In some embodiments, by delaying the display of the one or more control affordances 5186 associated with the camera application until a control display interval has elapsed or until a threshold portion of the camera application user interface 5172 has been revealed, the user is allowed some time and has the opportunity to reverse to the previous user interface (e.g., the home screen, the wake screen, etc.) without lifting off of the contact 5176. In other words, the navigation of the user interfaces becomes more fluid and efficient, and the user can change his/her mind after seeing a hint of the consequence of a continued swipe gesture in the current swipe direction (e.g., a continued swipe in the current direction will lead to the camera application user interface). In some embodiments, some camera control functions (such as some auxiliary light sensors and/or some front end control functions) that are associated with the control affordances, and some control functions (e.g., some backend control functions) that are not associated with the control affordances take time and power to activate, and the activation of these control functions is delayed until the user's intent for activating the camera application is confirmed by the user's continuing the swipe gesture past the relevant threshold(s).

In some embodiments, the device detects (712), during the control display interval, a gesture to return to the first user interface (e.g., a swipe gesture in the opposite direction of the swipe gesture that caused the camera application user interface to be displayed); and in response to detecting, during the control display interval, the gesture to return to the first user interface, the device replaces display (714) of the camera application user interface (e.g., the portion of the camera application user interface that has been revealed) with display of the first user interface (e.g., the first user interface is restored).

In some embodiments, while the multipage control panel user interface 5208 is displayed (e.g., as shown in FIG. 5AL), the device detects (716) a gesture (e.g., a leftward gesture along a path indicated by arrow 5240) at a location on the touch-sensitive surface that corresponds to a first page of the multipage control panel user interface 5208 (e.g., within and/or adjacent to the first page of the multipage control panel user interface 5208). In some embodiments, in response to detecting the gesture at the location that corresponds to the first page of the multipage control panel, the device displays (718) a second page of the multipage control panel user interface (e.g., including controls for media playback and/or controls for accessory (such as home device accessory) devices), such as the second page of multipage control panel user interface 5208 shown in FIG. 5AM.

In some embodiments, while the second page of the multipage control panel user interface 5208 is displayed, the device detects (720) a gesture (e.g., a leftward gesture along a path indicated by arrow 5270) at a location on the touch-sensitive surface that corresponds to the second page of the multipage control panel user interface (e.g., within and/or adjacent to the first page of the multipage control panel user interface); and in response to detecting the gesture at the location that corresponds to the second page of the multipage control panel user interface, the device displays (722) a third page of the multipage control panel user interface (e.g., including controls for one or more accessory devices (such as home devices) communicatively coupled to the electronic device), such as the third page of multipage control panel user interface 5208 shown in FIG. 5AN.

In some embodiments, while the notifications user interface 520 is displayed, the device detects (724) a dismissal gesture (e.g. a leftward swipe or a gesture received at an affordance, e.g., an "X" affordance (e.g., 566 in FIG. 5M) or a quick action item, such as an "accept calendar invitation" quick action item) at a location on the touch-sensitive surface 112 corresponding to a respective notification (e.g., within and/or adjacent to a notification platter at a location that corresponds to the respective notification) included in the notifications user interface; and in response to detecting the dismissal gesture, the device ceases (726) to display the respective notification in the notifications user interface. In some embodiments, when the notifications user interface is subsequently displayed, the respective notification is not displayed.

In some embodiments, while the notification user interface is displayed, the device detects (728) a launch gesture (e.g., a tap gesture, such as a tap gesture by a contact 592 at a location corresponding to notification 550, as shown in FIG. 5P and or at a location corresponding to an expanded version of a notification) at a location on the touch-sensitive surface corresponding to a first notification included in the notifications user interface; and in response to detecting the launch gesture, the device launches (730) an application that corresponds to the first notification (e.g., as shown in FIG. 5Q).

In some embodiments, while the mini application object user interface is displayed, the device detects (732) a launch gesture (e.g., a tap gesture) at a location on the touch-sensitive surface corresponding to a first mini application object included in the mini application object user interface. For example, the launch gesture is an input by a contact 5143 as shown in FIG. 5Y. In some embodiments, the launch gesture is detected at an expanded version of a mini application object. In some embodiments, the launch gesture is detected at a non-expended version of a mini application object.

In response to detecting the launch gesture, the device launches (734) an application that corresponds to the first mini application object. For example, in response to the launch gesture by the contact 5143 at a location corresponding to up next mini application object 5132 as shown in FIG. 5Y, a corresponding calendar application 5144 is displayed as indicated at FIG. 5Z.

In some embodiments, while the mini application object user interface 5122 is displayed, the device detects (736) an information expansion gesture (e.g. a tap gesture at a "show more" affordance on a mini application object platter) at a location on the touch-sensitive surface corresponding to a second mini application object included in the mini application object user interface, wherein the second mini application object includes mini application object information (e.g., content, a function, and/or an input device (such as a control affordance and/or a keyboard). For example, an information expansion gesture is an input by contact 5128 at a location corresponding to a "Show More" affordance 5127 of a calendar mini application 5125 as shown in FIG. 5U and/or an input by contact 5139 at a location corresponding to a "Show More" affordance 5141 of up next mini application 5132 as shown in FIG. 5X. In response to detecting the information expansion gesture (738): the device expands the second mini application object (e.g., increasing the vertical size of the mini application object, as demonstrated by the expanded view of calendar mini application object 5125 in FIG. 5W and the expanded view of up next mini application object 5132 in FIG. 5Y). The device displays the mini application object information and additional mini application object information in the expanded second mini application object. For example, an expanded view of up next mini application 5132, as shown at FIG. 5Y, includes information shown in the view of up next mini application 5132 shown in FIG. 5X, and additional information, such as map 5134 and/or action items 5136 ("Directions"), 5138 ("Snooze"), 5140 ("Message Invitees"), and/or 5142 ("Delete Event"). In some embodiments, other mini application objects move downward and/or roll off of the bottom of the mini application object user interface (e.g., as demonstrated by weather mini application object 5126 in FIG. 5Y) to make room for the expanded mini application object.

In some embodiments, a respective mini application object is configured to perform (740) a subset, less than all, of the functions of a corresponding application of the respective mini application object.

In some embodiments, a respective mini application object displays (742) an identifier (e.g., text 5131 that identifies the corresponding application and/or an icon 5135 that identifies the corresponding application, as shown in FIG. 5U) for a corresponding application of the respective mini application object.

In some embodiments, a respective mini application object displays (744) a portion of content from a corresponding application of the respective mini application object. For example, calendar mini application 5125 includes a portion of content from a calendar application as illustrated by calendar application user interface 5144 in FIG. 5Z (e.g., a subset of hours, such as hours that are proximate to a current time, from a schedule for a day in a calendar application).

In some embodiments, a predefined input on a respective mini application object (e.g., input including a contact 5143 at a location that corresponds to up next mini application object 5132, as shown in FIG. 5Y) launches (746) a corresponding application (e.g., a calendar application, as shown by calendar application user interface 5144 in FIG. 5Z) the respective mini application object.

In some embodiments, a respective mini application object operates (748) as a standalone application residing in memory of the device, distinct from an associated application also residing in the memory of the device.

In some embodiments, a respective mini application object operates (750) as an extension or component of an associated application on the device.

In some embodiments, a respective mini application object has (752) a dedicated memory portion for temporary storage of information.

In some embodiments, the memory portion is accessible (754) by a corresponding full-featured application of the respective mini application object.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7E. For example, the contacts, gestures, and user interface objects, and animations described above with reference to method 700 optionally have one or more of the characteristics of the contacts, gestures, and user interface objects, and animations described herein with reference to other methods described herein (e.g., methods 600, 800, and 900). For brevity, these details are not repeated here.

FIGS. 8A-8C illustrate a flow diagram of a method 800 of adding a mini application object to a mini applications user interface in accordance with some embodiments. The method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to add a mini application object to a mini applications user interface. The method reduces the cognitive burden on a user when adding a mini application object to a mini applications user interface, thereby creating a more efficient human-machine interface. For battery-operated electronic devices, enabling a user to add a mini application object to a mini applications user interface faster and more efficiently conserves power and increases the time between battery charges.

The device displays (802) a first user interface 400 that includes a plurality of application icons that correspond to different applications of a plurality of applications installed on the device (e.g., the device displays a home screen or an application springboard 400 as shown in FIG. 5AA).

The device detects (804) a first input (e.g., a light press or a deep press input by a first contact 5150) at a location on the touch-sensitive surface that corresponds to a first application icon (e.g., mail application icon 418) of the plurality of application icons, the first application icon corresponding to a first application of the plurality of applications. For example, the first input is an input by a contact 5150 as illustrated at FIGS. 5AB-5AD.

In response to detecting the first input, the device displays (806) a first mini application object or a preview of the first mini application object (e.g., a representation or contracted version of the first mini application object, such as preview 5156, as shown in FIG. 5AD, of mini application object 5162 as shown in FIG. 5AF) in an overlay region (e.g., overlaying the application springboard user interface 400). In some embodiments, one or more functional items that correspond to the mini application object are not activated in the preview of the mini application object. For example, when an input is received at an avatar 5164a of the mini application preview 5156 of FIG. 5AD, no response occurs, whereas in response to an input received at avatar 5164a of mini application object 5162 of FIG. 5AF, a response occurs (e.g., mail received from and/or sent to the user who corresponds to avatar 5164a is displayed. For example, the preview 5156 of a mini application displays, e.g., four avatars 5164a-5164d. The mini application object 5162 includes an affordance ("Show More" affordance 5168) for expanding the mini application object 5162 to show additional avatars (e.g., 5164e-5164h, as illustrated at FIG. 5AG). The first mini application object (e.g., preview 5156) corresponds to a first application of the plurality of applications (e.g., a mail application); and the overlay region includes an affordance ("Add Widget" affordance 5160) for adding the first mini application object (e.g., mini application object 5162 corresponding to preview 5156) to a second user interface (e.g., a mini applications user interface 5122) that displays a plurality of mini application objects (e.g., including one or more user selected mini application objects and/or one or more default mini application objects).

The device detects (808) a second input (e.g., an input by a second contact 5150, such as a tap input, a light press input in which the characteristic intensity of the contact increases above a light press intensity threshold $IT_L$, or a deep press input in which the characteristic intensity of the contact increases above a deep press intensity threshold $IT_D$) at a location on the touch-sensitive surface that corresponds to the affordance 5160 for adding the first mini application object 5162 to the second user interface.

In response to detecting the second input, the device adds (810) the first mini application object 5162 to the second user interface that displays the plurality of mini application objects. In some embodiments, the plurality of mini application objects (e.g., mail mini application object 5162, calendar mini application object 5125, and/or up next mini application object 5132, as shown in FIG. 5AF) in the second user interface (e.g., 5122) are displayed as a vertical stack of platters. In some embodiments, a respective platter of the vertical stack of platters corresponds to a respective mini application object of the plurality of mini application objects, and each platter has the same initial platter height.

Adding a mini application object to a mini application object user interface in response to input corresponding to an application icon is an intuitive and efficient way for users to select desired mini application objects. Providing the ability to add a mini application object to a collection of mini application objects from an application icon enhances the operability of the device and makes the user-device interface more efficient which, additionally, reduces power usage and improves battery life of the device by enabling the user to use the device more quickly and efficiently.

In some embodiments, while displaying the first user interface (e.g., application springboard user interface 400), the device detects (812) a third input on the touch-sensitive surface 112, the third input meeting first criteria, such as navigation criteria (e.g., the third input is one or more rightward swipe gestures) for navigating from the first user interface to the second user interface (mini applications user interface 5122).

In some embodiments, in response to detecting the third input, the device replaces display (814) of the first user interface (e.g., application springboard user interface 400) with the second user interface (mini applications user interface 5122), wherein replacing display of the first user interface with the second user interface includes: ceasing to display the first user interface (e.g., application springboard user interface 400); and displaying the second user interface (mini applications user interface 5122), including concurrently displaying, in the second user interface, the first mini application object 5162 (e.g., with updated content from the first application) and at least a second mini application object (e.g., calendar mini application object 5125, and/or up next mini application object 5132, as shown in FIG. 5AF) that corresponds to a second application of the plurality of applications that is different from the first application. In some embodiments, the second user interface includes an "edit" affordance to rearrange mini application objects in mini application object stack and/or add a new mini application object to the mini application object stack.

In some embodiments, the first mini application object includes (816) at least one selectable information item (e.g., avatar 5164a, 5164b, 5164c, and/or 5164d). In some embodiments, selectable information items are items that display information related to an object of a certain type, such as a stock listing item that displays information for a stock (e.g., opening price, maximum price, change in prices), a weather forecast item that displays weather forecast information for a location (e.g., a city), an avatar 5164 that correspond to one or more e-mail senders that recently and/or frequently sent e-mail to device 100 and/or received e-mail from device 100 and/or a calendar event.)

While the second user interface is displayed, the device detects (818) a fourth input at a location on the touch-sensitive surface that corresponds to the at least one selectable information item.

In response to detecting the fourth input, the device displays (820) additional information associated with the selectable information item (e.g., in a mini application object that displays a plurality of stock listings and corresponding stock values, each stock listing is a selectable information item. In response to a tap input detected at one of the stock listings in the mini application object, additional information (such as stock value history) about the stock listing is displayed in the mini application object). In some embodiments, the information associated with the selectable information item replaces display of at least one previously displayed portion of the mini application object. In some embodiments, the mini application object expands and the additional information is displayed in the expanded area of the mini application object.

In some embodiments, the first mini application object 5162 is added (822) at a topmost position in a vertical stack of mini application objects (e.g., mini application objects 5162, 5125, and/or 5132) in the second user interface (e.g., as shown in FIG. 5AF). In some embodiments, the first mini application object 5162 is added to another position (e.g., bottommost, leftmost, and/or rightmost) in a stack, grid, or other collection of mini application objects. In some embodiments, a user is able to change a position of one or more mini application object in a collection of mini application objects.

In some embodiments, the first mini application object includes (824) identifying information (e.g., text 5131 that identifies the corresponding application and/or an icon 5135 that identifies the corresponding application, as shown in FIG. 5U) that identifies the first application.

In some embodiments, the first mini application object is configured to provide (826) a subset of functionality that is provided by the first application (e.g., obtaining data from a remote device (such as weather data, stock data, traffic data, location data for the remote device, and/or map data), determining a soonest upcoming calendar appointment, and/or determining a travel time to a predefined location and/or point of interest).

In some embodiments, the first mini application object includes (828) a subset of content from the first application (e.g., text, an image, a portion of a calendar, a map (such as a live updating map showing a location of the electronic device and/or a vehicle relative to the location of the electronic device), a travel time to a predefined location and/or point of interest, weather data, and/or stock data). In some embodiments, the content in a mini application object updates at periodic intervals and/or in response to user input.

In some embodiments, in response to detecting the first input, the device displays (830) a menu 5154 of selectable options (e.g., one or more quick action menu items) that correspond to the first application (e.g., in a panel that is displayed adjacent to the mini application object).

In some embodiments, a predefined input on the first mini application object 5162 launches (832) the first application (e.g., launches a mail application).

In some embodiments, the first mini application object operates (834) as a standalone application residing in memory of the device, distinct from the first application.

In some embodiments, the first mini application object operates (836) as an extension or component of the first application.

In some embodiments, the first mini application object has (838) a dedicated memory portion for temporary storage of information.

In some embodiments, the memory portion is accessible (840) by the first application.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8C. For example, the contacts, gestures, user interface objects, and intensity thresholds described above with reference to method 800 optionally have one or more of the characteristics of the contacts, gestures, user interface objects, and intensity thresholds described herein with reference to other methods described herein (e.g., methods 600, 700, and 900). For brevity, these details are not repeated here.

FIGS. 9A-9E illustrate a flow diagram of a method 900 of navigating controls using a multipage control panel, in accordance with some embodiments. The method 900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to navigate controls using a multipage control panel. The method reduces the cognitive burden on a user when navigating controls using a multipage control panel, thereby creating a more efficient human-machine interface. For battery-operated electronic devices, enabling a user to navigating controls using a multipage control panel faster and more efficiently conserves power and increases the time between battery charges.

While displaying an initial user interface (e.g., an application user interface 5318, a springboard user interface 400 including a plurality of application icons, or a wake screen user interface 512 displayed when the electronic device is woken from a display-off state) on the display, the device detects (902) a first gesture on the touch sensitive surface (e.g., a first swipe gesture, such as an upward swipe by contact 5322 along a path indicated by arrow 5320, as indicated in FIG. 5AU).

In response to detecting the first gesture, the device displays (904) a first page of a multipage control panel 5208 on the display, as illustrated in FIG. 5AV. In some embodiments, the first page of the multipage control panel is displayed overlaid on a portion of the initial user interface (e.g. overlaid on calendar application user interface 5318). In some embodiments, the first page of the multipage control panel 5208 gradually rises from the lower edge of the display in accordance with the upward movement of a contact in the first gesture. The first page of the multipage control panel includes a plurality of device control affordances (e.g., control affordances 5210-5228 as described with regard to FIG. 5AL). In some embodiments the control affordances correspond to controls for one or more features of the device and/or controls to initiate display of an application interface, such as an application interface of an application run by the device.

While displaying the first page of the multipage control panel, the device detects (906) a second gesture on the touch sensitive surface. For example, the second gesture is a second swipe gesture, such as a horizontal swipe (e.g., by a contact 5325 along a path indicated by arrow 5327) in a first direction that is orthogonal to the direction of the first swipe gesture. In some embodiments, the second gesture is not tied to a particular control affordance, e.g., the second gesture has the same effect at any location (within and/or adjacent to the multipage control panel user interface) where the second gesture is received.

In response to detecting the second gesture, the device displays (908) a second page of the multipage control panel 5208 (e.g., as shown in FIG. 5AW), wherein: the second page of the multipage control panel includes a plurality of content playback control affordances (e.g., a playback position control slider, a volume control slider, play/pause, fast forward and/or rewind controls, such as the control affordances 5242-5252 described with regard to FIG. 5AM). In some embodiments, the content playback control affordances are distinct from the device control affordances. The second page of the multi-page control panel 5208 replaces the first page of the multipage control panel 5208 on the display. In some embodiments, an animation that slides the first page (e.g., a horizontal slide in accordance with detected gesture) is displayed during a transition in which the first page of the multipage control panel user interface 5208 replaces the first page of the multipage control panel user interface 5208.

A multipage control panel provides efficient access to prevalent application features and/or device settings to a greater extent than a single page control panel. Typically, the control panel is accessible via an input detected while the device is in any of multiple device states (e.g., a display-on state, a fully activated state in which a home screen user interface including multiple application icons is displayed, and/or a fully activated state in which an application user interface is displayed). Providing a multipage control panel increases the number of prevalent features and settings accessible to a user without, e.g., exiting an application, fully activating a device, and/or accessing a settings menu to access such features, which enhances the operability of the device and makes the user-device interface more efficient and, additionally, reduces power usage and improves battery life of the device by enabling the user to use the device more quickly and efficiently.

In some embodiments, while displaying the second page of the multipage control panel, the device detects (910) a third gesture (e.g., by a contact 5329 that moves along a path indicated by arrow 5331, as indicated in FIG. 5AW, or by a contact 5339 that moves along a path indicated by arrow 5337, as indicated in FIG. 5AY) on the touch sensitive surface.

In some embodiments, in response to detecting the third gesture, in accordance with a determination that the third gesture is of a first gesture type (e.g., the gesture is a downward swipe, e.g., as indicated in FIG. 5AW, such as a downward swipe starting near the top of the second control user interface; the gesture is a tap outside the second control user interface, and/or the gesture is a tap at a location corresponding to control user interface dismissal affordance 5234), the device ceases (912) to display the second page of the multipage control panel 5208 on the display (and reveals the overlaid portion of the initial user interface, as indicated at FIG. 5AX). For example, the multipage control panel 5208 appears to gradually descend as the vertical length of multipage control panel 5208 is reduced in accordance with the downward movement of a contact 5329 in the third gesture.

In some embodiments, in accordance with a determination that the third gesture is of a second gesture type that is distinct from the first gesture type (e.g., the third gesture is a horizontal swipe in the first direction, such as an input by contact 5339 that moves along a path indicated by arrow 5337, as indicated in FIG. 5AY), the device displays (914) a third page of the multipage control panel, wherein the third page of the multipage control panel includes a plurality of remote device control affordances (e.g., as indicated in FIG. 5AZ). In some embodiments, the third page of the multipage control panel includes virtual remote control affordances (e.g., 5272-5286) for controlling one or more home automation devices, e.g., as described with regard to FIG. 5AN. In some embodiments, the remote device control affordances are distinct from the content playback control affordances in the second page and the device control affordances in the first page of the multipage control panel.

In some embodiments, the plurality of device control affordances, the plurality of content playback control affordances, and/or the plurality of remote device control affordances are arranged in accordance with a predefined layout. In some embodiments, the third gesture is not tied to a particular control affordance, e.g., the third gesture has the same effect at any location (within and/or adjacent to the multipage control panel user interface) where the third gesture is detected.

In some embodiments, the plurality of remote device control affordances included in the third page of the multipage control panel 5208 correspond (916) to different devices in a respective defined area (for example, a "scene," such as a room and/or building, e.g., "Living Room," as indicated in FIG. 5AZ) of a plurality of defined areas (e.g., rooms of a house and/or buildings of a campus) that are selectable by a user (e.g., as described with regard to FIGS. 5AP-5AQ).

In some embodiments, displaying the third page of the multipage control panel 5208 includes (918) re-displaying one or more remote device controls that were included in the third page of the multipage control panel when the third page of the multipage control was last displayed.

In some embodiments, displaying the third page of the multipage control panel includes displaying (920), in the third page of the multipage control panel, one or more remote device controls that correspond a defined area in which the device is currently located (e.g., as determined using GPS and/or Wi-Fi signals received by the device 100).

In some embodiments, the third page of the multipage control panel includes (922) a defined area list affordance (e.g., an affordance 5292 for displaying/ceasing to display a plurality of defined area identifiers) that, when activated, is configured to cause display of a plurality of defined area identifiers (e.g., a list of "scenes," e.g., as described with regard to FIGS. 5AP-5AQ) that are selectable by a user.

In some embodiments, the first page of the multipage control panel 5208 overlays (924) a portion of the initial user interface 5318 (e.g., as shown in FIG. 5AV). For example, the first page of the multipage control panel 5208 and the initial user interface 5318 are simultaneously displayed, and a portion of the initial user interface 5318 is visually obscured by the first page of the multipage control panel 5208. In some embodiments, the first page of the multipage control panel is semitransparent, and a portion of the initial user interface 5318 that exists behind the first page of the multipage control panel 5208 is partially visible through the first page of the multipage control panel 5208. In some embodiments, the second page of the multipage control panel 5208 also overlays the portion of the initial user interface 5318. In some embodiments, one or more pages of the multipage control panel user interface 5208 have a fixed size, which is smaller than the size of the display and the size of the initial user interface 5318.

In some embodiments, the initial user interface is (926) an application user interface (e.g., calendar application user interface 5318); and the multipage control panel 5208 and the application user interface 5318 are concurrently displayed, e.g., as indicated in FIG. 5AW. In some embodiments, the multipage control panel user interface is accessible without exiting the application.

In some embodiments, after ceasing to display the second page of the multipage control panel, the device detects (928) a fourth gesture on the touch sensitive surface (e.g., an upward swipe to redisplay the control user interface, such as an input by contact 5333 that moves along a path indicated by arrow 5335, as shown in FIG. 5AX).

In some embodiments, in response to detecting the fourth gesture, the device redisplays (930) the second page of the multipage control panel 5208 (e.g., as shown in FIG. 5AY). In some embodiments, when input is received to dismiss the multipage control panel user interface, and, subsequently, input to redisplay the multipage control panel user interface is received, the most recently displayed page of the multipage control panel user interface (displayed prior to the input to dismiss the multipage control panel user interface) is displayed in response to the subsequent input to redisplay the multipage control panel user interface. For example, if the third page of the multipage control panel has been displayed immediately before the input to dismiss the multipage control panel is received, in response to a subsequent input to redisplay the multipage control panel user interface, the third page of the multipage control panel is displayed again (e.g., as illustrated by FIGS. 5AR-5AT).

In some embodiments, the plurality of device control affordances (e.g., the control affordances 5242-5252 described with regard to FIG. 5AM) includes (932) at least one toggle control. A toggle control is e.g., a multi-state control, such as: a control that sets a state of a component of the electronic device (e.g., a flashlight control that turns a flashlight of the device on and off, a Wi-Fi control, a Bluetooth control) and/or a control that sets a state of a mode (e.g., enable the mode and disable the mode) of the electronic device (e.g., a night shift control, an airplane mode control, a do not disturb mode control, a rotation lock control and/or a mirroring mode control (e.g., "Apple TV Mirror: On"). For example, Wi-Fi control 5212 is toggled from a disabled state to an enabled state in response to input by contact 5342, as indicated at FIGS. 5BF-5BG.

In some embodiments, the second page of the multipage control panel 5208, is shown at FIG. 5BA, includes (934) indicia (e.g., content routing destination information region 5260) of a routing destination of currently playing media (e.g., a device to which the media is being routed or transmitted, such as, "now playing on Airpods").

In some embodiments, while displaying the second page of the multipage control panel (e.g., as shown in FIG. 5BD), the device detects (936) an input (e.g., a swipe gesture, e.g., by a contact 5323 that moves along a path indicated by arrow 5345) at a location on the touch-sensitive surface that corresponds to the indicia 5260 of the routing destination of the currently playing media, wherein the routing destination of the currently playing media includes a first device corresponding to a first zone ("Bluetooth Speaker"). In some embodiments, the routing destination corresponding to the first zone is, e.g., headphones connected to the electronic device, speakers of the electronic device, and/or one or more remote devices (e.g., remote speakers and/or remote displays in a first room). In response to detecting the input at the location on the touch-sensitive surface that corresponds to the indicia of the routing destination of the currently playing media, the device routes (938) media output to a second device corresponding to a second zone (e.g., "Airpods," as indicated by FIG. 5BE). In some embodiments, the second zone includes, e.g., remote speakers and/or remote displays in a second room. In some embodiments, the indicia 5260 changes to reflect the change in routing destination (as indicated in FIG. 5BE).

In some embodiments, the second page of the multipage control panel 5208 includes (940) a media routing destination list affordance (e.g., a chevron located adjacent to an indication of a current destination of currently playing media, such as an affordance 5262 for displaying/ceasing to display a routing destination menu.)

In some embodiments, the device detects (942) an input (e.g., by contact 5324, as indicated in FIG. 5BA) at a location on the touch-sensitive surface that corresponds to the media routing destination list affordance 5262.

In some embodiments, in response to detecting the input at the location that corresponds to the media routing destination list affordance, the device displays (944) a list 5236 of media routing destination options, as shown in FIG. 5BB (e.g., replacing display and or shifting display location of at least some of content in the second page with the list of media routing destination options).

In some embodiments, the device populates the list 5326 of media routing destination options with an identifier of the electronic device and at least one additional device. In some embodiments, populating the list of media routing destination options with the at least one additional device includes (946): in accordance with a determination that the electronic device is currently routing media output to one or more remote devices, populating the list of media routing destination options with the one or more remote devices to which the electronic device is currently routing media output; and in accordance with a determination that the electronic device has previously paired with one or more pairing-enabled devices, populating the list of media routing destination options with the one or more pairing-enabled devices. In some embodiments, if the number of pairing-enabled devices with which the electronic device recently paired exceeds a threshold number, the list is populated with the threshold number of most recent pairing-enabled devices. In some embodiments, pairing-enabled devices that are not currently detected are not included on the one or more pairing-enabled devices. In some embodiments, the electronic device (e.g., iPhone 5328, as indicated in FIG. 5BB) is the first media routing destination in the list of media routing destination options, followed by the devices (if any) to which the electronic device is currently routing media (e.g., Airpods 5260, as indicated in FIG. 5BB), followed by the pairing-enabled devices (if any) with which the electronic device has previously paired (e.g., Bluetooth Speaker 5332, as indicated in FIG. 5BB), followed by signal transmitting devices (if any) detected by the electronic device.

In some embodiments, in accordance with a determination that one or more signal-transmitting (e.g., Bluetooth signal transmitting) devices are detected in proximity to the electronic device, the device populates (948) the list of media routing destination options with the one or more signal-transmitting devices.

In some embodiments, the electronic device includes (950) one or more sensors to detect intensities of contacts with the touch-sensitive surface 112. The device detects (952) a first input including detecting a first contact 5342 at a location on the touch-sensitive surface 112 that corresponds to a first control affordance 5212 of the plurality of device control affordances, as shown in FIGS. 5BF-5BI. In response to detecting the first input (954): in accordance with a determination that the first input meets second criteria (e.g., enhanced control criteria that include a criterion that is met when the characteristic intensity of the contact increases above a deep press intensity threshold $IT_D$, as indicated by intensity level meter 5344), the second criteria (e.g., the enhanced control criteria) require that a characteristic intensity of the first contact meet a first intensity threshold in order for the second criteria to be met, the device displays one or more modification options (e.g., 5354, 5356, 5358, 5360, 5362, as shown in FIG. 5BI) for the control that corresponds to the first control affordance 5212. For example, the modification options are mode modification options (e.g., enable Wi-Fi with a selected network) and/or duration modification options (e.g., enable Wi-Fi for the next hour). In some embodiments, the modification options are displayed in a menu 5350. In accordance with a determination that the first input meets third criteria (e.g., control toggle criteria) (for example, the first input is a tap input), wherein the third criteria (e.g., the control toggle criteria) do not require that the characteristic intensity of the first contact meet the first intensity threshold, the device toggles a function of a control that corresponds to the first control affordance (e.g., enable/disable Wi-Fi, as shown in FIGS. 5BF-5BG).

In some embodiments, while displaying the one or more modification options for the control that correspond to the first control affordance, the device detects (956) a second input (e.g., by contact 5352, as indicated by FIG. 5BI) that activates a first modification option (e.g., modification option 5356) of the one or more modification options. In some embodiments, the second input is a continuation of the first input by the contact. In some embodiments, the second input is a separate tap input on a modification option. In response to detecting the second input, the device modifies (958) the control that corresponds to the first control affordance in accordance with the activated first modification option (e.g., as indicated by FIG. 5BJ).

In some embodiments, a respective page of the multipage control panel includes (960) indicia 5236 of a total number of pages that the multipage control panel has (e.g., a dot that corresponds to each page), and an indicator that corresponds to a currently displayed page of the multipage control panel is highlighted in the respective page (e.g., as indicated at indicia 5236 of FIG. 5AL, FIG. 5AM, and FIG. 5AN). For example, the indicia 5236 indicates the location of the current page among the multiple pages.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9E. For example, the contacts, gestures, user interface objects, intensity thresholds, focus selectors, and animations described above with reference to method 900 optionally have one or more of the characteristics of the contacts, gestures, user interface objects, intensity thresholds, focus selectors, and animations described herein with reference to other methods described herein (e.g., methods 600, 700, and 800). For brevity, these details are not repeated here.

Figure 10:
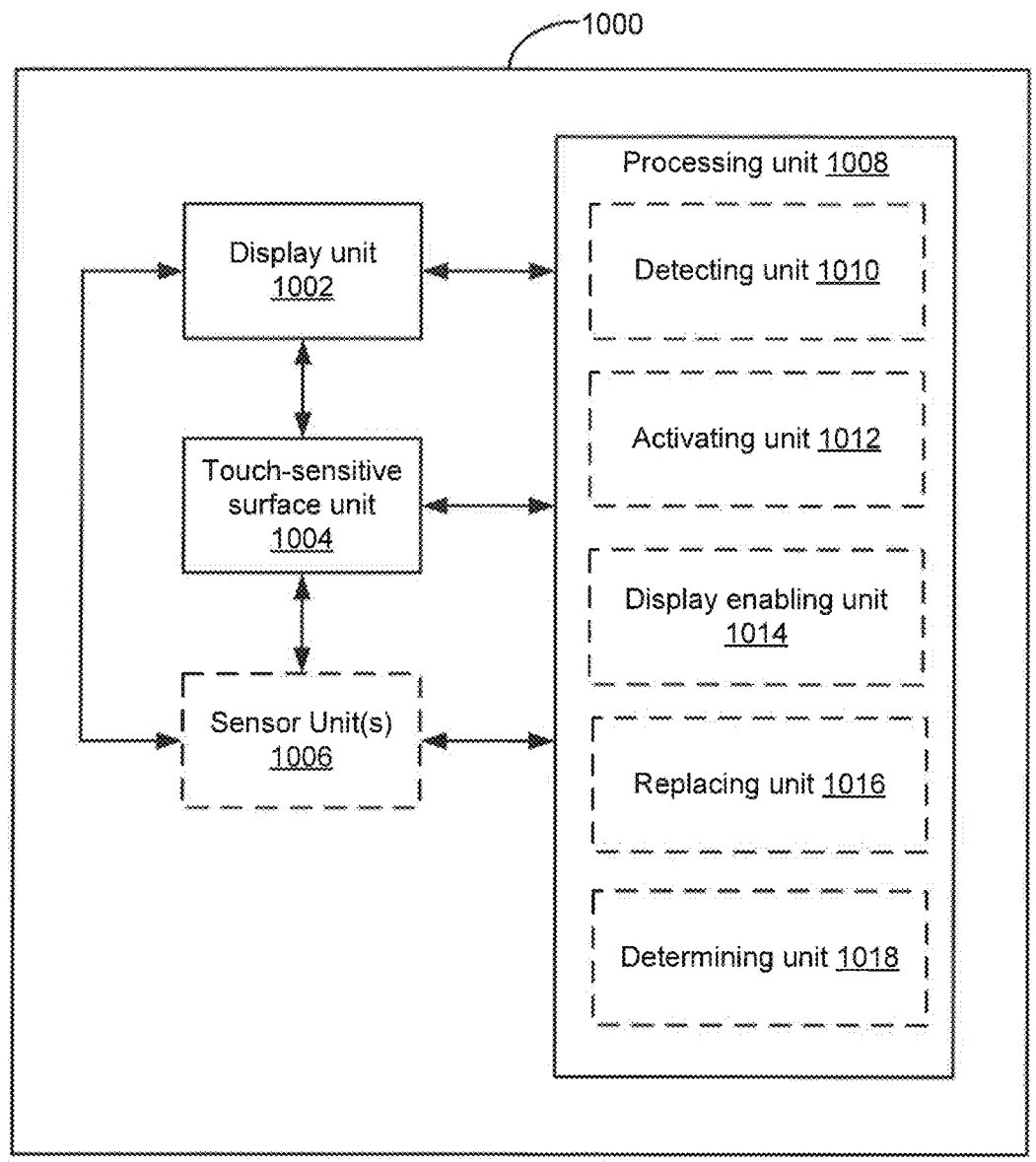
FIGS. 10-13 are functional block diagrams of an electronic device, in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002, a touch-sensitive surface unit 1004, and a processing unit 1008 coupled with the display unit 1002 and the touch-sensitive surface unit 1004. In some embodiments, the electronic device includes one or more sensor units 1006 and the processing unit 1008 is coupled with the display unit 1002, the touch-sensitive surface unit 1004, and the one or more sensor units 1006. In some embodiments, the processing unit 1008 includes: a detecting unit 1010, an activating unit 1012, a display enabling unit 1014, a replacing unit 1016, and a determining unit 1018.

While the device is in a display-off state, the processing unit 1008 is configured to detect (e.g., with the detecting unit 1010) a first input. In response to detecting the first input, the processing unit 1008 is configured to: activate (e.g., with the activating unit 1012) the display unit 1002 of the device, and enable display (e.g., with the display enabling unit 1014) of, on the display unit 1002, a first user interface that corresponds to a display-on state of the device. While displaying the first user interface that corresponds to the display-on state of the device, the processing unit 1008 is configured to detect (e.g., with the detecting unit 1010) a swipe gesture on the touch-sensitive surface unit 1004. In response to detecting the swipe gesture on the touch-sensitive surface unit 1004, the processing unit 1008 is configured to: in accordance with a determination that the device is in a locked mode of the display-on state and the swipe gesture is in a first direction, replace (e.g., with the replacing unit 1016) display of the first user interface with display of a second user interface, the second user interface displaying first content; and in accordance with a determination that the device is in an unlocked mode of the display-on state and the swipe gesture is in the first direction, the processing unit 1008 is configured to replace (e.g., with the replacing unit 1016) display of the first user interface with display of the second user interface, the second user interface displaying the first content and first additional content that is not displayed when the device is in the locked mode of the display-on state.

In some embodiments, the first content includes one or more notifications; and the first additional content includes restricted notification information.

In some embodiments, the first content includes one or more mini application objects; and the first additional content includes restricted mini application object information.

In some embodiments, the processing unit 1008 is further configured to: in response to detecting the swipe gesture on the touch-sensitive surface unit 1004: in accordance with a determination that the device is in the locked mode of the display-on state and the swipe gesture is in a second direction, distinct from the first direction, replace (e.g., with the replacing unit 1016) display of the first user interface with display of a third user interface, the third user interface displaying second content; and, in accordance with a determination that the device is in the unlocked mode of the display-on state and the swipe gesture is in the second direction, replace (e.g., with the replacing unit 1016) display of the first user interface with display of the third user interface, the third user interface displaying the second content and second additional content that is not displayed when the device is in the locked mode of the display-on state.

In some embodiments, the second content includes one or more mini application objects; and the second additional content includes restricted mini application object information.

In some embodiments, the second content includes one or more notifications; and the second additional content includes restricted notification information.

In some embodiments, the second user interface includes a first search input region and the third user interface includes a second search input region.

In some embodiments, the processing unit 1008 is further configured to: detect (e.g., with the detecting unit 1010) input in a respective search input region of the first search input region and the second search input region. In response to detecting the input in the respective search region, the processing unit 1008 is configured to: in accordance with a determination that the device is in a locked mode of the display-on state, enable display (e.g., with the display enabling unit 1014) of a first set of search results; and in accordance with a determination that the device is in an unlocked mode of the display-on state, enable display (e.g., with the display enabling unit 1014) of a second set of search results, distinct from the first set of search results.

In some embodiments, the determination of whether the device is in the unlocked mode or the locked mode of the display-on state is made in response to detecting the first input.

In some embodiments, the determination of whether the device is in the locked mode of the display-on state or the unlocked mode of the display-on state is made in response to detecting the swipe gesture on the touch-sensitive surface unit 1004.

In some embodiments, the electronic device includes one or more sensor units 1006 and detecting the first input includes, detecting (e.g., with the detecting unit 1010), with the one or more sensor units 1006, a change in a context of the device, and in response to detecting the change in the context of the device, determining whether the change in the context of the device meets display-activation criteria.

In some embodiments, detecting the first input includes detecting (e.g., with the detecting unit 1010) activation of a display-activation affordance.

In some embodiments, detecting the first input includes detecting (e.g., with the detecting unit 1010) a contact with a display-activation affordance that activates the display-activation affordance and that does not actuate the display-activation affordance.

In some embodiments, detecting the first input includes detecting a contact with a display-activation affordance that activates the display-activation affordance to activate the display of the device and that does activate the display-activation affordance to perform at least one additional function associated with the display-activation affordance.

In some embodiments, the processing unit 1008 is configured to: while the first user interface is displayed, detect (e.g., with the detecting unit 1010) a second input. In response to detecting the second input, the processing unit 1008 is configured to replace (e.g., with the replacing unit 1016) display of the first user interface with display of a user interface that includes a plurality of application icons that correspond to different applications of a plurality of applications.

In some embodiments, in response to detecting the second input, the processing unit 1008 is configured to: determine (e.g., with the determining unit 1018) whether the device is in a locked mode of the display-on state or an unlocked mode of the display-on state; and in accordance with a determination that the device is in the locked mode of the display-on state, enable display (e.g., with the display enabling unit 1014) of an authentication user interface.

In some embodiments, a respective mini application object is configured to perform a subset, less than all, of the functions of a corresponding application of the respective mini application object.

In some embodiments, a respective mini application object displays an identifier for a corresponding application of the respective mini application object.

In some embodiments, a respective mini application object displays a portion of content from a corresponding application of the respective mini application object.

In some embodiments, a predefined input on a respective mini application object launches a corresponding application the respective mini application object.

In some embodiments, a respective mini application object operates as a standalone application residing in memory of the device, distinct from an associated application also residing in the memory of the device.

In some embodiments, a respective mini application object operates as an extension or component of an associated application on the device.

In some embodiments, a respective mini application object has a dedicated memory portion for temporary storage of information.

In some embodiments, the memory portion is accessible by a corresponding full-featured application of the respective mini application object.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 10. For example, detection operations 602 and 606 and display operations 604 and 608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11:
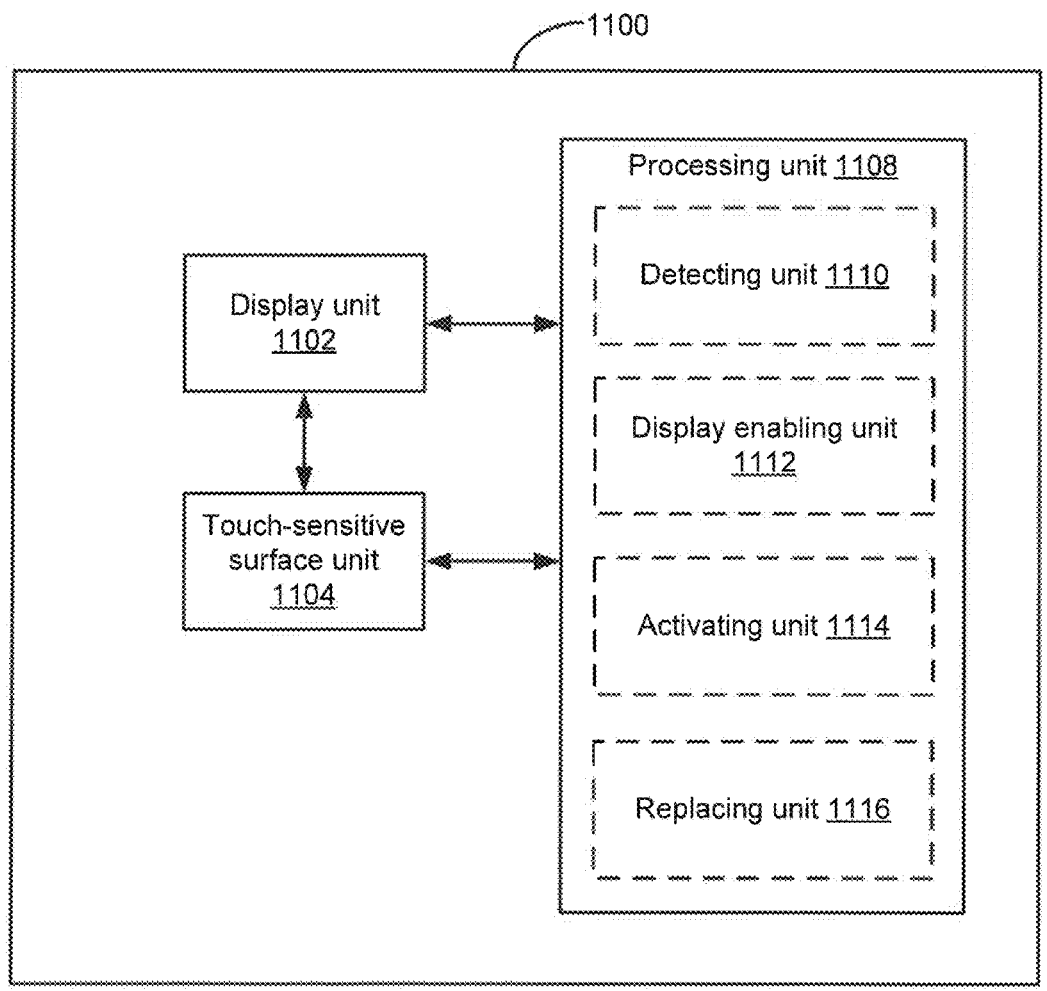

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102, a touch-sensitive surface unit 1104, and a processing unit 1108 coupled with the display unit 1102 and the touch-sensitive surface unit 1104. In some embodiments, the processing unit 1108 includes: a detecting unit 1110, a display enabling unit 1112, an activating unit 1114, and a replacing unit 1116.

While the device is in a display-off state, the processing unit 1108 is configured to detect (e.g., with the detecting unit 1110) a first input to activate (e.g., with the activating unit 1114) the display of the device. In response to detecting the first input, the processing unit 1108 is configured to: activate (e.g., with the activating unit 1114) the display unit 1102 of the device, and enable display (e.g., with the display enabling unit 1112) of, on the display unit 1102, a first user interface that corresponds to a display-on state of the device. While displaying the first user interface that corresponds to the display-on state of the device, the processing unit 1108 is configured to detect (e.g., with the detecting unit 1110) a swipe gesture on the touch-sensitive surface unit 1104. In response to detecting the swipe gesture, the processing unit 1108 is configured to: in accordance with a determination that the swipe gesture is in a first direction, replace (e.g., with the replacing unit 1116) display of the first user interface with display of a camera application user interface; in accordance with a determination that the swipe gesture is in a second direction, distinct from the first direction, replace (e.g., with the replacing unit 1116) display of the first user interface with display of a mini application object user interface that is configured to include a plurality of mini application objects, where a respective mini application object of the plurality of mini application objects has a corresponding application that is stored in the device; in accordance with a determination that the swipe gesture is in a third direction, distinct from the first direction and the second direction, enable display (e.g., with the display enabling unit 1112) of a first page of a multipage control panel user interface; and in accordance with a determination that the swipe gesture is in a fourth direction, distinct from the first direction, the second direction, and the third direction, enable display (e.g., with the display enabling unit 1112) of a notifications user interface that is configured to display a plurality of notifications.

In some embodiments, replacing display of the first user interface with display of the camera application user interface includes, delaying display of one or more control affordances associated with the camera application until a control display interval has elapsed.

In some embodiments, the processing unit 1108 is further configured to: detect (e.g., with the detecting unit 1110), during the control display interval, a gesture to return to the first user interface. In response to detecting, during the control display interval, the gesture to return to the first user interface, the processing unit 1108 is configured to replace (e.g., with the replacing unit 1116) display of the camera application user interface with display of the first user interface.

In some embodiments, the processing unit 1108 is further configured to: while the multipage control panel user interface is displayed, detect (e.g., with the detecting unit 1110) a gesture at a location on the touch-sensitive surface unit 1104 that corresponds to a first page of the multipage control panel user interface; and in response to detecting the gesture at the location that corresponds to the first page of the multipage control panel, enable display (e.g., with the display enabling unit 1112) of a second page of the multipage control panel user interface.

In some embodiments, the processing unit 1108 is further configured to: while the second page of the multipage control panel user interface is displayed, detect (e.g., with the detecting unit 1110) a gesture at a location on the touch-sensitive surface unit 1104 that corresponds to the second page of the multipage control panel user interface; and in response to detecting the gesture at the location that corresponds to the second page of the multipage control panel user interface, enable display (e.g., with the display enabling unit 1112) of a third page of the multipage control panel user interface.

In some embodiments, the processing unit 1108 is further configured to: while the notifications user interface is displayed, detect (e.g., with the detecting unit 1110) a dismissal gesture at a location on the touch-sensitive surface unit 1104 corresponding to a respective notification included in the notifications user interface; and in response to detecting the dismissal gesture, cease to display the respective notification in the notifications user interface.

In some embodiments, the processing unit 1108 is further configured to: while the notification user interface is displayed, detect (e.g., with the detecting unit 1110) a launch gesture at a location on the touch-sensitive surface unit 1104 corresponding to a first notification included in the notifications user interface; and in response to detecting the launch gesture, launch an application that corresponds to the first notification.

In some embodiments, the processing unit 1108 is further configured to: while the mini application object user interface is displayed, detect (e.g., with the detecting unit 1110) a launch gesture at a location on the touch-sensitive surface unit 1104 corresponding to a first mini application object included in the mini application object user interface; and in response to detecting the launch gesture, launch an application that corresponds to the first mini application object.

In some embodiments, the processing unit 1108 is configured to: while the mini application object user interface is displayed, detect (e.g., with the detecting unit 1110) an information expansion gesture at a location on the touch-sensitive surface unit 1104 corresponding to a second mini application object included in the mini application object user interface, the second mini application object includes mini application object information; and in response to detecting the information expansion gesture, expand the second mini application object; and enable display (e.g., with the display enabling unit 1112) of the mini application object information and additional mini application object information in the expanded second mini application object.

In some embodiments, a respective mini application object is configured to perform a subset, less than all, of the functions of a corresponding application of the respective mini application object.

In some embodiments, a respective mini application object displays an identifier for a corresponding application of the respective mini application object.

In some embodiments, a respective mini application object displays a portion of content from a corresponding application of the respective mini application object.

In some embodiments, a predefined input on a respective mini application object launches a corresponding application the respective mini application object.

In some embodiments, a respective mini application object operates as a standalone application residing in memory of the device, distinct from an associated application also residing in the memory of the device.

In some embodiments, a respective mini application object operates as an extension or component of an associated application on the device.

In some embodiments, a respective mini application object has a dedicated memory portion for temporary storage of information.

In some embodiments, the memory portion is accessible by a corresponding full-featured application of the respective mini application object.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7E are, optionally, implemented by components depicted in FIGS. 1A-1B or FIG. 11. For example, detection operations 702 and 706 and display operations 704 and 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
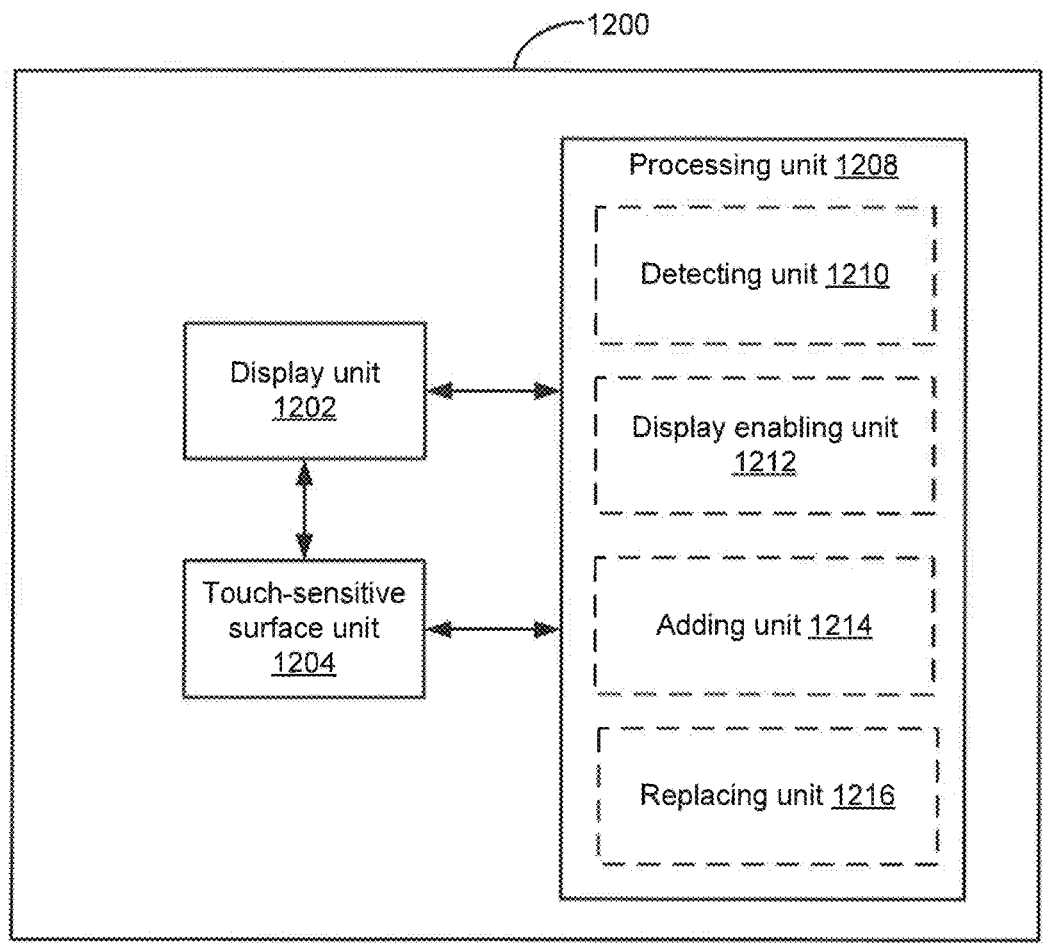

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a first user interface that includes a plurality of application icons that correspond to different applications of a plurality of applications installed on the device, a touch-sensitive surface unit 1204, and a processing unit 1208 coupled with the display unit 1202 and the touch-sensitive surface unit 1204. In some embodiments, the processing unit 1208 includes: a detecting unit 1210, a display enabling unit 1212, an add unit 1214, and a replacing unit 1216.

The processing unit 1208 is configured to detect (e.g., with the detecting unit 1210) a first input at a location on the touch-sensitive surface unit 1204 that corresponds to a first application icon of the plurality of application icons, the first application icon corresponding to a first application of the plurality of applications. In response to detecting the first input, the processing unit 1208 is configured to enable display (e.g., with the display enabling unit 1212) of a first mini application object or a preview of the first mini application object in an overlay region. In some embodiments, the first mini application object corresponds to a first application of the plurality of applications; and the overlay region includes an affordance for adding the first mini application object to a second user interface that displays a plurality of mini application objects. The processing unit 1208 is further configured to detect (e.g., with the detecting unit 1210) a second input at a location on the touch-sensitive surface unit 1204 that corresponds to the affordance for adding the first mini application object to the second user interface. In response to detecting the second input, the processing unit 1208 is configured to add (e.g., with the adding unit 1214) the first mini application object to the second user interface that displays the plurality of mini application objects.

In some embodiments, while displaying the first user interface, the processing unit 1208 is configured to detect (e.g., with the detecting unit 1210) a third input on the touch-sensitive surface unit 1204, the third input meeting first criteria for navigating from the first user interface to the second user interface. In response to detecting the third input, the processing unit 1208 is configured to replace (e.g., with the replacing unit 1216) display of the first user interface with the second user interface, replacing display of the first user interface with the second user interface includes, ceasing to display (e.g., with the display enabling unit 1212) the first user interface; and enabling display (e.g., with the display enabling unit 1212) of the second user interface, including concurrently displaying (e.g., with the display enabling unit 1212), in the second user interface, the first mini application object and at least a second mini application object that corresponds to a second application of the plurality of applications that is different from the first application.

In some embodiments, the first mini application object includes at least one selectable information item; and the processing unit 1208 is configured to: while the second user interface is displayed, detect (e.g., with the detecting unit 1210) a fourth input at a location on the touch-sensitive surface unit 1204 that corresponds to the at least one selectable information item; and in response to detecting the fourth input, enable display (e.g., with the display enabling unit 1212) of additional information associated with the selectable information item.

In some embodiments, the first mini application object is added at a topmost position in a vertical stack of mini application objects in the second user interface.

In some embodiments, the first mini application object includes identifying information that identifies the first application.

In some embodiments, the first mini application object is configured to provide a subset of functionality that is provided by the first application.

In some embodiments, the first mini application object includes a subset of content from the first application.

In some embodiments, the processing unit 1208 is further configured to, in response to detecting the first input, enable display (e.g., with the display enabling unit 1212) of a menu of selectable options that correspond to the first application.

In some embodiments, a predefined input on the first mini application object launches the first application.

In some embodiments, the first mini application object operates as a standalone application residing in memory of the device, distinct from the first application.

In some embodiments, the first mini application object operates as an extension or component of the first application.

In some embodiments, the first mini application object has a dedicated memory portion for temporary storage of information.

In some embodiments, the memory portion is accessible by the first application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C are, optionally, implemented by components depicted in FIGS. 1A-1B or FIG. 12. For example, display operations 802 and 806 and detection operations 804 and 808 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
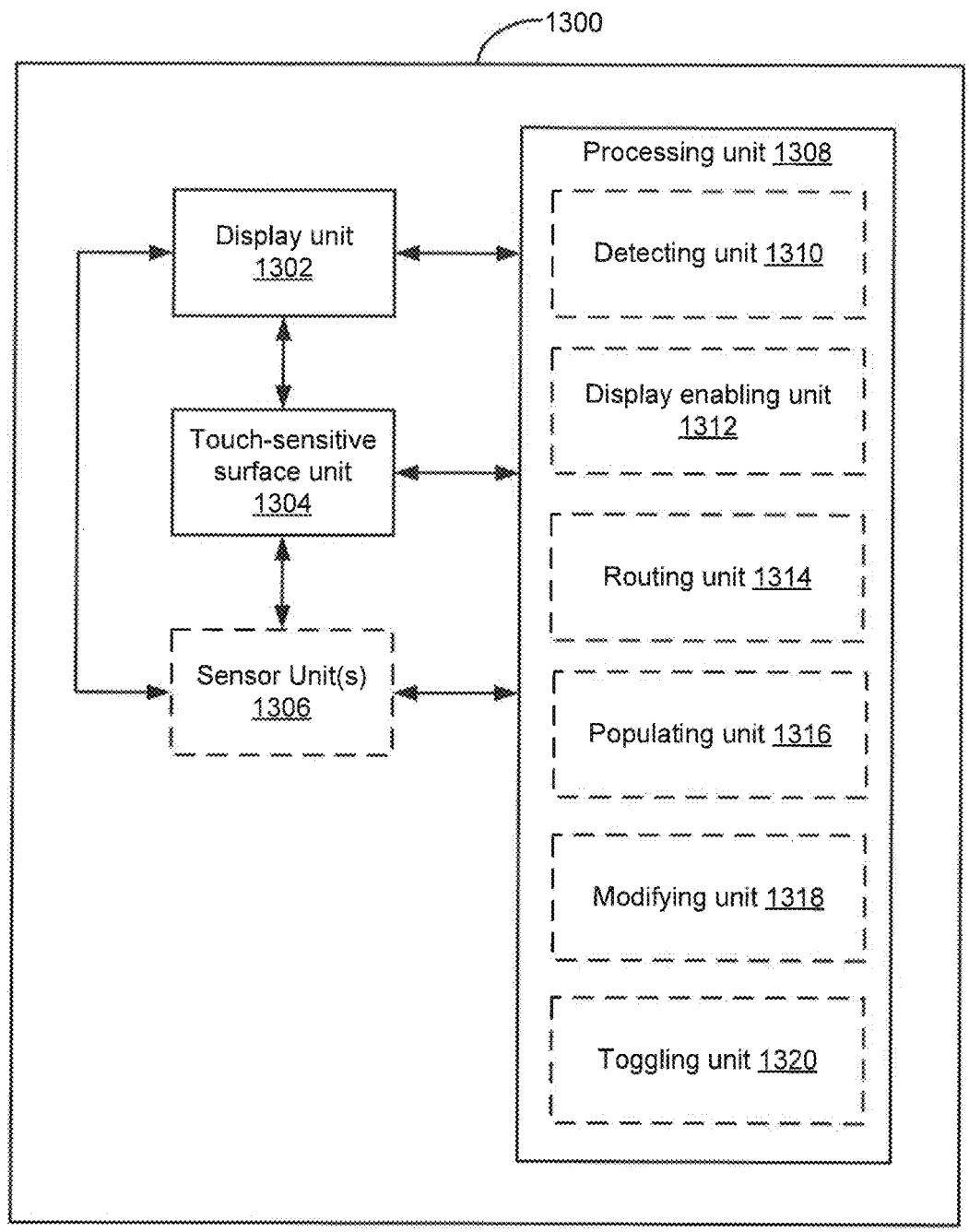

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302, a touch-sensitive surface unit 1304, one or more sensor units 1306; and a processing unit 1308 coupled with the display unit 1302, the touch-sensitive surface unit 1304 and the one or more sensor units 1306. In some embodiments, the electronic device includes one or more sensor units 1006 and the processing unit 1008 is coupled with the display unit 1002, the touch-sensitive surface unit 1004, and the one or more sensor units 1006. In some embodiments, the processing unit 1308 includes: a detecting unit 1310, a display enabling unit 1312, a routing unit 1314, a populating unit 1316, a modifying unit 1318, and a toggling unit 1320.

While displaying an initial user interface on the display unit 1302, the processing unit 1308 is configured to detect (e.g., with the detecting unit 1310) a first gesture on the touch-sensitive surface unit 1304. In response to detecting the first gesture, the processing unit 1308 is configured to enable display (e.g., with the display enabling unit 1312) of a first page of a multipage control panel on the display unit 1302. In some embodiments, the first page of the multipage control panel includes a plurality of device control affordances. While displaying the first page of the multipage control panel, the processing unit 1308 is configured to detect (e.g., with the detecting unit 1310) a second gesture on the touch-sensitive surface unit 1304. In response to detecting the second gesture, the processing unit 1308 is configured to enable display (e.g., with the display enabling unit 1312) of a second page of the multipage control panel. In some embodiments, the second page of the multipage control panel includes a plurality of content playback control affordances; and the second page of the multi-page control panel replaces the first page of the multipage control panel on the display unit 1302.

In some embodiments, while displaying the second page of the multipage control panel, the processing unit 1308 is configured to detect (e.g., with the detecting unit 1310) a third gesture on the touch-sensitive surface unit 1304; and, in response to detecting the third gesture, in accordance with a determination that the third gesture is of a first gesture type, cease to display (e.g., with the display enabling unit 1312) the second page of the multipage control panel on the display unit 1302.

In some embodiments, the processing unit 1308 is configured to: in accordance with a determination that the third gesture is of a second gesture type that is distinct from the first gesture type, enable display (e.g., with the display enabling unit 1312) of a third page of the multipage control panel. In some embodiments, the third page of the multipage control panel includes a plurality of remote device control affordances.

In some embodiments, the plurality of remote device control affordances included in the third page of the multipage control panel correspond to different devices in a respective defined area of a plurality of defined areas that are selectable by a user.

In some embodiments, displaying the third page of the multipage control panel includes re-displaying (e.g., with the display enabling unit 1312) one or more remote device controls that were included in the third page of the multipage control panel when the third page of the multipage control was last displayed.

In some embodiments, displaying the third page of the multipage control panel includes displaying (e.g., with the display enabling unit 1312), in the third page of the multipage control panel, one or more remote device controls that correspond a defined area in which the device is currently located.

In some embodiments, the third page of the multipage control panel includes a defined area list affordance that, when activated, is configured to cause display of a plurality of defined area identifiers that are selectable by a user.

In some embodiments, the first page of the multipage control panel overlays a portion of the initial user interface.

In some embodiments, the initial user interface is an application user interface; and the multipage control panel and the application user interface are concurrently displayed.

In some embodiments, after ceasing to display the second page of the multipage control panel, the processing unit 1308 is configured to detect (e.g., with the detecting unit 1310) a fourth gesture on the touch-sensitive surface unit 1304; and in response to detecting the fourth gesture, redisplay (e.g., with the display enabling unit 1312) the second page of the multipage control panel.

In some embodiments, the plurality of device control affordances includes at least one toggle control.

In some embodiments, the second page of the multipage control panel includes indicia of a routing destination of currently playing media.

In some embodiments, while displaying the second page of the multipage control panel, the processing unit 1308 is configured to detect (e.g., with the detecting unit 1310) an input at a location on the touch-sensitive surface unit 1304 that corresponds to the indicia of the routing destination of the currently playing media. In some embodiments, the routing destination of the currently playing media includes a first device corresponding to a first zone. In response to detecting the input at the location on the touch-sensitive surface unit 1304 that corresponds to the indicia of the routing destination of the currently playing media, the processing unit 1308 is configured to route (e.g., with the routing unit 1314) media output to a second device corresponding to a second zone.

In some embodiments, the second page of the multipage control panel includes a media routing destination list affordance; and the processing unit 1308 is configured to detect (e.g., with the detecting unit 1310) an input at a location on the touch-sensitive surface unit 1304 that corresponds to the media routing destination list affordance; and in response to detecting the input at the location that corresponds to the media routing destination list affordance, enable display (e.g., with the display enabling unit 1312) of a list of media routing destination options.

In some embodiments, the processing unit 1308 is configured to populate (e.g., with the populating unit 1316) the list of media routing destination options with an identifier of the electronic device and at least one additional device, where populating the list of media routing destination options with the at least one additional device includes, in accordance with a determination that the electronic device is currently routing media output to one or more remote devices, populating (e.g., with the populating unit 1316) the list of media routing destination options with the one or more remote devices to which the electronic device is currently routing media output; and, in accordance with a determination that the electronic device has previously paired with one or more pairing-enabled devices, populating (e.g., with the populating unit 1316) the list of media routing destination options with the one or more pairing-enabled devices.

In some embodiments, the processing unit 1308 is further configured to: in accordance with a determination that one or more signal-transmitting devices are detected in proximity to the electronic device, populate (e.g., with the populating unit 1316) the list of media routing destination options with the one or more signal-transmitting devices.

In some embodiments, the electronic device includes one or more sensor units 1306 to detect (e.g., with the detecting unit 1310) intensities of contacts with the touch-sensitive surface unit 1304; and the processing unit 1308 is configured to detect (e.g., with the detecting unit 1310) a first input including detecting a first contact at a location on the touch-sensitive surface unit 1304 that corresponds to a first control affordance of the plurality of device control affordances; in response to detecting the first input, in accordance with a determination that the first input meets second criteria, where the second criteria require that a characteristic intensity of the first contact meet a first intensity threshold in order for the second criteria to be met, enable display (e.g., with the display enabling unit 1312) of one or more modification options for the control that correspond to the first control affordance; and in accordance with a determination that the first input meets third criteria, where the third criteria do not require that the characteristic intensity of the first contact meet the first intensity threshold, toggle (e.g., with the toggling unit 1320) a function of a control that corresponds to the first control affordance.

In some embodiments, while displaying the one or more modification options for the control that correspond to the first control affordance, the processing unit 1308 is configured to detect (e.g., with the detecting unit 1310) a second input that activates a first modification option of the one or more modification options; and in response to detecting the second input, modify (e.g., with the modifying unit 1318) the control that corresponds to the first control affordance in accordance with the activated first modification option.

In some embodiments, a respective page of the multipage control panel includes indicia of a total number of pages that the multipage control panel has, and an indicator that corresponds to a currently displayed page of the multipage control panel is highlighted in the respective page.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 13. For example, display operations 902, 904, and 908 and detection operation 906 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions which, when executed by an electronic device with a display and a touch-sensitive surface, cause the electronic device to:

while the device is in a display-off state, detect a first input to activate the display of the device;

in response to detecting the first input:
  activate the display of the device, and
  display, on the display, a first user interface that corresponds to a display-on state of the device;

while displaying the first user interface that corresponds to the display-on state of the device, detect a swipe gesture on the touch-sensitive surface; and, in response to detecting the swipe gesture:
  in accordance with a determination that the swipe gesture is in a first direction, replace display of the first user interface with display of a camera application user interface, including:
    moving the first user interface to reveal a portion of the camera application user interface, including a first region of the camera application user interface, wherein:
      the first region of the camera application user interface has a first appearance when less than a threshold portion of the camera application user interface has been revealed,
      the first region of the camera application user interface has a second appearance distinct from the first appearance when more than the threshold portion of the camera application user interface has been revealed, and
      the first user interface is replaced by the camera application user interface in accordance with detecting an end of the swipe gesture that includes liftoff of a contact from the touch-sensitive surface that is detected at a time when the first region of the camera application user interface is displayed with the second appearance;
  in accordance with a determination that the swipe gesture is in a second direction, distinct from the first direction, replace display of the first user interface with display of a mini application object user interface that is configured to include a plurality of mini application objects, wherein a respective mini application object of the plurality of mini application objects has a corresponding application that is stored in the device;
  in accordance with a determination that the swipe gesture is in a third direction, distinct from the first direction and the second direction, display a control panel user interface; and
  in accordance with a determination that the swipe gesture is in a fourth direction, distinct from the first direction, the second direction, and the third direction, display a notifications user interface that is configured to display a plurality of notifications.

2. The non-transitory computer readable storage medium of claim 1, wherein:

the first user interface is restored in accordance with detecting an end of the swipe gesture that includes liftoff of the contact from the touch-sensitive surface that is detected at a time when the first region of the camera application user interface is displayed with the first appearance.

3. The non-transitory computer readable storage medium of claim 1, including instructions which, when executed by the electronic device, cause the electronic device to:

while the notifications user interface is displayed, detect a dismissal gesture at a location on the touch-sensitive surface corresponding to a respective notification included in the notifications user interface; and, in response to detecting the dismissal gesture, cease to display the respective notification in the notifications user interface.

4. The non-transitory computer readable storage medium of claim 1, including instructions which, when executed by the electronic device, cause the electronic device to:

while the notifications user interface is displayed, detect a launch gesture at a location on the touch-sensitive surface corresponding to a first notification included in the notifications user interface; and, in response to detecting the launch gesture, launch an application that corresponds to the first notification.

5. The non-transitory computer readable storage medium of claim 1, including instructions which, when executed by the electronic device, cause the electronic device to:

while the mini application object user interface is displayed, detect a launch gesture at a location on the touch-sensitive surface corresponding to a first mini application object included in the mini application object user interface; and, in response to detecting the launch gesture, launch an application that corresponds to the first mini application object.

6. The non-transitory computer readable storage medium of claim 1, including instructions which, when executed by the electronic device, cause the electronic device to:

while the mini application object user interface is displayed, detect an information expansion gesture at a location on the touch-sensitive surface corresponding to a second mini application object included in the mini application object user interface, wherein the second mini application object includes mini application object information; and, in response to detecting the information expansion gesture:
    expand the second mini application object; and
    display the mini application object information and additional mini application object information in the expanded second mini application object.

7. The non-transitory computer readable storage medium of claim 1, wherein a respective mini application object is configured to perform a subset, less than all, of functions of a corresponding application of the respective mini application object.

8. The non-transitory computer readable storage medium of claim 1, wherein a respective mini application object displays an identifier for a corresponding application of the respective mini application object.

9. The non-transitory computer readable storage medium of claim 1, wherein a respective mini application object displays a portion of content from a corresponding application of the respective mini application object.

10. The non-transitory computer readable storage medium of claim 1, wherein a predefined input on a respective mini application object launches a corresponding application the respective mini application object.

11. The non-transitory computer readable storage medium of claim 1, wherein a respective mini application object operates as a standalone application residing in memory of the device, distinct from an associated application also residing in the memory of the device.

12. The non-transitory computer readable storage medium of claim 1, wherein a respective mini application object operates as an extension or component of an associated application on the device.

13. The non-transitory computer readable storage medium of claim 1, wherein a respective mini application object has a dedicated memory portion for temporary storage of information.

14. The non-transitory computer readable storage medium of claim 13, wherein the memory portion is accessible by a corresponding full-featured application of the respective mini application object.

15. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
    while the device is in a display-off state, detecting a first input to activate the display of the device;
    in response to detecting the first input:
        activating the display of the device, and
        displaying, on the display, a first user interface that corresponds to a display-on state of the device;
    while displaying the first user interface that corresponds to the display-on state of the device, detecting a swipe gesture on the touch-sensitive surface; and,
    in response to detecting the swipe gesture:
        in accordance with a determination that the swipe gesture is in a first direction, replacing display of the first user interface with display of a camera application user interface, including:
            moving the first user interface to reveal a portion of the camera application user interface, including a first region of the camera application user interface, wherein:
                the first region of the camera application user interface has a first appearance when less than a threshold portion of the camera application user interface has been revealed,
                the first region of the camera application user interface has a second appearance distinct from the first appearance when more than the threshold portion of the camera application user interface has been revealed, and
            the first user interface is replaced by the camera application user interface in accordance with detecting an end of the swipe gesture that includes liftoff of a contact from the touch-sensitive surface that is detected at a time when the first region of the camera application user interface is displayed with the second appearance;
        in accordance with a determination that the swipe gesture is in a second direction, distinct from the first direction, replacing display of the first user interface with display of a mini application object user interface that is configured to include a plurality of mini application objects, wherein a respective mini application object of the plurality of mini application objects has a corresponding application that is stored in the device;
        in accordance with a determination that the swipe gesture is in a third direction, distinct from the first direction and the second direction, displaying a control panel user interface; and
        in accordance with a determination that the swipe gesture is in a fourth direction, distinct from the first direction, the second direction, and the third direction, displaying a notifications user interface that is configured to display a plurality of notifications.

16. A method, comprising:
at an electronic device with a display and a touch-sensitive surface:
    while the device is in a display-off state, detecting a first input to activate the display of the device;
    in response to detecting the first input:
        activating the display of the device, and
        displaying, on the display, a first user interface that corresponds to a display-on state of the device;
    while displaying the first user interface that corresponds to the display-on state of the device, detecting a swipe gesture on the touch-sensitive surface; and,
    in response to detecting the swipe gesture:
        in accordance with a determination that the swipe gesture is in a first direction, replacing display of the first user interface with display of a camera application user interface, including:
            moving the first user interface to reveal a portion of the camera application user interface, including a first region of the camera application user interface, wherein:
                the first region of the camera application user interface has a first appearance when less than a threshold portion of the camera application user interface has been revealed,
                the first region of the camera application user interface has a second appearance distinct from the first appearance when more than the threshold portion of the camera application user interface has been revealed, and the first user interface is replaced by the camera application user interface in accordance with detecting an end of the swipe gesture that includes liftoff of a contact from the touch-sensitive surface that is detected at a time when the first region of the camera application user interface is displayed with the second appearance;

in accordance with a determination that the swipe gesture is in a second direction, distinct from the first direction, replacing display of the first user interface with display of a mini application object user interface that is configured to include a plurality of mini application objects, wherein a respective mini application object of the plurality of mini application objects has a corresponding application that is stored in the device;

in accordance with a determination that the swipe gesture is in a third direction, distinct from the first direction and the second direction, displaying a multipage control panel user interface; and in accordance with a determination that the swipe gesture is in a fourth direction, distinct from the first direction, the second direction, and the third direction, displaying a notifications user interface that is configured to display a plurality of notifications.

17. The electronic device of claim 15, wherein the one or more programs further include instructions for:

while the notifications user interface is displayed, detecting a dismissal gesture at a location on the touch-sensitive surface corresponding to a respective notification included in the notifications user interface; and, in response to detecting the dismissal gesture, ceasing to display the respective notification in the notifications user interface.

18. The electronic device of claim 15, wherein the one or more programs further include instructions for:

while the notifications user interface is displayed, detecting a launch gesture at a location on the touch-sensitive surface corresponding to a first notification included in the notifications user interface; and, in response to detecting the launch gesture, launching an application that corresponds to the first notification.

19. The electronic device of claim 15, wherein the one or more programs further include instructions for:

while the mini application object user interface is displayed, detecting a launch gesture at a location on the touch-sensitive surface corresponding to a first mini application object included in the mini application object user interface; and, in response to detecting the launch gesture, launching an application that corresponds to the first mini application object.

20. The electronic device of claim 15, wherein the one or more programs further include instructions for:

while the mini application object user interface is displayed, detecting an information expansion gesture at a location on the touch-sensitive surface corresponding to a second mini application object included in the mini application object user interface, wherein the second mini application object includes mini application object information; and, in response to detecting the information expansion gesture:
expanding the second mini application object; and
displaying the mini application object information and additional mini application object information in the expanded second mini application object.

21. The electronic device of claim 18, wherein a respective mini application object is configured to perform a subset, less than all, of functions of a corresponding application of the respective mini application object.

22. The electronic device of claim 15, wherein a respective mini application object displays an identifier for a corresponding application of the respective mini application object.

23. The electronic device of claim 15, wherein a respective mini application object displays a portion of content from a corresponding application of the respective mini application object.

24. The electronic device of claim 15, wherein a predefined input on a respective mini application object launches a corresponding application the respective mini application object.

25. The electronic device of claim 15, wherein a respective mini application object operates as a standalone application residing in memory of the device, distinct from an associated application also residing in the memory of the device.

26. The electronic device of claim 15, wherein a respective mini application object operates as an extension or component of an associated application on the device.

27. The electronic device of claim 15, wherein a respective mini application object has a dedicated memory portion for temporary storage of information.

28. The electronic device of claim 27, wherein the memory portion is accessible by a corresponding full-featured application of the respective mini application object.

29. The electronic device of claim 15, wherein:
the first user interface is restored in accordance with detecting an end of the swipe gesture that includes liftoff of the contact from the touch-sensitive surface that is detected at a time when the first region of the camera application user interface is displayed with the first appearance.

30. The method of claim 29, wherein:
the first user interface is restored in accordance with detecting an end of the swipe gesture that includes liftoff of the contact from the touch-sensitive surface that is detected at a time when the first region of the camera application user interface is displayed with the first appearance.

31. The method of claim 29, including:
while the notifications user interface is displayed, detecting a dismissal gesture at a location on the touch-sensitive surface corresponding to a respective notification included in the notifications user interface; and, in response to detecting the dismissal gesture, ceasing to display the respective notification in the notifications user interface.

32. The method of claim 29, including:
while the notifications user interface is displayed, detecting a launch gesture at a location on the touch-sensitive surface corresponding to a first notification included in the notifications user interface; and, in response to detecting the launch gesture, launching an application that corresponds to the first notification.

33. The method of claim 29, including:
while the mini application object user interface is displayed, detecting a launch gesture at a location on the touch-sensitive surface corresponding to a first mini application object included in the mini application object user interface; and, in response to detecting the launch gesture, launching an application that corresponds to the first mini application object.

34. The method of claim 29, including:

while the mini application object user interface is displayed, detecting an information expansion gesture at a location on the touch-sensitive surface corresponding to a second mini application object included in the mini application object user interface, wherein the second mini application object includes mini application object information; and, in response to detecting the information expansion gesture:

expanding the second mini application object; and displaying the mini application object information and additional mini application object information in the expanded second mini application object.

35. The method of claim 29, wherein a respective mini application object is configured to perform a subset, less than all, of functions of a corresponding application of the respective mini application object.

36. The method of claim 29, wherein a respective mini application object displays an identifier for a corresponding application of the respective mini application object.

37. The method of claim 29, wherein a respective mini application object displays a portion of content from a corresponding application of the respective mini application object.

38. The method of claim 29, wherein a predefined input on a respective mini application object launches a corresponding application the respective mini application object.

39. The method of claim 29, wherein a respective mini application object operates as a standalone application residing in memory of the device, distinct from an associated application also residing in the memory of the device.

40. The method of claim 29, wherein a respective mini application object operates as an extension or component of an associated application on the device.

41. The method of claim 29, wherein a respective mini application object has a dedicated memory portion for temporary storage of information.

42. The method of claim 41, wherein the memory portion is accessible by a corresponding full-featured application of the respective mini application object.

* * * * *

UNITED STATES PATENT AND TRADEMARK OFFICE
CERTIFICATE OF CORRECTION

PATENT NO. : 10,712,934 B2  
APPLICATION NO. : 15/620726  
DATED : July 14, 2020  
INVENTOR(S) : Lemay et al.

Page 1 of 1

It is certified that error appears in the above-identified patent and that said Letters Patent is hereby corrected as shown below:

In the Claims

Claim 10, Column 83, Line 22, please delete "application the" and insert --application of the--;

Claim 24, Column 86, Line 21, please delete "application the" and insert --application of the--;

Claim 30, Column 86, Line 45, please delete "claim 29," and insert --claim 16,--;

Claim 31, Column 86, Line 52, please delete "claim 29," and insert --claim 16,--;

Claim 32, Column 86, Line 60, please delete "claim 29," and insert --claim 16,--;

Claim 33, Column 86, Line 67, please delete "claim 29," and insert --claim 16,--;

Claim 34, Column 87, Line 7, please delete "claim 29," and insert --claim 16,--;

Claim 35, Column 87, Line 21, please delete "claim 29," and insert --claim 16,--;

Claim 36, Column 88, Line 1, please delete "claim 29," and insert --claim 16,--;

Claim 37, Column 88, Line 4, please delete "claim 29," and insert --claim 16,--;

Claim 38, Column 88, Line 8, please delete "claim 29," and insert --claim 16,--;

Claim 39, Column 88, Line 11, please delete "claim 29," and insert --claim 16,--;

Claim 40, Column 88, Line 15, please delete "claim 29," and insert --claim 16,--;

Claim 41, Column 88, Line 18, please delete "claim 29," and insert --claim 16,--.

Signed and Sealed this  
Twenty-second Day of September, 2020

Andrei Iancu  
*Director of the United States Patent and Trademark Office*